(12) United States Patent
Chen

(10) Patent No.: US 11,657,691 B2
(45) Date of Patent: *May 23, 2023

(54) TWO-LEVEL LED SECURITY LIGHT WITH MOTION SENSOR

(71) Applicant: VAXCEL INTERNATIONAL CO., LTD., Carol Stream, IL (US)

(72) Inventor: Chia-Teh Chen, Taipei (TW)

(73) Assignee: Vaxcel International Co., Ltd., Carol Stream, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/511,320

(22) Filed: Oct. 26, 2021

(65) Prior Publication Data

US 2022/0051536 A1 Feb. 17, 2022

Related U.S. Application Data

(63) Continuation of application No. 17/202,879, filed on Mar. 16, 2021, now Pat. No. 11,183,039, which is a
(Continued)

(51) Int. Cl.
*H05B 47/10* (2020.01)
*G08B 15/00* (2006.01)
(Continued)

(52) U.S. Cl.
CPC ............... *G08B 15/00* (2013.01); *F21S 9/03* (2013.01); *F21V 17/02* (2013.01); *G08B 5/36* (2013.01); *G08B 13/1895* (2013.01); *G08B 15/002* (2013.01); *H02J 7/35* (2013.01); *H05B 39/042* (2013.01); *H05B 39/044* (2013.01); *H05B 45/10* (2020.01); *H05B 45/12* (2020.01); *H05B 45/14* (2020.01); *H05B 45/20* (2020.01); *H05B 45/37* (2020.01); *H05B 45/44* (2020.01); *H05B 45/46* (2020.01); *H05B 45/48* (2020.01); *H05B 47/10* (2020.01); *H05B 47/105* (2020.01); *H05B 47/11* (2020.01); *H05B 47/115* (2020.01); *H05B 47/16* (2020.01); *H05B 47/17* (2020.01);
(Continued)

(58) Field of Classification Search
CPC ........ H05B 45/10; H05B 45/20; H05B 45/32; H05B 47/11; H05B 47/16; H05B 47/19; H05B 47/105; H05B 47/115
See application file for complete search history.

(56) References Cited

U.S. PATENT DOCUMENTS

| 4,298,869 A | 11/1981 | Okuno |
| 5,134,387 A | 7/1992 | Smith et al. |

(Continued)

*Primary Examiner* — Tung X Le
(74) *Attorney, Agent, or Firm* — Rosenberg, Klein & Lee

(57) ABSTRACT

A technology for configuring a lifestyle LED light with a tunable light color temperature is disclosed. The technology of tuning the light color temperature is made possible by blending two LED loads emitting light with different color temperatures thru a light diffuser with an arrangement that a first electric power delivered to a first LED load emitting light with a low color temperature and a second electric power delivered to a second LED load emitting light with a high color temperature are reversely and complementarily adjusted for tuning a diffused light color temperature such that a total light intensity generated by the LED light is kept essentially unchanged.

157 Claims, 18 Drawing Sheets

Related U.S. Application Data continuation of application No. 16/159,852, filed on Oct. 15, 2018, now Pat. No. 10,985,596, which is a continuation of application No. 15/393,768, filed on Dec. 29, 2016, now Pat. No. 10,136,495, which is a continuation of application No. 15/213,595, filed on Jul. 19, 2016, now Pat. No. 9,622,328, which is a continuation of application No. 14/478,150, filed on Sep. 5, 2014, now Pat. No. 9,445,474, which is a continuation of application No. 13/222,090, filed on Aug. 31, 2011, now Pat. No. 8,866,392.

(51) Int. Cl.

| | | |
|---|---|---|
| *H05B 45/14* | (2020.01) | |
| *H05B 45/20* | (2020.01) | |
| *H05B 45/44* | (2020.01) | |
| *H05B 45/46* | (2020.01) | |
| *H05B 45/48* | (2020.01) | |
| *H05B 47/11* | (2020.01) | |
| *H05B 47/16* | (2020.01) | |
| *H05B 47/115* | (2020.01) | |
| *H05B 47/17* | (2020.01) | |
| *H05B 45/12* | (2020.01) | |
| *H05B 45/37* | (2020.01) | |
| *H05B 45/10* | (2020.01) | |
| *H05B 47/105* | (2020.01) | |
| *H05B 39/04* | (2006.01) | |
| *F21S 9/03* | (2006.01) | |
| *F21V 17/02* | (2006.01) | |
| *G08B 5/36* | (2006.01) | |
| *G08B 13/189* | (2006.01) | |
| *H02J 7/35* | (2006.01) | |
| *F21Y 115/10* | (2016.01) | |
| *G08B 13/00* | (2006.01) | |

(52) U.S. Cl.
CPC ........... *F21Y 2115/10* (2016.08); *G08B 13/00* (2013.01); *G08B 13/189* (2013.01); *Y02B 20/40* (2013.01)

(56) References Cited

U.S. PATENT DOCUMENTS

| | | |
|---|---|---|
| 5,491,463 A | 2/1996 | Sargeant et al. |
| 5,598,066 A | 1/1997 | Wiesemann et al. |
| 5,668,446 A | 9/1997 | Baker |
| 5,747,937 A | 5/1998 | Wiesemann et al. |
| 6,016,038 A | 1/2000 | Mueller et al. |
| 6,211,626 B1 | 4/2001 | Lys et al. |
| 6,225,748 B1 | 5/2001 | Evans et al. |
| 6,473,608 B1 | 10/2002 | Lehr et al. |
| 6,548,967 B1 | 4/2003 | Dowling et al. |
| 6,559,757 B1 | 5/2003 | Deller et al. |
| 6,888,323 B1 | 5/2005 | Null et al. |
| 6,909,239 B2 | 6/2005 | Gauna |
| 6,927,541 B2 | 8/2005 | Lee |
| 7,086,756 B2 | 8/2006 | Maxik |
| 7,088,059 B2 | 8/2006 | McKinney et al. |
| 7,122,976 B1 | 10/2006 | Null et al. |
| 7,268,497 B2 | 9/2007 | Hsieh |
| 7,339,471 B1 | 3/2008 | Chan et al. |
| 7,344,275 B2 | 3/2008 | Allen et al. |
| 7,405,524 B2 | 7/2008 | Null et al. |
| 7,507,001 B2 | 3/2009 | Kit |
| 7,564,198 B2 | 7/2009 | Yamamoto et al. |
| 7,565,225 B2 | 7/2009 | Dushane et al. |
| 7,804,252 B2 | 9/2010 | Chen |
| 7,876,056 B2 | 1/2011 | Atkins et al. |
| 7,880,394 B2 | 2/2011 | Sibalich et al. |
| 7,940,167 B2 | 5/2011 | Steiner et al. |
| 7,948,189 B2 | 5/2011 | Ahmed |
| 8,033,686 B2 | 10/2011 | Recker et al. |
| 8,035,320 B2 | 10/2011 | Aradachi et al. |
| 8,035,513 B2 | 10/2011 | Raper |
| 8,159,125 B2 | 4/2012 | Miao |
| 8,194,061 B2 | 6/2012 | Wang et al. |
| 8,199,010 B2 | 6/2012 | Sloan et al. |
| 8,203,445 B2 | 6/2012 | Recker et al. |
| 8,222,584 B2 | 7/2012 | Rains et al. |
| 8,222,832 B2 * | 7/2012 | Zheng ............... H02M 3/33523 315/297 |
| 8,310,163 B2 | 11/2012 | Chen |
| 8,325,040 B2 | 12/2012 | Nassimi |
| 8,352,850 B1 | 1/2013 | Creed et al. |
| 8,476,836 B2 | 7/2013 | Van de Ven et al. |
| 8,515,275 B2 | 8/2013 | Machida et al. |
| 8,598,805 B2 | 12/2013 | Tremblay et al. |
| 8,805,351 B2 | 8/2014 | Sigal et al. |
| 8,907,576 B2 | 12/2014 | Ferrier |
| 9,073,798 B1 | 7/2015 | Brooke |
| 9,083,461 B2 | 7/2015 | Chin et al. |
| 9,113,528 B2 | 8/2015 | Bora et al. |
| 9,131,545 B2 | 9/2015 | Verfuerth et al. |
| 9,134,004 B2 | 9/2015 | Wacholder et al. |
| 9,271,345 B2 | 2/2016 | Welten et al. |
| 9,294,719 B2 | 3/2016 | Uhma et al. |
| 9,311,167 B2 | 4/2016 | Kim et al. |
| 9,323,421 B1 | 4/2016 | Cronin |
| 9,706,617 B2 | 7/2017 | Carrigan et al. |
| 9,832,844 B2 | 11/2017 | Mans et al. |
| 10,154,564 B2 | 12/2018 | Chen |
| 10,182,489 B1 | 1/2019 | Israni |
| 10,206,265 B2 | 2/2019 | Verfuerth |
| 10,271,404 B1 | 4/2019 | Fornek et al. |
| 10,321,541 B2 | 6/2019 | Bora et al. |
| 10,667,367 B2 | 5/2020 | Chen |
| 2004/0003073 A1 | 1/2004 | Krzyzanowski et al. |
| 2004/0105264 A1 | 6/2004 | Spero |
| 2005/0007025 A1 | 1/2005 | Gauna |
| 2005/0259416 A1 | 11/2005 | Gauna et al. |
| 2006/0022916 A1 * | 2/2006 | Aiello ............... H05B 45/325 345/82 |
| 2006/0123053 A1 | 6/2006 | Scannell |
| 2007/0182338 A1 | 8/2007 | Shteynberg et al. |
| 2008/0197783 A1 | 8/2008 | Chen |
| 2008/0252197 A1 | 10/2008 | Li et al. |
| 2010/0109557 A1 * | 5/2010 | Bouchard ............... H05B 45/48 315/312 |
| 2010/0117543 A1 | 5/2010 | Van der Veen et al. |
| 2010/0141153 A1 | 6/2010 | Recker et al. |
| 2010/0165600 A1 | 7/2010 | Ku |
| 2010/0264831 A1 | 10/2010 | Nagaoka |
| 2010/0327766 A1 | 12/2010 | Recker et al. |
| 2011/0018448 A1 | 1/2011 | Metchear et al. |
| 2011/0062888 A1 | 4/2011 | Bondy et al. |
| 2011/0080110 A1 | 4/2011 | Nuhfer et al. |
| 2011/0285292 A1 | 11/2011 | Mollnow et al. |
| 2012/0049760 A1 | 3/2012 | Dennis et al. |
| 2012/0112651 A1 * | 5/2012 | King ................... H05B 45/375 324/415 |
| 2014/0159877 A1 | 6/2014 | Huang |
| 2016/0323972 A1 | 11/2016 | Bora et al. |

* cited by examiner

| Brand | $V_F$ Min. | $V_F$ Max. | Product Series | Information Source |
|---|---|---|---|---|
| CREE | 2.9V | 3.3V | J Series LEDs/J Series 2835 | www.cree.com/led-components/products/j2835/jseries-2835 |
| LUMILEDS | 2.7V | 3.3V | LUXEON 2835 Line | www.lumileds.com/luxeon2835line |
| SAMSUNG | 2.9V | 3.3V | KM281BA+ | www.samsung.com/app/components/products/j2835/jseries-2835 |
| OSRAM | 2.7V | 3.3V | DURIS® E/DURISR E 2835 | www.osram.com/app/product_selector/#!?query=DORIS%20E%202835&sortField=&sortOrder=&start-0&filters=productbrand,DORIS,E&filters-productbrand,DORIS |

FIG. 9

TWO-LEVEL LED SECURITY LIGHT WITH MOTION SENSOR

CROSS-REFERENCE TO RELATED APPLICATIONS

This is a continuation application of prior application Ser. No. 17/202,879, filed on Mar. 16, 2021, which issued as U.S. Pat. No. 11,183,039 on Nov. 23, 2021. Application Ser. No. 17/202,879, filed on Mar. 16, 2021 is a continuation application of prior application Ser. No. 16/159,852, filed on Oct. 15, 2018, which issued as U.S. Pat. No. 10,985,596 on Apr. 20, 2021. Application Ser. No. 16/159,852 is a continuation application of prior application Ser. No. 15/393,768, filed on Dec. 29, 2016, which issued as U.S. Pat. No. 10,136,495 on Nov. 20, 2018. Application Ser. No. 15/393,768 is a continuation application of prior application Ser. No. 15/213,595, filed on Jul. 19, 2016, which issued as U.S. Pat. No. 9,622,328 on Apr. 11, 2017. Application Ser. No. 15/213,595 is a continuation application of prior application Ser. No. 14/478,150, filed on Sep. 5, 2014, which issued as U.S. Pat. No. 9,445,474 on Sep. 13, 2016. Application Ser. No. 14/478,150 is a continuation application of prior application Ser. No. 13/222,090, filed on Aug. 31, 2011, which issued as U.S. Pat. No. 8,866,392 on Oct. 21, 2014.

INCORPORATION BY REFERENCE/MPEP 2163.07(b)

The following prior arts with associated disclosures are herein requested to be incorporated into the current application:

1. U.S. Pat. No. 9,345,112 B2 titled "MICROCONTROLLER-BASED MULTIFUNCTIONAL ELECTRONIC SWITCH AND LIGHTING APPARATUS HAVING THE SAME" filed on Dec. 22, 2014 and granted on May 17, 2016. The '112 Patent is a continuation in part of the original application of U.S. Pat. No. 8,947,000 which is the first founding patent for a large family collection of member patents involving using the technology of the microcontroller based electronic switch to control a light intensity of a light-emitting unit. The '112 Patent is in turn the second founding patent for a subfamily of member patents involving using a technology of two LED loads emitting light with different color temperature to work with the technology of the microcontroller-based electronic switches to control a color temperature tuning and switching scheme of an LED load.
   The applicant herein requests to incorporate the contents of the '112 Patent including all disclosures, embodiments and drawings to the specification of the current application according to MPEP 2163.07(b).

2. U.S. Pat. No. 10,136,503 B2 titled "MICROCONTROLLER-BASED MULTIFUNCTIONAL ELECTRONIC SWITCH AND LIGHTING APPARATUS HAVING THE SAME" filed on Sep. 13, 2017 and granted on Nov. 20, 2018. The '503 Patent is a member patent in the family collection of member patents under the first founding patent '000 and is also a member patent in the subfamily collection of member patents under the second founding Patent '112.
   The '503 Patent teaches a system and a method of using two microcontroller based electronic switches respectively connected to two LED loads emitting light with different color temperatures to control and allocate different electric powers respectively delivered to the two LED loads for performing multiple working modes including on/off control mode, dimming mode, color temperature tuning mode, color temperature switching mode, color temperature dim to warm mode, commanding mode for controlling a lighting family comprising a plurality of member lamps remotely located or delay shut off mode.
   The applicant herein requests to incorporate the contents of the '503 Patent including all disclosures, embodiments and drawings to the specification of the current application according to MPEP 2163.07(b).

3. U.S. Pat. No. 10,470,276 B2 titled "METHOD OF TUNING LIGHT COLOR TEMPERATURE FOR LED LIGHTING DEVICE AND APPLICATION THEREOF" was filed on Oct. 17, 2018 and granted on Nov. 5, 2019. The '276 Patent teaches a method and application of performing a light color temperature tuning control for an LED lamp includes using a first LED load emitting light with a first color temperature and a second LED load emitting light with a second color temperature thru a light diffuser, using a power allocation circuitry working with a power allocation algorithm to control different electric power respectively delivered to the first LED load while keeping the total electric power unchanged to generate different diffused light color temperatures. Applicant herein requests to incorporate the contents of the '276 Patent including all disclosures, embodiments and drawings by reference to the specification of the current application according to MPEP 2163.07(b).

4. U.S. Pat. No. 11,063,585 titled "METHOD OF TUNING LIGHT COLOR TEMPERATURE FOR LED LIGHTING DEVICE AND APPLICATION THEREOF" was a continuation of application of the '276 Patent, filed on Aug. 7, 2019 and granted on Jul. 13, 2021. The '585 Patent discloses a theory and a technical foundation for building a technical frame of a color temperature tuning technology for an LED lamp composing a power allocation algorithm, a power allocation circuitry and at least one external control device for activating a color temperature tuning and switching scheme.
   The applicant herein requests to incorporate the contents of the '585 Patent including all disclosures, all embodiments and all drawings to the specification of the current application according to MPEP 2163.07 (b).

5. U.S. Pat. No. 8,866,392 B2 titled "TWO-LEVEL LED SECURITY LIGHT WITH MOTION SENSOR" was filed on Aug. 31, 2011 and granted on Oct. 21, 2014. The '392 Patent discloses technologies for operating a two level LED security light; at night the LED security light is automatically turned on for a low level illumination, when a motion intrusion signal is detected by the motion sensor, the LED security light is switched from the low level illumination with a low color temperature to a high level illumination with a high color temperature to maximize an effect of security alert for a short duration time, at dawn the LED security light is automatically turned off.
   The '392 Patent is the founding application for a large family collection of member patents involving automatic illumination control technologies including light intensity tuning and light color temperature tuning. The applicant herein requests to incorporate the contents of the '392 Patent including all disclosures, embodiments and drawings to the specification of the current application according to MPEP 2163.07(b).

6. U.S. Pat. No. 10,516,292 B2 titled "TWO-LEVEL LED SECURITY LIGHT WITH MOTION SENSOR" was a member patent under the founding patent '392, filed on Jan. 10, 2019 and granted on Dec. 24, 2019.

The '292 Patent is a member patent in the family collection of patents under the founding patent '392.

The '292 Patent discloses a lifestyle LED security light including a light-emitting unit configured with two sets of LED loads respectively emitting different color temperature light, at dusk the light-emitting unit is automatically turned on for a first level illumination with a low color temperature featuring an aesthetic night view with the motion sensor being deactivated for a first time duration, and then the light-emitting unit is changed to a second level illumination with motion sensor being activated, when the motion sensor detects a motion intrusion signal, the light-emitting unit is instantly switched to perform a third level illumination with a high light intensity and a high color temperature. The color temperatures of the first level illumination and the third level illumination are respectively adjustable by simultaneously and reversely adjusting the electric powers allocated to the two sets of LED loads.

The applicant herein requests to incorporate the contents of the '292 Patent to the specification of the current application according to MPEP 2163.07(b).

7. U.S. Pat. No. 10,770,916 B2 titled "TWO-LEVEL LED SECURITY LIGHT WITH MOTION SENSOR" was filed on Oct. 30, 2019 and granted on Sep. 8, 2020. The '916 Patent is a member patent in the family collection of patents under the founding patent '392. The '916 Patent teaches a method of configuring an LED light with a tunable diffused light color temperature. The method comprises using a light-emitting unit configured with a first LED load emitting light with a low color temperature and a second LED load emitting light with a high color temperature electrically connected in parallel, using a light diffuser to cover the first LED load and the second LED load create a diffused light with a diffused light color temperature, using two semiconductor switching devices working in conjunction with a controller to respectively control a first electric power delivered to the first LED load and a second electric power delivered to the second LED load to operate a color temperature tuning and switching scheme and using a first external control device to output at least one first external control signal to activate a selection of a diffused light color temperature.

The applicant herein requests to incorporate the contents of the '916 Patent including all disclosures, all embodiments and all drawings to the specification of the current application according to MPED 2163.07 ((b).

8. U.S. Pat. No. 10,763,691 B2 titled "TWO-LEVEL LED SECURITY LIGHT WITH MOTION SENSOR" was filed on Mar. 19, 2020 and granted on Sep. 1, 2020. The '691 Patent is a member patent in the family collection of patents under the original founding patent '392. The '691 Patent discloses a technology of tuning the light color temperature of a lifestyle LED light by blending the two LED loads emitting light with different color temperatures thru a light diffuser with an arrangement that a first electric power delivered to a first LED load emitting light with a low color temperature and a second electric power delivered to a second LED load emitting light with a high color temperature are reversely and complementarily adjusted for tuning a diffused light color temperature such that a total light intensity generated by the LED light is kept essentially unchanged.

The applicant herein requests to incorporate the contents of the '691 Patent including all disclosures, embodiments and drawings to the specification of the current application according to MPEP 2163.07(b).

9. U.S. Pat. No. 10,187,947 B2 titled "LIFE-STYLE LED SECURITY LIGHT" was issued on Jan. 22, 2019. The applicant herein requests to incorporate the contents of the '947 Patent including all disclosures, embodiments and drawings to the specification of the current application according to MPEP 2163.07(b).

10. U.S. Pat. No. 10,491,032 B2 titled "LIFESTYLE SECURITY LIGHT" was issued on Nov. 26, 2019. The applicant herein requests to incorporate the contents of the '032 Patent including all disclosures, embodiments and drawings to the specification of the current application according to MPEP 2163.07(b).

11. U.S. Pat. No. 10,225,902 B2 titled "TWO-LEVEL SECURITY LIGHT WITH MOTION SENSOR" was issued on Mar. 5, 2019. The applicant herein requests to incorporate the contents of the '902 Patent including all disclosures, embodiments and drawings to the specification of the current application according to MPEP 2163.07(b).

12. U.S. Pat. No. 10,326,301 B2 titled "TWO-LEVEL LED SECURITY LIGHT WITH MOTION SENSOR" was issued on Jun. 18, 2019. The applicant herein requests to incorporate the contents of the '301 Patent including all disclosures, embodiments and drawings to the specification of the current application according to MPEP 2163.07(b).

13. U.S. Pat. No. 9,326,362 B2 titled "TWO-LEVEL LED SECURITY LIGHT WITH MOTION SENSOR" was issued on Apr. 26, 2016. The applicant herein requests to incorporate the contents of the '362 Patent including all disclosures, embodiments and drawings to the specification of the current application according to MPEP 2163.07(b).

14. U.S. Pat. No. 9,560,719 B2 titled "LED SECURITY LIGHT AND LED SECURITY LIGHT CONTROL DEVICE THEREOF" was issued on Jan. 31, 2017. The applicant herein requests to incorporate the contents of the '719 Patent including all disclosures, embodiments and drawings to the specification of the current application according to MPEP 2163.07(b).

15. U.S. Pat. No. 10,154,564 B2 titled "APP BASED FREE SETTING METHOD FOR SETTING OPERATING PARAMETER OF SECURITY LIGHT" was issued on Dec. 11, 2018. The applicant herein requests to incorporate the contents of the '564 Patent including all disclosures, embodiments and drawings to the specification of the current application according to MPEP 2163.07(b).

16. U.S. Pat. No. 10,667,367 B2 titled "APP BASED FREE SETTING METHOD FOR SETTING OPERATING PARAMETER OF SECURITY LIGHT" was issued on May 26, 2020. The applicant herein requests to incorporate the contents of the '367 Patent including all disclosures, embodiments and drawings to the specification of the current application according to MPEP 2163.07(b)

BACKGROUND

1. Technical Field

The present disclosure relates to a lighting apparatus, in particular, to a multi-level LED security light with motion sensor.

2. Description of Related Art

Lighting sources such as the fluorescent lamps, the incandescent lamps, the halogen lamps, and the light-emitting diodes (LED) have been commonly found in lighting apparatuses for illumination purpose with LED lamps becoming the main stream light source in recent years for all illumination applications. Photoresistors are often utilized in outdoor lighting applications for automatic illuminations, known as the Photo-Control (PC) mode. Timers may be used in the PC mode for turning off the illumination or for switching to a lower level illumination of a lighting source after the lighting source having delivered a higher level illumination for a predetermined duration, referred as the Power-Saving (PS) mode. Motion sensors are often used in the lighting apparatus for delivering a full-power illumination thereof for a short duration when a human motion is detected, then switching back to the PS mode. Illumination operation controls such as auto-illumination in accordance to the background brightness detection, illumination using timer, illumination operation control using motion sensing results (e.g., dark or low luminous power to fully illuminated), color temperature control and brightness control are often implemented by more complex circuit designs in view of the electrical characteristics of LEDs for emitting light being very different from the traditional light sources such as incandescent bulb, fluorescent bulb and halogen bulb.

Therefore, how to develop efficient and effective design methods of illumination controls and applications especially the solid state lighting devices such as LEDs for tuning both the light intensity as well as the color temperature of white LED light are the topics of the present disclosure.

SUMMARY

An exemplary embodiment of the present disclosure provides a multi-level LED security light with motion sensor which may switch to a high level illumination in the Power-Saving (PS) mode for a predetermined time duration when a human motion is detected thereby to achieve a warning purpose or to create a high alertness capacity by using method of electric current adjustment or lighting load adjustment. Furthermore, prior to the detection of a motion intrusion, the LED security light may be constantly in the low level illumination or cutoff to save energy.

An exemplary embodiment of the present disclosure provides a multi-level LED security light including a power supply unit, a light sensing control unit, a motion sensing unit, an external control unit, a loading and power control unit, and a light-emitting unit. The light-emitting unit further includes one LED or a plurality of in series- and/or parallel-connected LEDs; when the light sensing control unit detects that the ambient light being lower than a predetermined value, the loading and power control unit operates to turn on the light-emitting unit to deliver an electric current to the light-emitting unit to generate a high level or a low level illumination; when the light sensing control unit detects that the ambient light is higher than the predetermined value, the loading and power control unit operates to turn off the light-emitting unit; when the motion sensing unit detects a human motion in the PS mode, the loading and power control unit operates to increase the electric current delivered to the light-emitting unit so as to generate the high or the full level illumination for a predetermined time duration.

Another exemplary embodiment of the present disclosure provides a multi-level LED security light including a power supply unit, a light sensing control unit, a motion sensing unit, an external control unit, a loading and power control unit, a light-emitting unit. The light-emitting unit includes a plurality of in series- and/or in parallel-connected LEDs. When the light sensing control unit detects that the ambient light is lower than a predetermined value, the loading and power control unit operates to turn on a portion or all the LEDs of the light-emitting unit to generate a low level or a high level illumination; when the light sensing control detects that the ambient light is higher than the predetermined value, the loading and power control unit operates to turn off all the LEDs in the light-emitting unit; when the motion sensing unit detects a human motion in the PS mode, the loading and power control unit operates to turn on the plurality of LEDs in the light-emitting unit and generates the high or full level illumination for a predetermined time duration. An electric current control circuit is integrated in the exemplary embodiment for providing constant electric current to drive the LEDS in the light-emitting unit.

One exemplary embodiment of the present disclosure provides a multi-level LED security light including a power supply unit, a light sensing control unit, a motion sensing unit, an external control unit, a loading and power control unit, and a light-emitting unit. The light-emitting unit includes a phase controller and one or a plurality of parallel-connected alternating current (AC) LEDs. The phase controller is coupled between the described one or a plurality parallel-connected ACLEDs and AC power source. The loading and power control unit may through the phase controller control the average power of the light-emitting unit; when the light sensing control unit detects that the ambient light is lower than a predetermined value, the loading and power control unit turns on the light-emitting unit to generate a high level or a lower level illumination; when the light sensing control unit detects that the ambient light is higher than the predetermined value, the loading and power control unit turns off the light-emitting unit; when the motion sensing unit detects a human motion in the PS mode, the loading and power control unit increases the average power of the light-emitting unit thereby generates the high level illumination for a predetermined time duration.

According to an exemplary embodiment of the present disclosure, a two-level LED security light includes a power supply unit, a light sensing control unit, a motion sensing unit, an external control unit, a loading and power control unit, and a light-emitting unit. The light-emitting unit includes X high wattage ACLEDs and Y low wattage ACLEDs connected in parallel. When the light sensing control unit detects that the ambient light is lower than a predetermined value, the loading and power control unit turns on the plurality of low wattage ACLEDs to generate a low level illumination; when the light sensing control unit detects that the ambient light is higher than a predetermined value, the loading and power control unit turns off the light-emitting unit; when the motion sensor detects an intrusion, the loading and power control unit turns on both the high wattage ACLEDs and the low wattage ACLEDs at same time thereby generates a high level illumination for a predetermine duration, wherein X and Y are of positive integers.

According to an exemplary embodiment of the present disclosure, a two-level LED security light with motion sensor includes a power supply unit, a light sensing control unit, a motion sensing unit, an external control unit, a loading and power control unit, and a light-emitting unit. The light-emitting unit includes a rectifier circuit connected between one or a plurality of parallel-connected AC lighting sources and AC power source. The loading and power control unit may through the rectifier circuit adjust the average power of the light-emitting unit. When the light sensing control unit detects that the ambient light is lower than a predetermined value, the loading and power control unit turns on the light-emitting unit to generate a low level illumination; when the light sensing control unit detects that the ambient light is higher than the predetermined value, the loading and power control unit turns off the light-emitting unit; when the motion sensing unit detects an intrusion, the loading and power control unit increases the average power of the light-emitting unit thereby generates a high level illumination for a predetermine duration. The rectifier circuit includes a switch parallel-connected with a diode, wherein the switch is controlled by the loading and power control unit.

To sum up, a two-level LED security light with motion sensor provided by an exemplary embodiment in the preset disclosure, may execute Photo-Control (PC) and Power-Saving (PS) modes. When operates in the PC mode, the lighting apparatus may auto-illuminate at night and auto turn off at dawn. The PC mode may generate a high or a low level illumination for a predetermined time duration then automatically switch to the PS mode by a control unit to generate a low level or a cutoff illumination. When the motion sensor detects a human motion, the disclosed LED security light may immediate switch to a high or a full level illumination for a short predetermined time duration thereby achieve illumination or warning effect. After the short predetermined duration, the LED security light may automatically return to the low level illumination for saving energy. Although ACLEDs are used in some embodiments, the present invention is not limited in applying on the ACLEDs. It can be implemented with DC LEDs or DC LEDs in AC module such as LED bulbs incorporating with adequate power sources and circuitries which commonly known by a person of skill in the art.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

FIG. 9 is a data sheet showing data of the minimum forward voltages and maximum forward voltages collected from various LED manufacturers for generating a designated constant forward current to produce a required lumens output.

DESCRIPTION OF THE EXEMPLARY EMBODIMENTS

Figure 1:
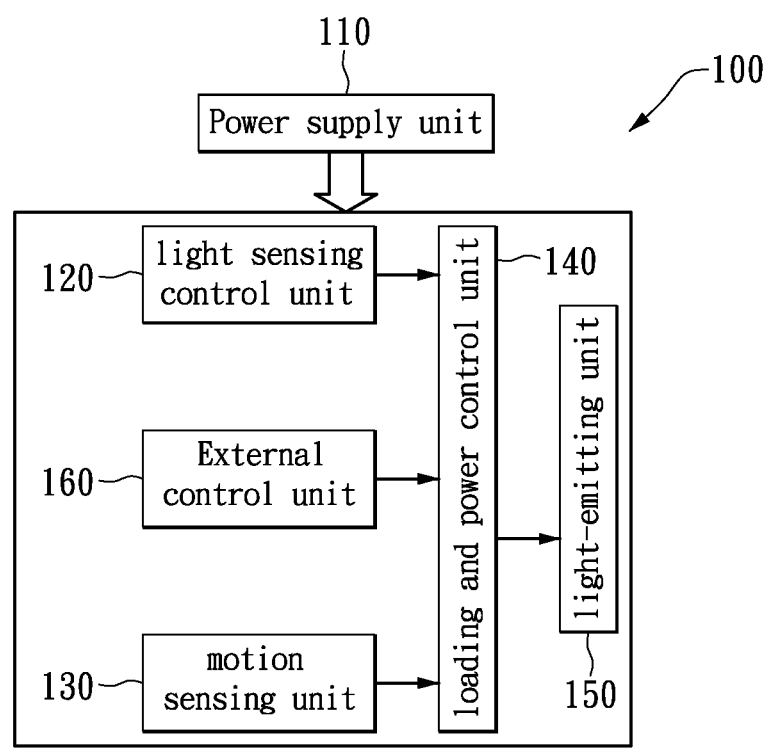
FIG. 1 schematically illustrates a block diagram of a two-level LED security light in accordance with an exemplary embodiment of the present disclosure.

Reference is made in detail to the exemplary embodiments of the present disclosure, examples of which are illustrated in the accompanying drawings. Wherever possible, the same reference numbers are used in the drawings and the description to refer to the same or alike parts.

First Exemplary Embodiment

Figure 1A:
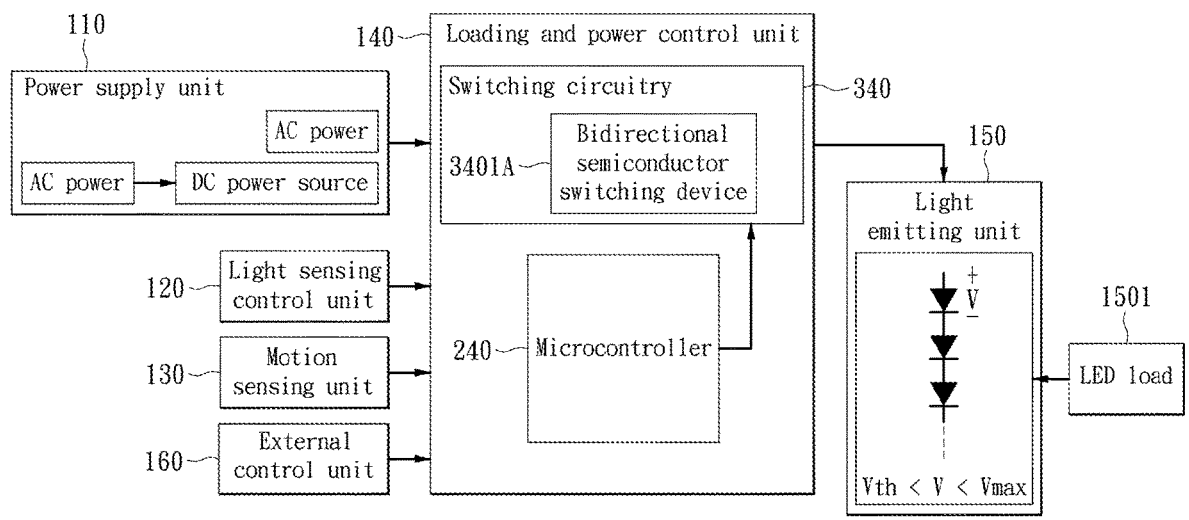
FIG. 1A is an enhanced block diagrammed under FIG. 1 to specifically illustrate an embodiment of FIG. 1 for a two-level LED security light, wherein the loading and power control unit comprises a switching circuitry and a microcontroller, wherein the switching circuitry further comprises a bidirectional semiconductor switching device for controlling an average electric power to be delivered to the LED.
Figure 1B:
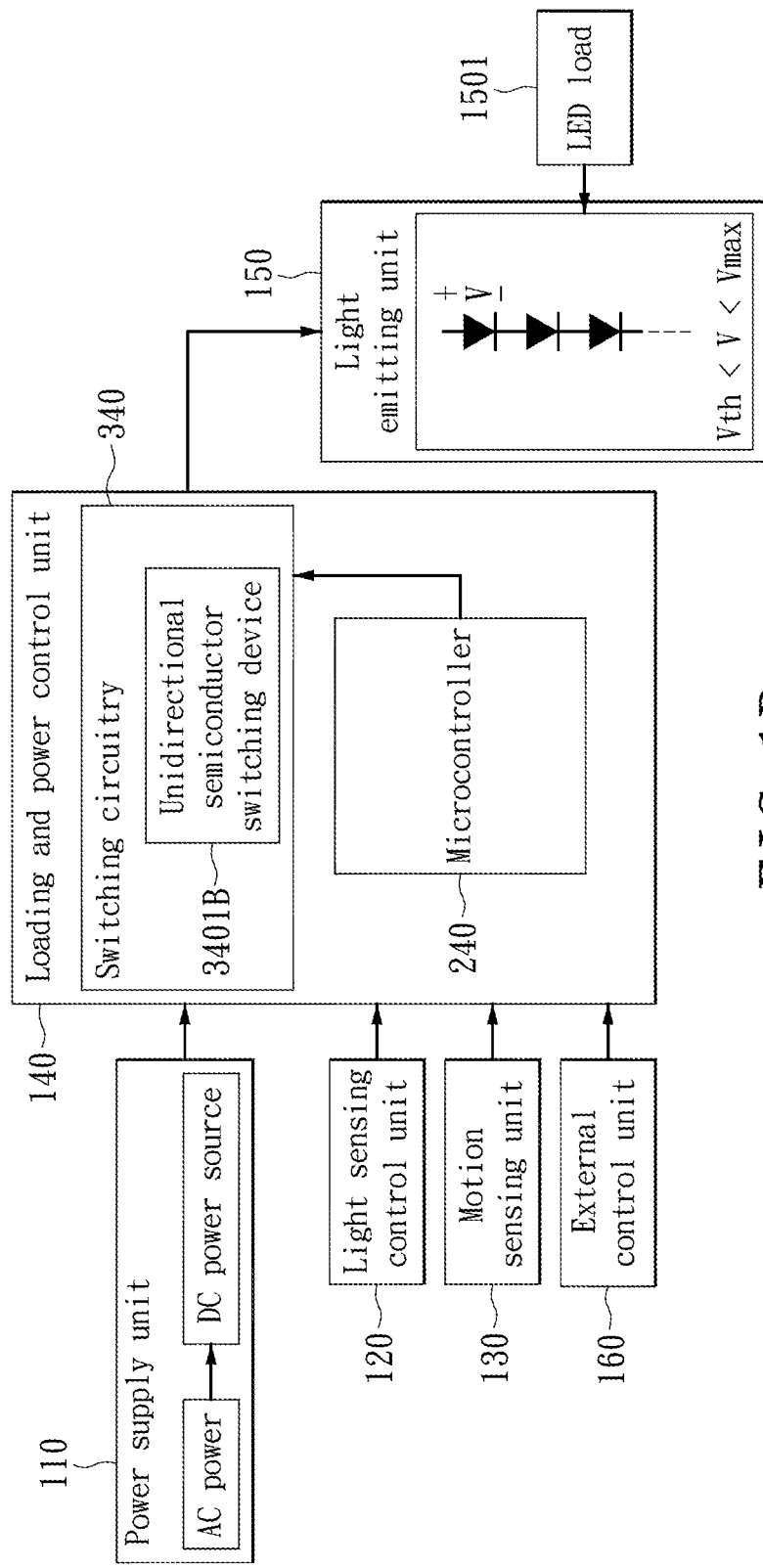
FIG. 1B is an enhanced block diagrammed under FIG. 1 to specifically illustrate an embodiment of FIG. 1 for a two-level LED security light, wherein the loading and power control unit comprises a switching circuitry and a microcontroller, wherein the switching circuitry further comprises a unidirectional semiconductor switching device for controlling an average electric power to be delivered to the LED.

Refer to FIG. 1, which schematically illustrates a block diagram of a multi-level LED security light in accordance to the first exemplary embodiment of the present disclosure. The multi-level LED security light (herein as the lighting apparatus)100 includes a power supply unit 110, a light sensing control unit 120, a motion sensing unit 130, an external control unit 160, a loading and power control unit 140, and a light-emitting unit 150. The power supply unit 110 is used for supplying power required to operate the system, wherein the associated structure includes the known AC/DC voltage converter. The light sensing control unit 120 may be a photo-resistor, which may be coupled to the loading and power control unit 140 for determining daytime or nighttime in accordance to the ambient light. The motion sensing unit 130 may be a passive infrared sensor (PIR), a microwave motion sensor or an ultrasonic motion sensor, which is coupled to the loading and power control unit 140 and is used to detect intrusions. When a person is entering a predetermined detection zone of the motion sensing unit 130, a sensing signal thereof may be generated and transmitted to the loading and power control unit 140. The external control unit 160 is coupled to the loading and power control unit 140 for setting various operating parameters of a security light including at least a time length setting for various illumination modes, at least a light intensity setting for various illumination modes and switching between illumination modes. The external control unit 160 may be configured with any conventional art such as a push button, a touch sensor, a voltage divider, a power interruption detection circuitry or a wireless remote control receiver for generating external control signals interpretable and executable by the loading and power control unit 140. The multi-level LED security light can be optionally configured to perform a three-level LED security light or a two-level LED security light. The three-level LED security light is a lifestyle security light capable of performing three different illuminations during the night time period from dusk to dawn, at dusk the lighting apparatus 100 is turned on by the light sensing control unit 120 to operate a PC (Photo-Control) mode for performing a first level illumination for a first predetermined time duration in early evening and then upon a maturity of the first predetermined time duration the lighting apparatus is switched to a PS (Power-Saving) mode for performing a second level illumination with a reduced light intensity, wherein during the PS mode when a motion intrusion is detected by the motion sensing unit 130, the loading and power control unit 140 operates to increase an average electric current delivered to light-emitting unit 150 to perform a third level illumination with a light intensity higher than the light intensity of the second level illumination for a third predetermined time duration, wherein the third predetermined time duration is often shorter than the first predetermined time duration and the second predetermined time duration. At dawn the lighting apparatus 100 is turned off by the loading and power control unit 140 when the ambient light detected by the light sensing control unit 120 is higher than a second predetermined value. The two-level LED security light is configured to focus on the power saving aspect to provide only two different illuminations of the power saving mode during the nighttime period from dusk to dawn. It can be achieved by eliminating the configuration of the PC mode or by setting the first predetermined time duration at zero to bypath the PC mode in the option of the three-level LED security light. At dusk the lighting apparatus is turned on by the light sensing control unit 120, wherein the loading and power control unit 140 operates to deliver an average electric current to the light emitting unit 150 to perform a first level illumination which is a low level illumination, wherein the light intensity of the low level illumination is normally designed in a range between 0 and 50% of a maximum illumination capacity designed for the lighting apparatus 100, wherein when a motion signal is detected by the motion sensing unit, the loading and power control unit operates to increase the average electric current delivered to the light emitting unit 150 to perform a second level illumination which is a high level illumination for a second predetermined time duration, wherein the high level illumination is normally designed in a range between 50% and 100% of the maximum illumination capacity designed for the LED security light, however, since there are some special cases where the low level illumination and the high level illumination are not bounded by the aforementioned ranges so long as the high level illumination is equal to/or higher than the low level illumination. The present disclosure does not limit their respective ranges. At dawn the lighting apparatus 100 is turned off by the loading and power control unit 140 when the ambient light detected by the light sensing control unit 120 is higher than a second predetermined value. Refer to FIG. 1A and FIG. 1B, wherein the loading and power control unit 140 coupled to the light-emitting unit 150 may be implemented by a microcontroller 240 working in conjunction with a switching circuitry 340; the switching circuitry 340 electrically connected in series with the power supply unit 110 and the light emitting unit 150 is configured with at least one semiconductor switching device which may be a bidirectional semiconductor switching element 3401A or an unidirectional semiconductor switching element 3401B, wherein the microcontroller 240 outputs a control signal to control a conduction rate of the switching circuitry 340 for determining an average electric current delivered to the light-emitting unit 150.

The loading and power control unit 140 may control illumination levels and or color temperature levels of the light-emitting unit 150 in accordance to the sensing signals respectively outputted by the light sensing control unit 120 and the motion sensing unit 130 or in accordance to the external control signals outputted by the external control unit 160. The light-emitting unit 150 may include a plurality of LEDs emitting light with same color temperature or with different color temperatures, wherein when the light-emitting unit is composed of LEDs emitting light with different color temperatures, the plurality of LEDs may be grouped into at least two LED loads electrically and respectively connected in parallel paths according to a belonging of the color temperatures. It is also possible to connect the at least two LED loads in series though in parallel connection is far more popularly used than in series connection. The loading and power control unit 140 may control the light-emitting unit 150 to generate at least two levels of illumination variations in terms of light intensities and or light color temperatures.

When the light sensing control unit 120 detects that the ambient light is lower than a first predetermined value (i.e., nighttime), the loading and power control unit 140 executes the Photo-Control (PC) mode by turning on the light-emitting unit 150 to generate a first level illumination for a first predetermined time duration thento switch to a second level illumination for a second predetermined time duration for the Power-Saving (PS) mode. When the light sensing control unit 120 detects that the ambient light is higher than a second predetermined value (i.e., daytime), the loading and power control unit 140 turns off the light-emitting unit 150. In the PS mode, when the motion sensing unit 130 detects a human motion, the loading and power control unit 140 may increase the average electric current which flow through the light-emitting unit 150 to generate a third level illumination for a third predetermined time duration. After the third predetermined time duration, the loading and power control unit 140 may automatically reduce the electric current that flow through the light-emitting unit 150 thus have the light-emitting unit 150 return to the second level illumination for saving energy, wherein the second predetermined time duration can be ended at any time point between dusk and dawn such as three hours, six hours after dusk, or can be programmed to be ended at dawn when the ambient light is higher than the second predetermined value.

Figure 1C:
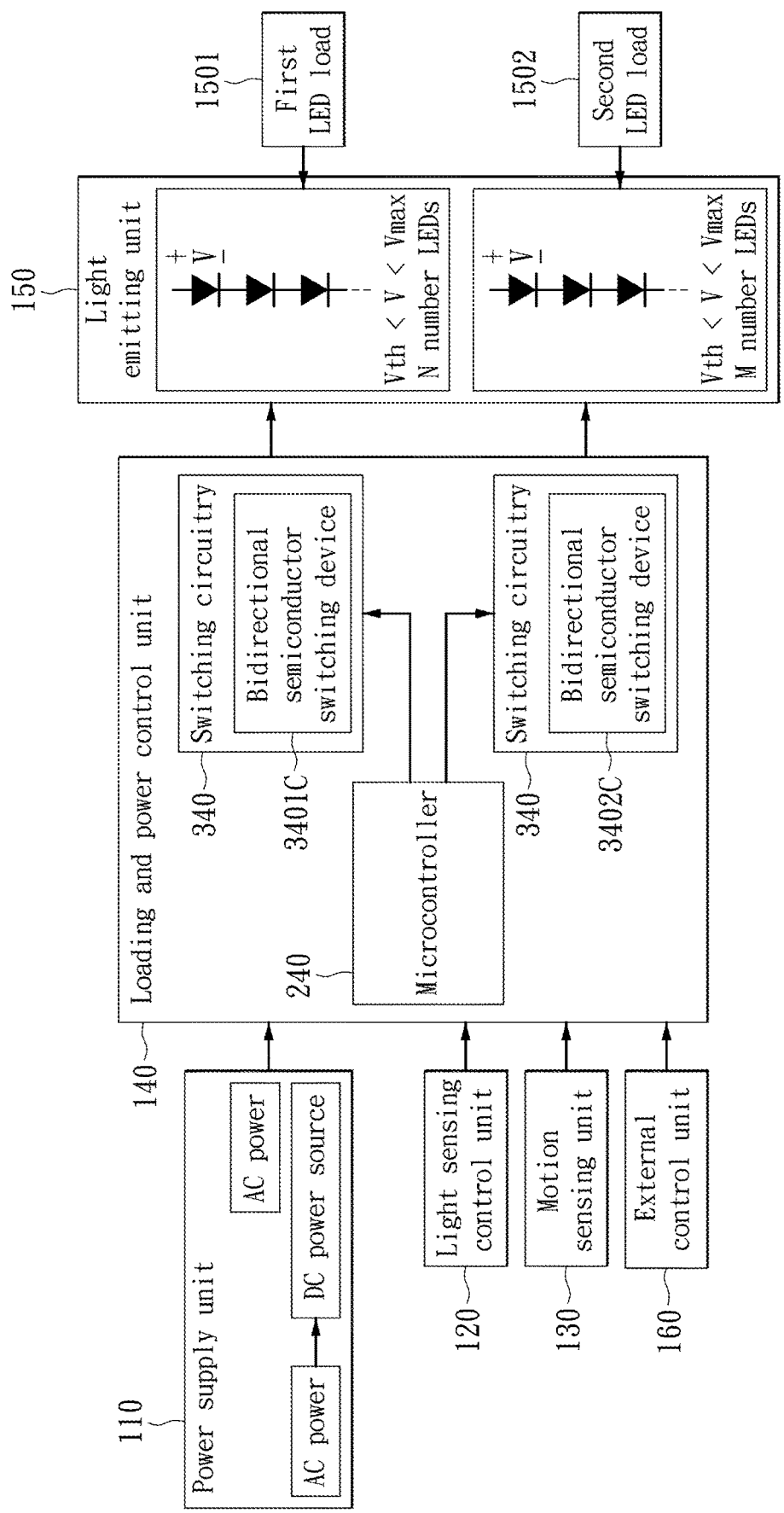
FIG. 1C is an enhanced block diagrammed under FIG. 1 to specifically illustrate an embodiment of FIG. 1 for a two-level LED security light including a first set having N number LEDs and a second set having M number LEDs, wherein the loading and power control unit comprises a switching circuitry and a microcontroller, wherein the switching circuitry further comprises bidirectional semiconductor switching devices for controlling an average electric power to be delivered to the LED.
Figure 1D:
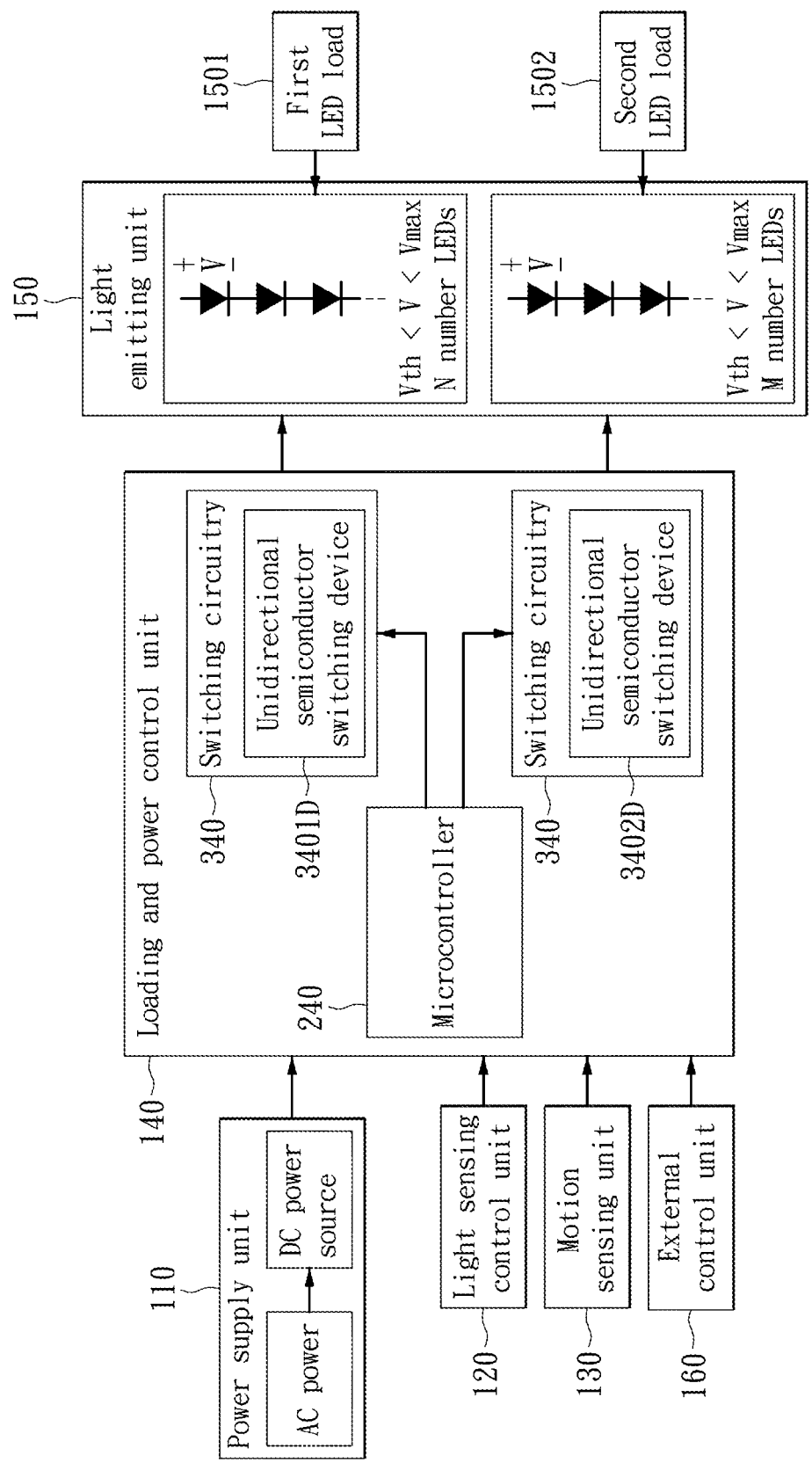
FIG. 1D is an enhanced block diagrammed under FIG. 1 to specifically illustrate an embodiment of FIG. 1 for a two-level LED security light including a first set having N number LEDs and a second set having M number LEDs, wherein the loading and power control unit comprises a switching circuitry and a microcontroller, wherein the switching circuitry further comprises unidirectional semiconductor switching devices for controlling an average electric power to be delivered to the LED.

Refer to FIG. 1C and FIG. 1D, which respectively illustrates a schematic diagram of a two-level LED security light in accordance with the first exemplary embodiment of the present disclosure. In FIG. 1C the light-emitting unit 150 is further configured with an AC/DC power converter (not shown in FIG. 1C) to operate two LED loads 1501 and 1502 respectively comprising N number LEDs and M number LEDs electrically and respectively connected in parallel paths to a switching circuitry 340 configured with two bi-directional semiconductor switching devices respectively 3401C and 3402C controlled by the microcontroller 240. In FIG. 1D the light-emitting unit 150 is configured with two DCLED loads 1501 and 1502 respectively comprising N number LEDs being a first LED load 1501 and M number LEDs being a second LED load 1502 electrically and respectively connected in parallel paths to a switching circuitry 340 configured with two uni-directional semiconductor switching devices respectively 3401D and 3402D controlled by the microcontroller 240; wherein when the first LED load 1501 and the second LED load 1502 are configured with same color temperature both the FIG. 1C and FIG. 1D are used for performing a multi-level LED security light to operate a light intensity tuning to perform different illumination levels respectively controlled by the light sensing control unit 120, the motion sensing unit 130 and the external control unit 160, wherein when the N number LEDs and the M number LEDs are configured with different color temperatures, for instances the N number LEDs 1501 of the light-emitting unit 150 are designed with a first color temperature in a range between 2000 K and 3000 K and the M number LEDs 1502 of the light-emitting unit 150 are designed with a second color temperature in a range between 4000 K and 6500 K, both FIG. 1C and FIG. 1D can be used for performing a color temperature tuning in addition to the light intensity tuning for operating the multi-level LED security light to mimic a natural daylight performed by the sunlight which operates both an automatic light intensity tuning and an automatic light color temperature tuning day by day from dawn to dusk. The light color temperature tuning can be designed to perform a dim to warm or a pure light color temperature tuning with a total light intensity remaining unchanged to meet various requirements of different light color temperatures for different evening activities during early evening after the office hours but before going steep; wherein the loading and power control unit 140 operates a power allocation function to divide a given total electric power T between a first electric power X allocated to the N number LEDs and a second electric power Y allocated to the M number LEDs to obtain a weighted color temperature being a mingled color temperature thru a light diffuser according to a color temperature tuning formula CTapp=CT1·X/(X+Y)+CT2·Y/(X+Y); wherein CT1 is a value of the first color temperature of the N number LEDs and CT2 is a value of the second color temperature of the M number LEDs, wherein for tuning to a lower mingled light color temperature, the loading and power control unit 140 activated by the external control unit 160 operates to control the switching circuitry to increase the first electric power X delivered to the first LED load and at the same time to decrease the second electric power Y delivered to the second LED load with the same pace such that a sum of the first electric power X and the second electric power Y remains essentially unchanged; wherein for tuning to a higher mingled light color temperature, the loading and power control unit 140 activated by the external control unit 160 operates to control the switching circuitry 340 to decrease the first electric power X delivered to the first LED load and at the same time to increase the second electric power Y delivered to the second LED load with the same pace such that a sum of the first electric power X and the second electric power Y remains essentially unchanged. Additionally the loading and power control unit 140 working in conjunction with the external control unit 160 may be configured with a light color temperature switching scheme comprising a plurality of different combinations of the first electric power X and the second electric power Y to operate a pick and play process for selecting a corresponding mingled light color temperature performance in the light color temperature switching scheme.

Figure 2A:
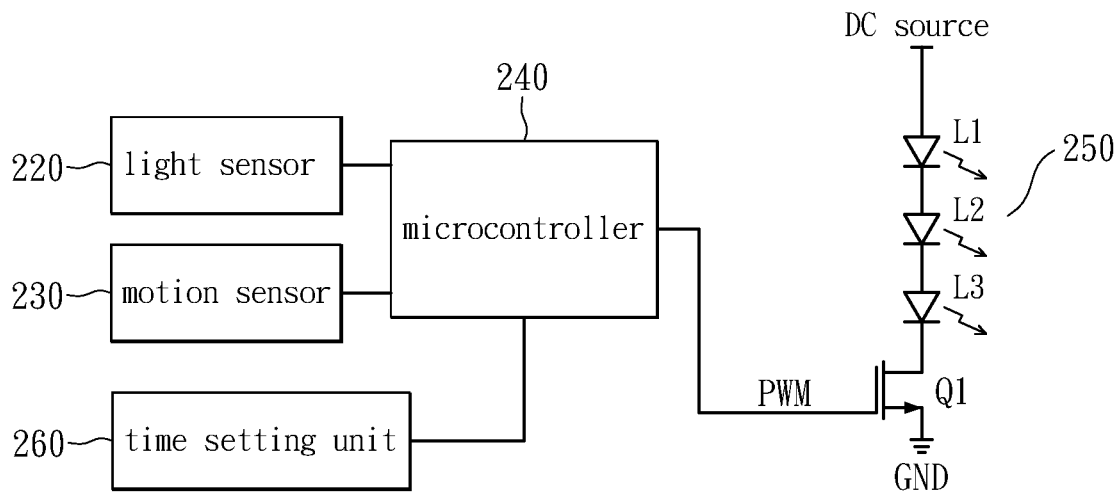
FIG. 2A illustrates a schematic diagram of a two-level LED security light in accordance with the first exemplary embodiment of the present disclosure.

Refer to FIG. 2A, which illustrates a schematic diagram of a multi-level LED security light in accordance to the first exemplary embodiments of the present disclosure. The light sensing control unit 120 may be implemented by a light sensor 220; the motion sensing unit 130 may be implemented by a motion sensor 230; the loading and power control unit 140 may be implemented by a microcontroller 240 and a switching circuitry 340 configured with a unidirectional semiconductor switching device Q1 (3402). The unidirectional semiconductor switching device 3402 is electrically connected between a DC power source of the power supply unit and a light-emitting unit 250. The light-emitting unit 250 includes at least three series-connected LEDs L1-L3. The transistor Q1 (the switching circuitry 340) is electrically connected in series with the DC power source and the light-emitting unit 250, wherein the DC source may be provided by the power supply unit 110. The transistor Q1 may be an N-channel metal-oxide-semiconductor field-effect-transistor (NMOS). The loading and power control unit 140 implemented by the microcontroller 240 may output a pulse width modulation (PWM) signal to the gate of transistor Q1 to control the average electric current. It is worth to note that the electric components depicted in FIG. 2A only serves as an illustration for the exemplary embodiment of the present disclosure and hence the present disclosure is not limited thereto.

Figure 2B:
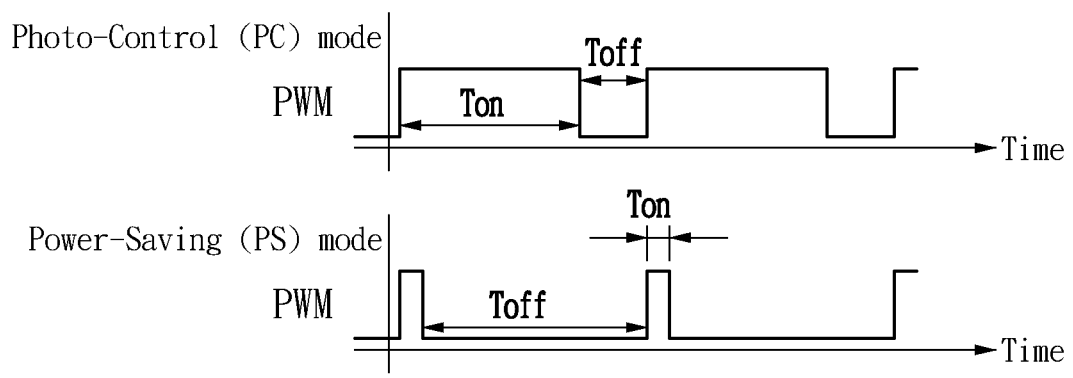
FIG. 2B graphically illustrates a timing waveform of a pulse width modulation (PWM) signal in accordance with the first exemplary embodiment of the present disclosure.

Refer to FIG. 2B concurrently, which graphically illustrates a timing waveform of a pulse width modulation (PWM) signal in accordance to the first exemplary embodiment of the present disclosure. In the PC mode, the PWM signal may be used to configure the transistor Q1 to have the conduction period $T_{on}$ being equal to/or longer than the cut-off period $T_{off}$. On the other hand in the PS mode, the PWM signal may configure the transistor Q1 to have the conduction period $T_{on}$ being shorter than the cut-off period $T_{off}$. In comparison of the illumination levels between the PC and PS modes, as the conduction period $T_{on}$ of transistor Q1 being longer under the PC mode, therefore have higher average electric current driving the light-emitting unit 250 thereby generate a high illumination, which may be classified as the first level illumination; whereas as the conduction period $T_{on}$ of transistor Q1 is shorter in the PS mode, therefore have lower average electric current driving the light-emitting unit 250 thereby generate a low illumination, which may be classified as the second level illumination.

The microcontroller 240 turns off the light-emitting unit 250 during the daytime and activates the PC mode at nighttime by turning on the light-emitting unit 250 to generate the first level illumination for a first predetermined time duration then to switch to the second level illumination thereby entering the PS mode. When the motion sensor 230 detects a human motion in the PS mode, the light-emitting unit 250 may switch to a third level illumination for a higher visibility illumination or for a warning application. The light-emitting unit 250 may return to the second level illumination after maintaining at the third level illumination for a third predetermined time duration which is shorter than the first predetermined time duration and the second predetermined time duration to save energy.

In addition, the microcontroller 240 is coupled to a time Setting unit 260, wherein the time setting unit 260 may allow the user to configure at least a time length of the first predetermined time duration associated with the first level illumination, the second predetermined time duration of the second level illumination, or the third predetermined time duration of the third level illumination, however the present disclosure is not limited thereto. The time setting unit is a type of external control units designed to process various external control signals interpretable by the controller for setting at least a time length setting for various illumination modes.

Second Exemplary Embodiment

Refer again to FIG. 1, wherein illumination variations of the light-emitting unit 150 may be implemented through the number of light-source loads being turned on to generate more than two levels of illumination. The lighting apparatus 100 in the present exemplary embodiment may be through turning on a portion of LEDs or all the LEDs to generate a first or a second level of illuminations.

Figure 3A:
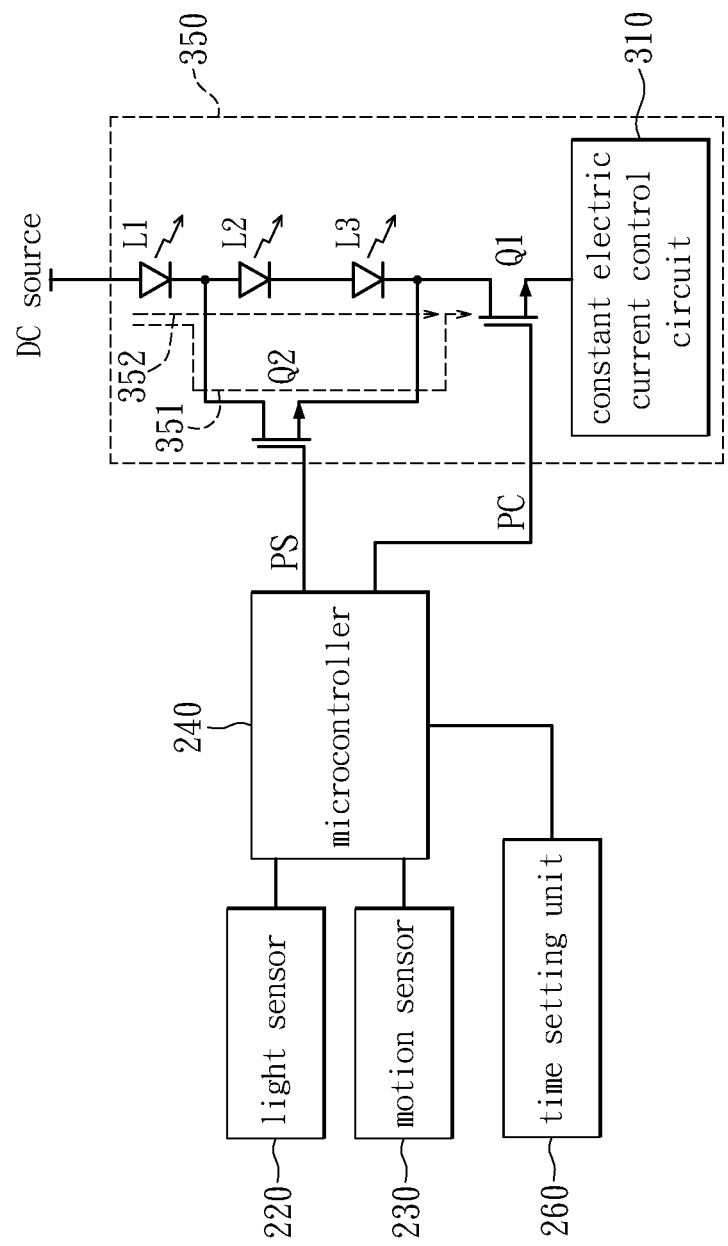
FIG. 3A illustrates a schematic diagram of a two-level LED security light in accordance with the second exemplary embodiment of the present disclosure.

Refer to FIG. 3A concurrently, which illustrates a schematic diagram of a multi-level LED security light 100 in accordance to the second exemplary embodiment of the present disclosure. The main difference between FIG. 3A and FIG. 2A is in the light-emitting unit 350, having three series-connected LEDs L1~L3 and NMOS transistors Q1 and Q2, wherein the switching circuitry 340 comprises two unidirectional semiconductor switching devices Q1 and Q2. The LEDs L1~L3 are in-series connected to the transistor Q1 at same time connected to a constant electric current control circuit 310. Moreover, transistor Q2 is in-parallel connected to the two ends associated with LEDs L2 and L3. The gates of the transistors Q1 and Q2 are connected respectively to a pin PC and a pin PS of the microcontroller 240. The constant electric current control circuit 310 in the present exemplary embodiment maintains the electric current in the activated LED at a constant value, namely, the LEDs L1~L3 are operated in constant-current mode.

Refer to FIG. 3A, the pin PC of the microcontroller 240 controls the switching operations of the transistor Q1; when the voltage level of pin PC being either a high voltage or a low voltage, the transistor Q1 may conduct or cut-off, respectively, to turn the LEDs L1~L3 on or off. The pin PS of the microcontroller 240 controls the switch operations of the transistor Q2, to form two current paths 351 and 352 on the light-emitting unit 350. When the voltage at the pin PS of the microcontroller 240 is high, the transistor Q2 conducts, thereby forming the current path 351 passing through the LED L1 and the transistor Q2; when the voltage at the pin PS being low, the transistor Q2 cuts-off, thereby forming the current path 352 passing through all the LEDs L1~L3. The microcontroller 240 may then control the switching operation of the transistor Q2 to turn on the desired number of LEDs so as to generate a high or a low level illumination.

When light sensor 220 detects that the ambient light is higher than a predetermined value, the microcontroller 240 through the pin PC outputs a low voltage, which causes the transistor Q1 to cut-off and turns off all the LEDs L1~L3 in the light-emitting unit 350. Conversely, when the light sensor 220 detects that the ambient light is lower than the predetermined value the microcontroller 240 activates the PC mode, i.e., outputting a high voltage from pin PC and a low voltage from pin PS, to activate the transistor Q1 while cut-off the transistor Q2, thereby forming the current path 352, to turn on the three LEDs L1~L3 in the light-emitting unit 350 so as to generate the high level illumination for a first predetermined time duration. After the first predetermined time duration, the microcontroller 240 may switch to the PS mode by having the pin PC continue outputting a high voltage and the pin PS outputting a high voltage, to have the transistor Q2 conducts, thereby forming the current path 351. Consequently, only the LED L1 is turned on and the low level illumination is generated.

Figure 3B:
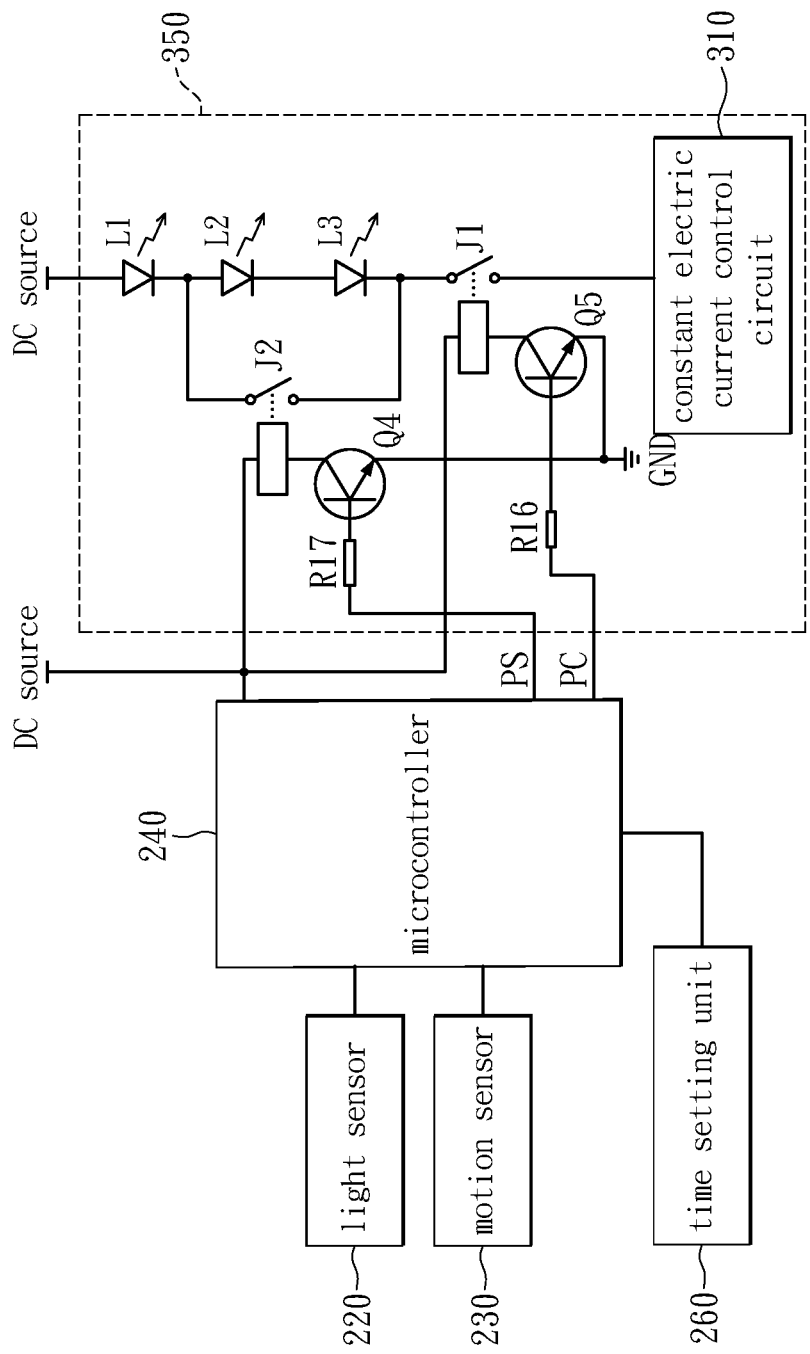
FIG. 3B illustrates a schematic diagram of a two-level LED security light in accordance with the second exemplary embodiment of the present disclosure.

When the motion sensor detects a human motion in the PS mode, the pin PS of the microcontroller 240 temporarily switches from the high voltage to a low voltage, to have the transistor Q2 temporarily cuts-off thus forming the current path 352 to activate all the LEDs in the light-emitting unit 350, thereby temporarily generates another high level illumination. The light-emitting unit 350 is driven by a constant electric current, therefore the illumination level generated thereof is directly proportional to the number of LEDs activated. FIG. 3B illustrates another implementation for FIG. 3A, wherein the relays J1 and J2 are used in place of NMOS transistors to serve as switches. The microcontroller 240 may control the relays J2 and J1 through regulating the switching operations of the NPN bipolar junction transistors Q4 and Q5. Moreover, resistors R16 and R17 are current-limiting resistors.

In the PC mode, the relay J1 being pull-in while the relay J2 bounce off to have constant electric current driving all the LEDs L1~L3 to generate the high level illumination; in PS mode, the relays J1 and J2 both pull-in to have constant electric current only driving the LED L1 thus the low level illumination may be thereby generated. Furthermore, when the motion sensor 230 detects a human motion, the pin PS of the microcontroller 240 may temporarily switch from high voltage to low voltage, forcing the relay J2 to temporarily bounce off and the relay J1 pull-in so as to temporarily generate the high level illumination.

The LED L1 may adopt a LED having a color temperature in a range between 2000K and 3000K, while the LEDs L2 and L3 may adopt LEDs having a color temperature between 4000K and 6500K in order to increase the contrast between the high level and the low level illuminations. The number of LEDs included in the light-emitting unit 350 may be more than three, for example five or six LEDs. The transistor Q2 may be relatively parallel to the two ends associated with a plurality of LEDs to adjust the illumination difference between the high and the low illumination levels. Additionally, the light-emitting unit 350 may include a plurality of transistors Q2, which are respectively coupled to the two ends associated with each LED to provide more lighting variation selections. The microcontroller 240 may decide the number of LEDs to turn on in accordance to design needs at different conditions. Based on the explanation of the aforementioned exemplary embodiment, those skills in the art should be able to deduce other implementation and further descriptions are therefore omitted.

Third Exemplary Embodiment

Refer back to FIG. 1, wherein the light-emitting unit 150 may include a phase controller and one or more in-parallel connected alternating current (AC) LEDs. The phase controller is coupled between the described one or more parallel-connected ACLEDs and AC power source. The loading and power controller 140 in the present exemplary embodiment may through the phase controller adjust the average power of the light-emitting unit 150 so as to generate variations in the low level and the high level illuminations.

Figure 4A:
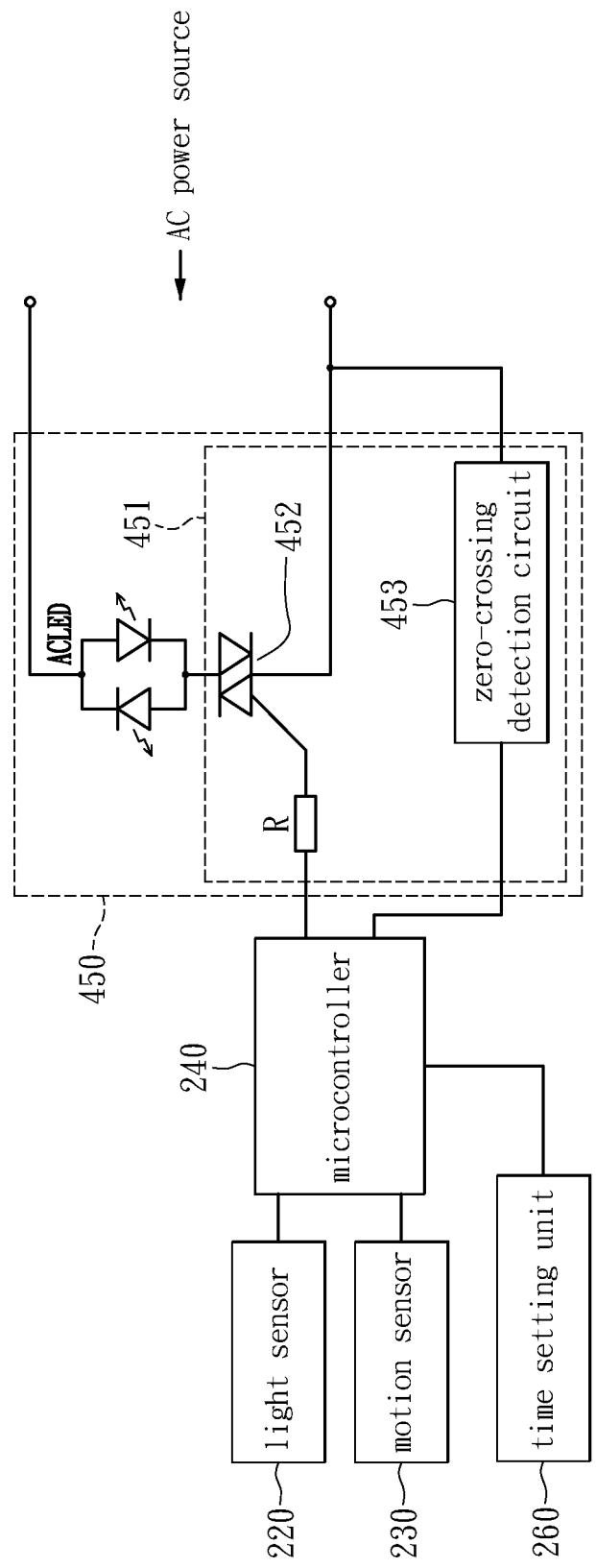
FIG. 4A illustrates a schematic diagram of a two-level LED security light in accordance with the third exemplary embodiment of the present disclosure.

Refer to FIG. 4A, which illustrates a schematic diagram of a multi-level LED security light 100 in accordance to the third exemplary embodiment of the present disclosure. The main difference between FIG. 4A and FIG. 3 is in that the light-source load is an ACLED, which is coupled to the AC power source, and the switching circuitry is configured with a phase controller 451. The phase controller 451 includes a bi-directional switching device 452, here, a triac, a zero-crossing detection circuit 453, and a resistor R. The microcontroller 240 turns off the light-emitting unit 450 when the light sensor 220 detects that the ambient light is higher than a predetermined value. Conversely, when the light sensor 220 detects that the ambient light is lower than the predetermined value, the microcontroller 240 activates the PC mode by turning on the light-emitting unit 450. In the PC mode, the microcontroller 240 may select a control pin for outputting a pulse signal which through a resistor R triggers the triac 452 to have a large conduction angle. The large conduction angle configures the light-emitting unit 450 to generate a high level illumination for a predetermined time duration. Then the microcontroller 240 outputs the pulse signal for PS mode through the same control pin to trigger the triac 452 to have a small conduction angle for switching the light-emitting unit 450 from the high level illumination to a low level illumination of the PS mode. Moreover, when the motion sensor 230 (also called motion sensing unit) detects a human motion in the PS mode, the microcontroller 240 temporarily outputs another pulse signal through the same control pin to have the light-emitting unit 450 generated another high level illumination for a short predetermined time duration. After the short predetermined time duration, the light-emitting unit 450 returns to the low level illumination.

In the illumination control of the ACLED, the microcontroller 240 may utilize the detected zero-crossing time (e.g., the zero-crossing time of an AC voltage waveform) outputted from the zero-crossing detection circuit 453 to send an AC synchronized pulse signal thereof which may trigger the triac 452 of the phase controller 451 thereby to change the average power input to the light-emitting unit 450. As the ACLED has a cut-in voltage $V_t$ for start conducting, thus if the pulse signal inaccurately in time triggers the conduction of the triac 452, then the instantaneous value of AC voltage may be lower than the cut-in voltage $V_t$ of ACLED at the trigger pulse. Consequently, the ACLED may result in the phenomenon of either flashing or not turning on. Therefore, the pulse signal generated by the microcontroller 240 must fall in a proper time gap behind the zero-crossing point associated with the AC sinusoidal voltage waveform.

Supposing an AC power source having a voltage amplitude $V_m$ and frequency f, then the zero-crossing time gap $t_D$ of the trigger pulse outputted by the microcontroller 240 should be limited according to $t_o < t_D < \frac{1}{2}f - t_o$ for a light-source load with a cut-in voltage $V_t$, wherein $t_o = (1/2\pi f)\sin^{-1}(V_t/V_m)$. The described criterion is applicable to all types of ACLEDs to assure that the triac 452 can be stably triggered in both positive and negative half cycle of the AC power source. Take ACLED with $V_t(rms)=80V$ as an example, and supposing the $V_m(rms)=110V$ and f=60 Hz, then $t_o=2.2$ ms and ($\frac{1}{2}f$)=8.3 ms may be obtained. Consequently, the proper zero-crossing time gap $t_D$ associated with the phase modulation pulse outputted by the microcontroller 240 which lagged the AC sinusoidal voltage waveform should be designed in the range of 2.2 ms<$t_D$<6.1 ms.

Figure 4B:
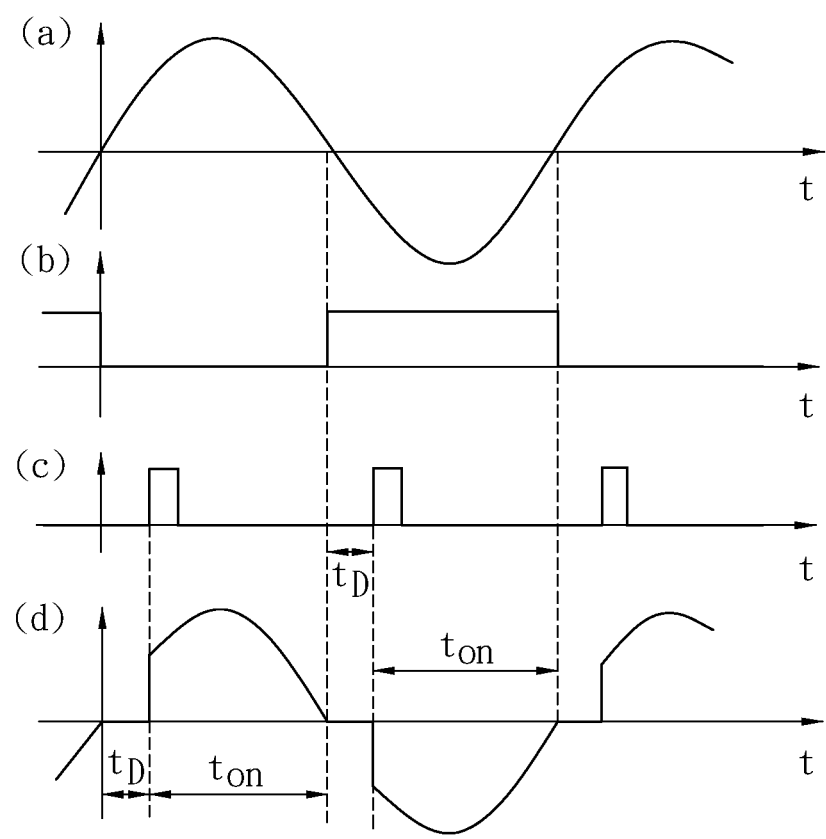
FIG. 4B illustrates a timing waveform of two-level LED security light in accordance with the third exemplary embodiment of the present disclosure.

Refer to FIG. 4B, which illustrates a timing waveform of the two-level LED security light in accordance with the third exemplary embodiment of the present disclosure. Waveforms (a)~(d) of FIG. 4B respectively represent the AC power source, the output of the zero-crossing detection circuit 453, the zero-crossing delay pulse at the control pin of the microcontroller 240, and the voltage waveform across the two ends of the ACLED in the light-emitting unit 450. The zero-crossing detection circuit 453 converts the AC voltage sinusoidal waveform associated with the AC power source to a symmetric square waveform having low and high voltage levels as shown in FIG. 4B(b). At the zero-crossing point of the AC voltage sinusoidal wave, the symmetric square waveform may transit either from the low voltage level to the high voltage level or from the high voltage level to the low voltage level. Or equivalently, the edge of the symmetric square waveform in the time domain corresponds to the zero-crossing point of the AC voltage sinusoidal waveform. As shown in FIG. 4B(c), the microcontroller 240 outputs a zero-crossing delay pulse in correspondence to the zero-crossing point of the AC sinusoidal waveform in accordance with the output waveform of the zero-crossing detection circuit 453. The zero-crossing delay pulse is relative to an edge of symmetric square waveform behind a time gap $t_D$ in the time domain. The $t_D$ should fall in a valid range, as described previously, to assure that the triac 452 can be stably triggered thereby to turn on the ACLED. FIG. 4B(d) illustrates a voltage waveform applied across the two ends associated with the ACLED. The illumination level of the light-emitting unit 450 is related to the conduction period $t_{on}$ of the ACLED, or equivalently, the length $t_{on}$ is directly proportional to the average power inputted to the ACLED. The difference between the PC mode and the PS mode being that in the PC mode, the ACLED has longer conduction period, thereby generates the high level illumination; whereas in the PS mode, the ACLED conduction period is shorter, hence generates the low level illumination.

Figure 5:
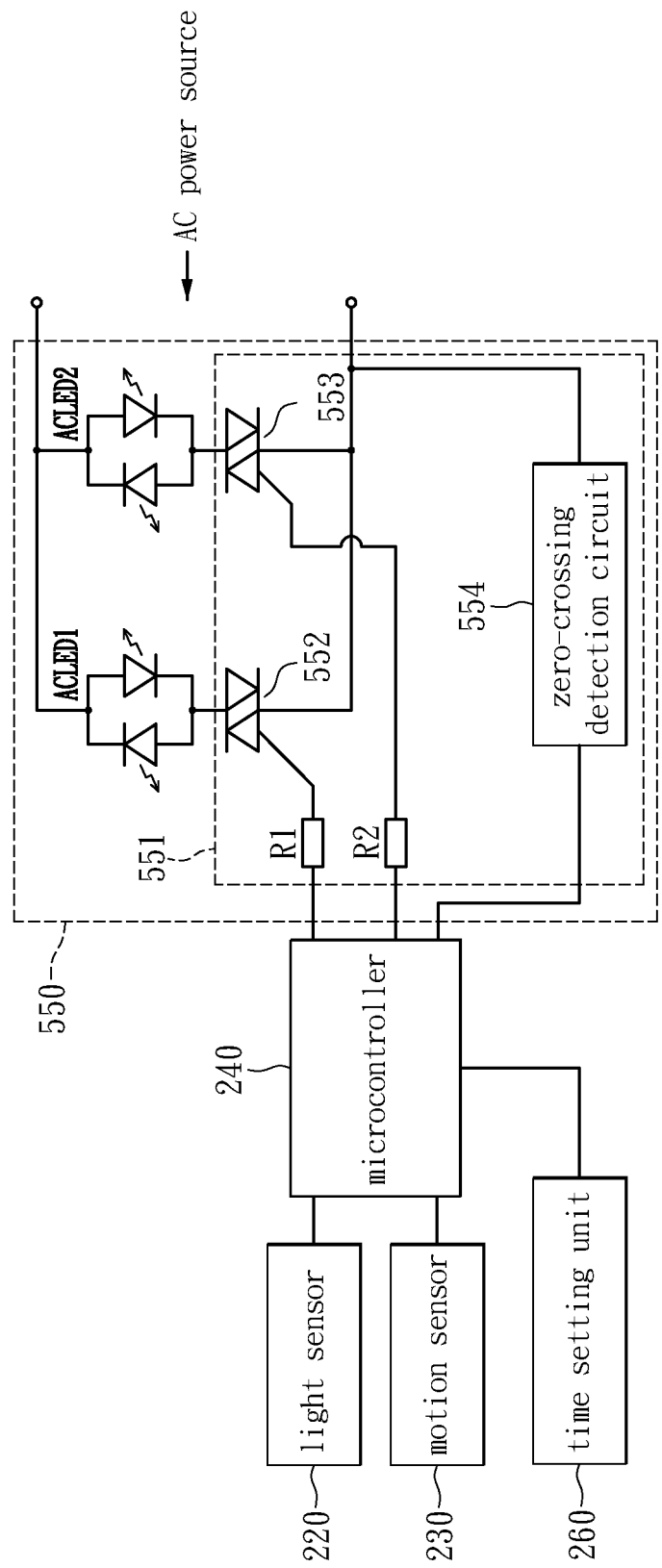
FIG. 5 illustrates a schematic diagram of a two-level LED security light in accordance with the third exemplary embodiment of the present disclosure.

Refer to FIG. 5, which illustrates a schematic diagram of a two-level LED security light 100 in accordance with the third exemplary embodiment of the present disclosure. The light-emitting unit 550 of the lighting apparatus 100 includes an ACLED1, an ACLED2, and a phase controller 551. The phase controller 551 includes triacs 552 and 553, the zero-crossing detection circuit 554 as well as resistors R1 and R2. The light-emitting unit 550 of FIG. 5 is different from the light-emitting unit 450 of FIG. 4 in that the light-emitting unit 550 has more than one ACLEDs and more than one bi-directional switching devices. Furthermore, the color temperatures of the ACLED1 and the ACLED2 may be selected to be different.

In the exemplary embodiment of FIG. 5, the ACLED1 has a high color temperature, and the ACLED2 has a low color temperature. In the PC mode, the microcontroller 240 uses the phase controller 551 to trigger both ACLED1 and ACLED2 to conduct for a long period, thereby to generate the high level illumination as well as illumination of mix color temperature. In the PS mode, the microcontroller 240 uses the phase controller 551 to trigger only the ACLED2 to conduct for a short period, thereby generates the low level illumination as well as illumination of low color temperature. Moreover, in the PS mode, when the motion sensor 230 detects a human motion, the microcontroller 240 may through the phase controller 551 trigger the ACLED1 and ACLED2 to conduct for a long period. Thereby, it may render the light-emitting unit 450 to generate the high level illumination of high color temperature and to produce high contrast in illumination and hue, for a short predetermined duration to warn the intruder. Consequently, the lighting apparatus may generate the high level or the low level illumination of different hue. The rest of operation theories associated with the light-emitting unit 550 are essentially the same as the light-emitting unit 450 and further descriptions are therefore omitted.

Fourth Exemplary Embodiment

Figure 6:
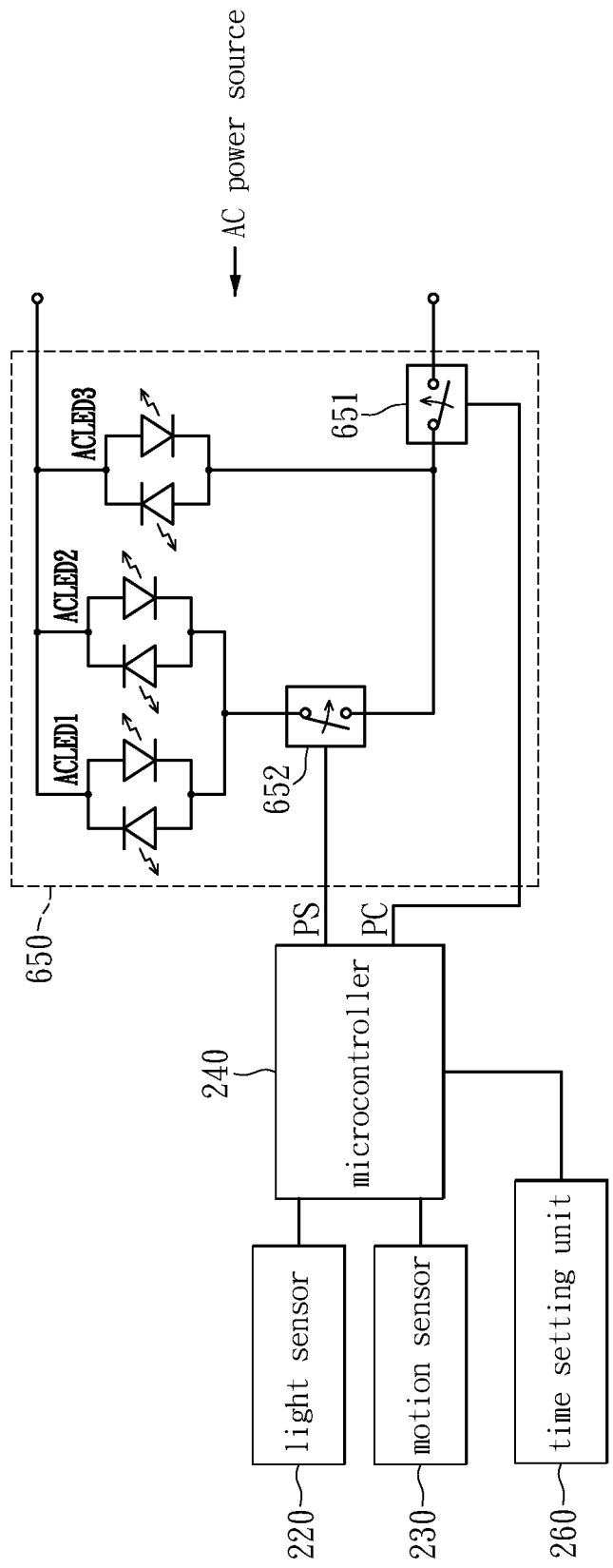
FIG. 6 illustrates a schematic diagram of a two-level LED security light in accordance with the fourth exemplary embodiment of the present disclosure.

Refer to FIG. 6, which illustrates a schematic diagram of a two-level LED security light 100 in accordance with the fourth exemplary embodiment of the present disclosure. The light-emitting unit 150 of FIG. 1 may be implemented by the light-emitting unit 650, wherein the light-emitting unit 650 includes three ACLED1~3 having identical luminous power as well as switches 651 and 652. In which, switches 651 and 652 may be relays. The parallel-connected ACLED1 and ACLED2 are series-connected to the switch 652 to produce double luminous power, and of which the ACLED3 is parallel connected to, to generate triple luminous power, and of which an AC power source is further coupled to through the switch 651. Moreover, the microcontroller 240 implements the loading and power control unit 140 of FIG. 1. The pin PC and pin PS are respectively connected to switches 651 and 652 for outputting voltage signals to control the operations of switches 651 and 652 (i.e., open or close).

In the PC mode, the pin PC and pin PS of the microcontroller 240 control the switches 651 and 652 to be closed at same time. Consequently, the ACLED1~3 are coupled to the AC power source and the light-emitting unit 650 may generate a high level illumination of triple luminous power. After a short predetermined duration, the microcontroller 240 returns to PS mode. In which the switch 651 is closed while the pin PS controls the switch 652 to be opened, consequently, only the ACLED3 is connected to AC power source, and the light-emitting unit 650 may thus generate the low level illumination of one luminous power. In the PS mode, when the motion sensor 230 detects a human motion, the microcontroller 240 temporarily closes the switch 652 to generate high level illumination with triple luminous power for a predetermined duration. After the predetermined duration, the switch 652 returns to open status thereby to generate the low level illumination of one luminous power. The lighting apparatus of FIG. 6 may therefore through controlling switches 651 and 652 generate two level illuminations with illumination contrast of at least 3 to 1.

The ACLED1 and ACLED2 of FIG. 6 may be high power lighting sources having a color temperature in a range between 4000K and 6500K. The ACLED3 may be a low power lighting source having a color temperature between 2000K and 3000K. Consequently, the ACLED may generate two levels of illuminations with high illumination and hue contrast without using a zero-crossing detection circuit.

Fifth Exemplary Embodiment

Figure 7:
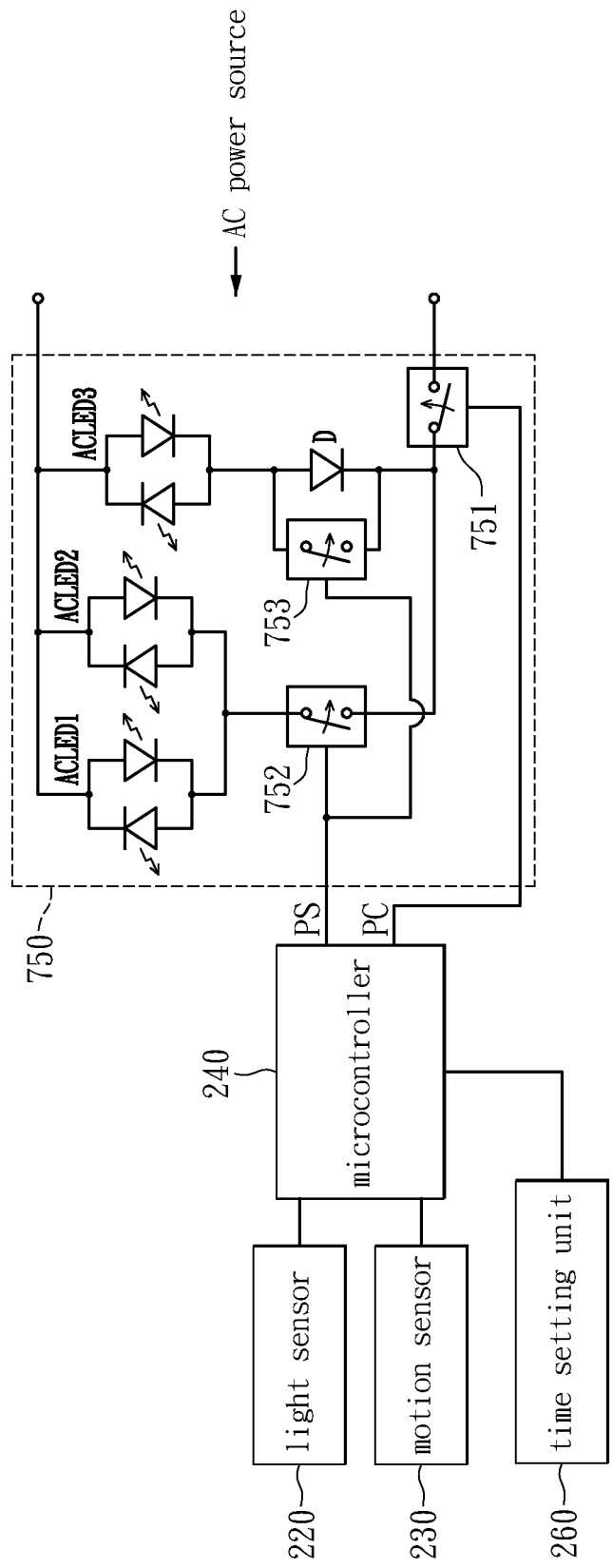
FIG. 7 illustrates a schematic diagram of a two-level LED security light in accordance with the fifth exemplary embodiment of the present disclosure.
Figure 8A:
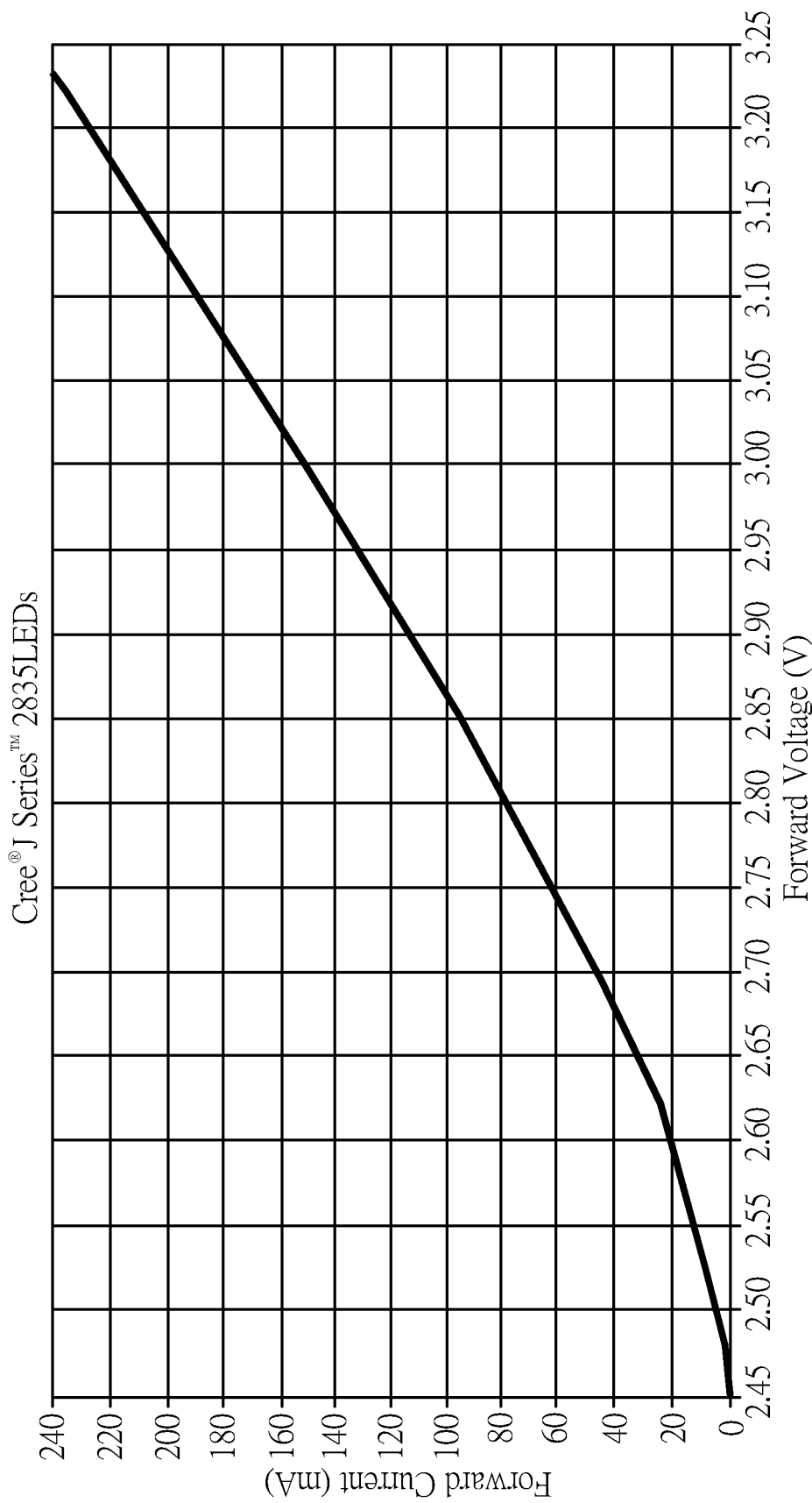
FIGS. 8A, 8B, 8C and 8D schematically and respectively show V-I relationship charts (Forward Current vs. Forward Voltage) for a white LED chip from each of 4 different LED manufacturers.
Figure 8B:
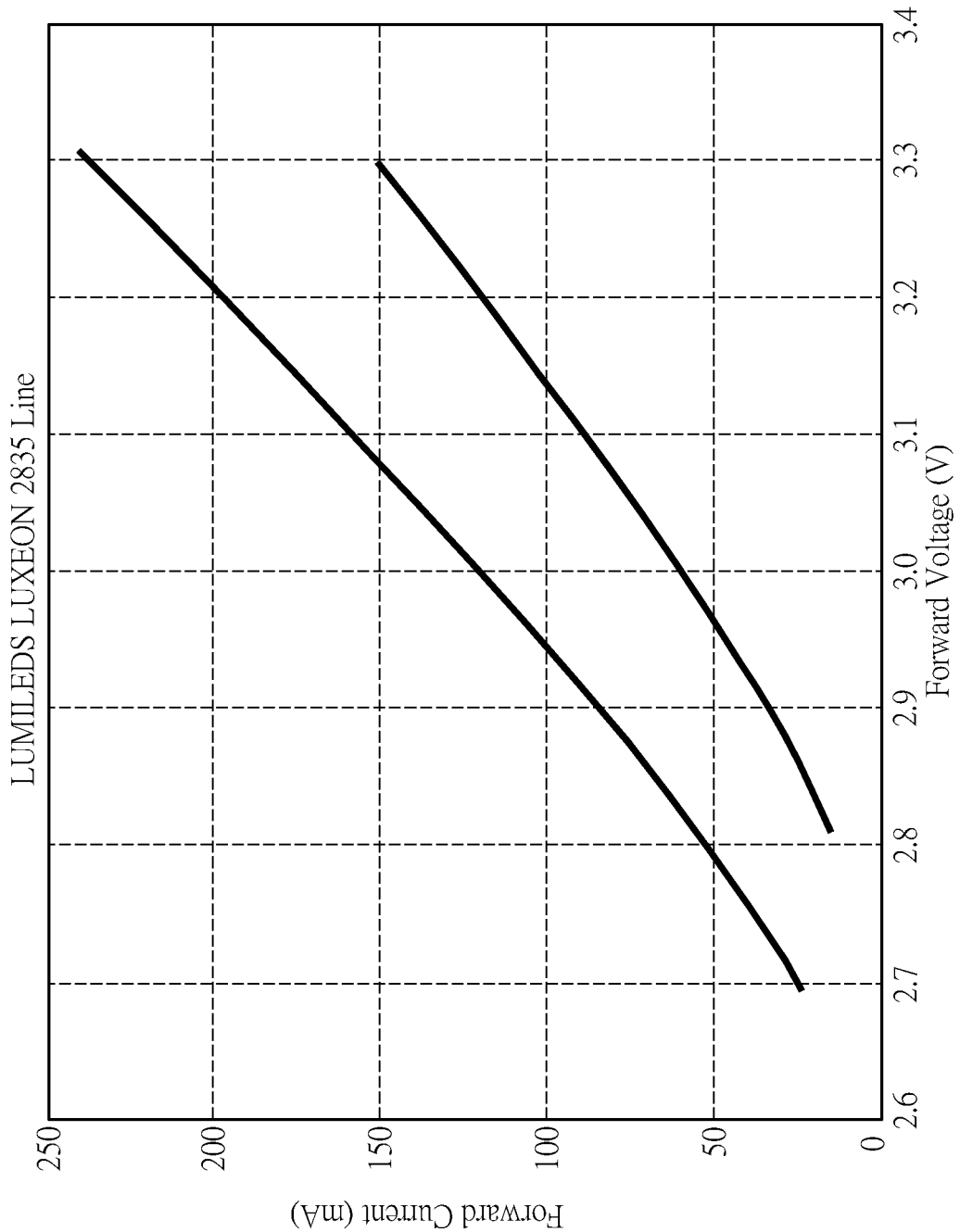
Figure 8C:
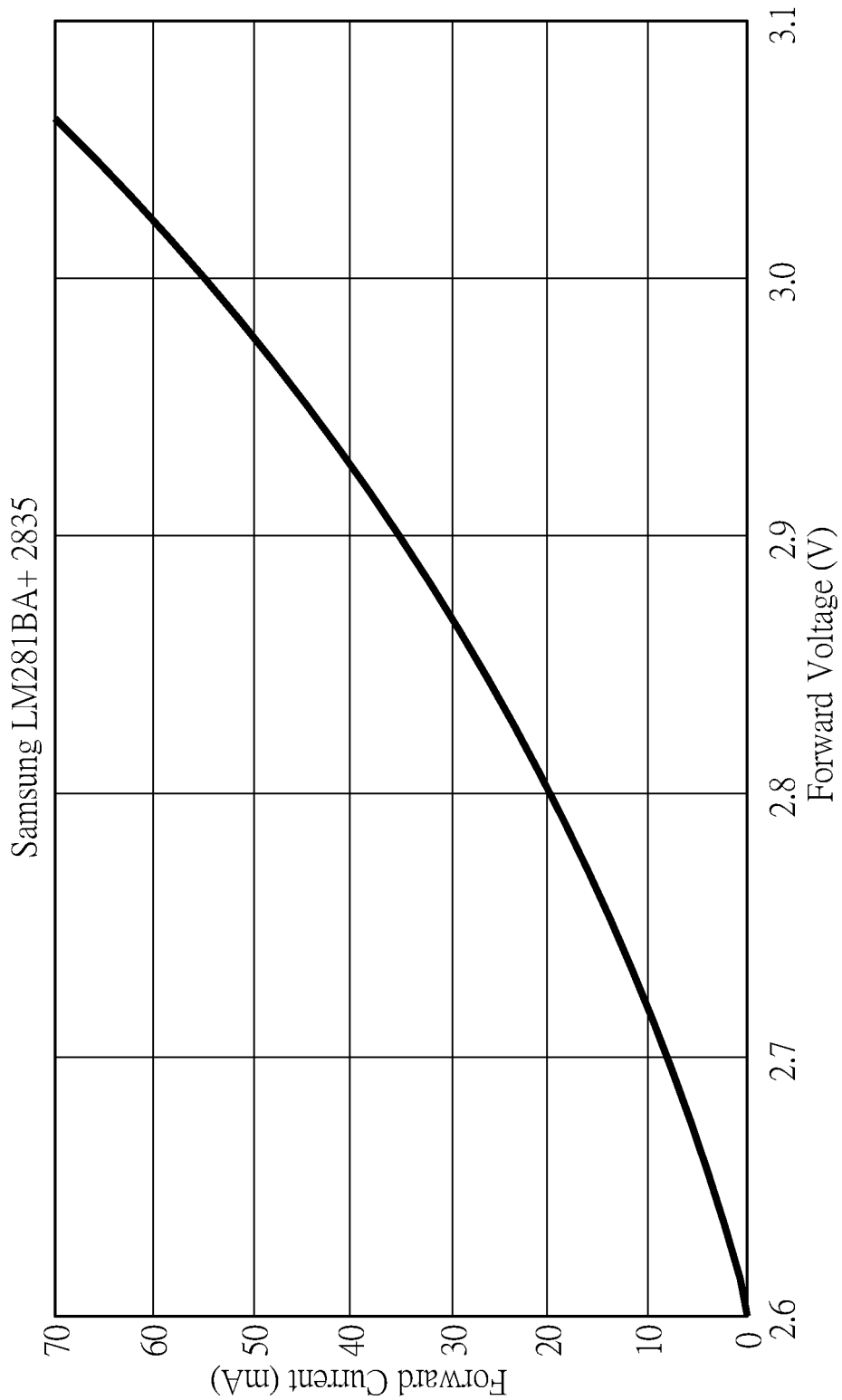
Figure 8D:
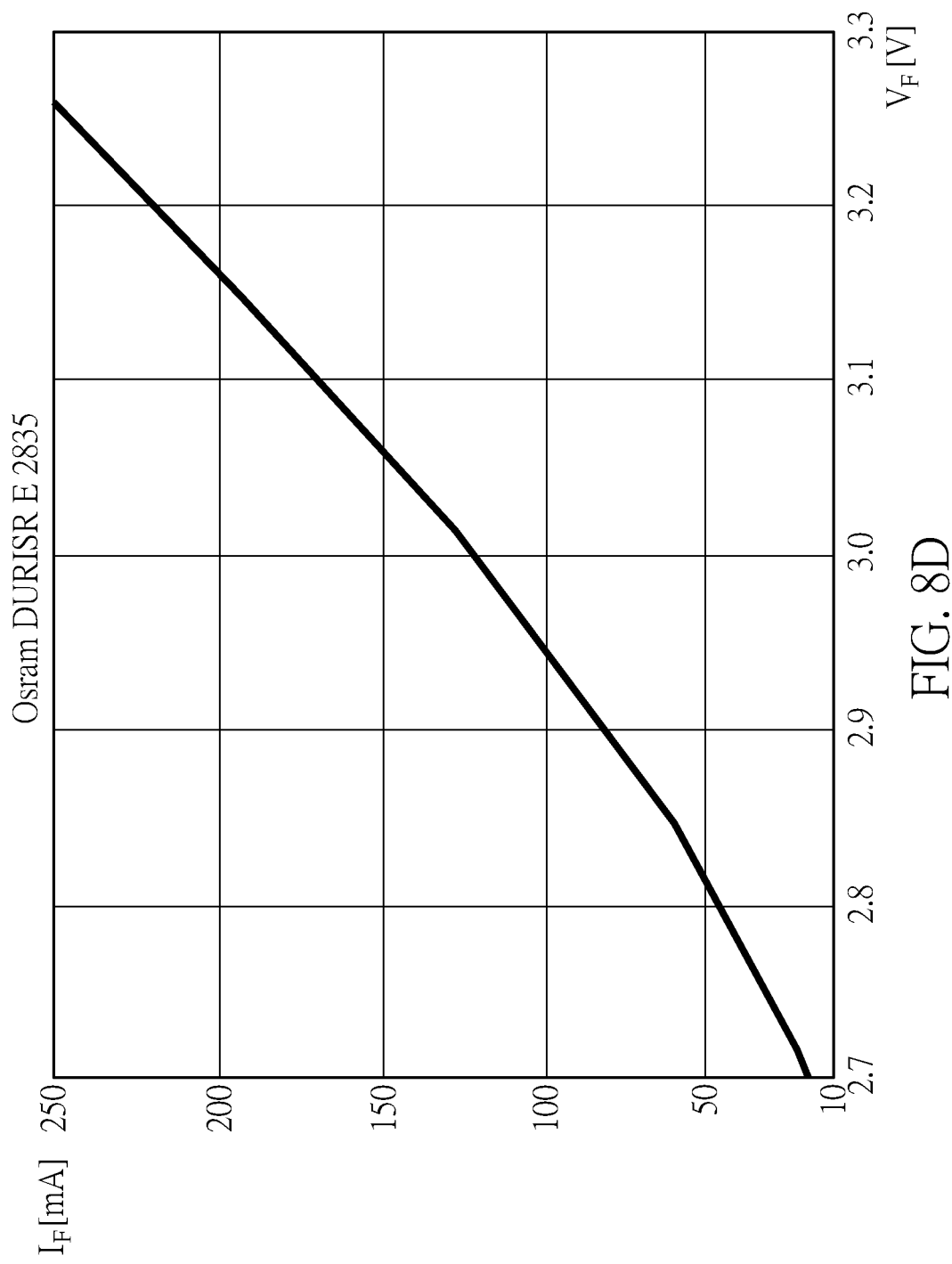

Refer to FIG. 7, which illustrates a schematic diagram of a two-level LED security light in accordance with the fifth exemplary embodiment of the present disclosure. The light-emitting unit 750 of FIG. 7 is different from the light-emitting unit 640 of FIG. 6 in that the ACLED3 is series-connected to a circuit with a rectified diode D and a switch 753 parallel-connected together, and of which is further coupled through a switch 751 to AC power source. When the switch 753 closes, the AC electric current that passes through the ACLED3 may be a full sinusoidal waveform. When the switch 753 opens, the rectified diode rectifies the AC power, thus only one half cycle of the AC electric current may pass through the ACLED, consequently the luminous power of ACLED3 is cut to be half.

The pin PS of the microcontroller 240 synchronously controls the operations of switches 752 and 753. If the three ACLED1~3 have identical luminous power, then in the PC mode, the pin PC and pin PS of the microcontroller 240 synchronously close the switches 751~753 to render ACLED1~3 illuminating, thus the light-emitting unit 750 generates a high level illumination which is three-times higher than the luminous power of a single ACLED. When in the PS mode, the microcontroller 240 closes the switch 751 while opens switches 752 and 753. At this moment, only the ACLED3 illuminates and as the AC power source is rectified by the rectified diode D, thus the luminous power of ACLED3 is half of the AC power source prior to the rectification. The luminous power ratio between the high level and the low level illuminations is therefore 6 to 1. Consequently, strong illumination contrast may be generated to effectively warn the intruder.

It should be noted that the light-emitting unit in the fifth exemplary embodiment is not limited to utilizing ACLEDs. In other words, the light-emitting unit may include any AC lighting sources such as ACLEDs, incandescent lamps, or fluorescent lamps.

When the light source of the light-emitting unit 150 is confined to the use of an LED load, the compliance and satisfaction of a voltage operating constraint attributable to the unique electrical characteristics of the LED load is vital to a successful performance of an LED lighting device. Any LED lighting device failing to comply with the voltage operating constraint of the unique electrical characteristics is bound to become a trouble art. This is because the LED as a kind of solid state light source has completely different electrical characteristics for performing light emission compared with conventional light source such as incandescent bulbs or fluorescent bulbs.

For instance, for a white light LED or blue light LED there exists a very narrow voltage domain ranging from a threshold voltage at around 2.5 volts to a maximum operating voltage at around 3.5 volts, which allows the LEDs to operate adequately and safely; in other words, when a forward voltage imposed on the LED is lower than the threshold voltage, the LED is not conducted and therefore no light is emitted, when the forward voltage exceeds the maximum operating voltage, the heat generated by a forward current could start damaging the construction of the LED. Therefore, the forward voltage imposed on the LED is required to operate between the threshold voltage and the maximum operating voltage. In respect to the LED load of the light-emitting unit 150, the cut-in voltage $V_t$ of ACLEDs is technically also referred to as the threshold voltage attributable to PN junctions manufactured in LEDs. More specifically, the LED is made with a PN junction semiconductor structure inherently featured with three unique electrical characteristics, the first characteristic is one-way electric conduction through the PN junction fabricated in the LED, the second electrical characteristic is a threshold voltage $V_{th}$ required to trigger the LED to start emitting light and the third electrical characteristic is a maximum operating voltage $V_{max}$ allowed to impose on the LED to avoid a thermal runaway to damage or burn out the semiconductor construction of the LED. The described cut-in voltage $V_t$ has the same meaning as the above mentioned threshold voltage $V_{th}$ which is a more general term to be used for describing the second electrical characteristic of a PN junction semiconductor structure. Also, because the cut-in voltage $V_t$ is specifically tied to forming a formula to transform the threshold voltage into a corresponding time phase of AC power for lighting control, it is necessary to use the term $V_{th}$ as a neutral word for describing the LED electrical characteristics to avoid being confused with the specific application for ACLED alone. Additionally, it is to be clarified that the term Vm is related to the amplitude of the instant maximum voltage of an AC power source which has nothing to do with the third electrical characteristic $V_{max}$ of an LED load.

An LED chip is a small piece of semiconductor material with at least one LED die manufactured inside the semiconductor material. A plurality of LED dies may be manufactured and packaged inside an LED chip for different levels of wattage specification to meet different illumination need. The LED die can also be designed with a larger size of PN junction such that a higher forward current can be generated for higher wattage applications without damaging the LED structure but in such case less quantity of LED dies can be produced from each wafer. For each LED chip designed with a different level of wattage specification there always exists a narrow voltage domain $V_{th}<V<V_{max}$, wherein V is a voltage across each LED chip, wherein $V_{th}$ is the threshold voltage to enable the LED chip to start emitting light and $V_{max}$ is the maximum operating voltage imposed on the LED chip to avoid the LED chip from being damaged or burned out by the heat generated by the high operating voltage at $V_{max}$. Such voltage constraints are attributable to the different semiconductor materials used, different manufacturing and packaging processes employed. Although the values of threshold voltage and maximum operating voltage may vary within a narrow dispersion of distribution among LEDs produced from different manufacturers, they can be represented by some reference values which are learned from cumulation of manufacturing and practicing experiences by the LED manufacturers. The reference values are necessary and useful to serve as guidelines for designing LED driver to ensure an LED voltage bin selected does comply with the narrow voltage domain $V_{th}<V<V_{max}$ for generating a constant forward current to produce a designated light intensity.

LED dies are batch-produced by wafers and each wafer is designed to produce a large quantity of LED dies which may respectively require different forward voltages within a narrow distribution range for generating a designated forward current. For instance if a batch of #2835 0.5 watt LED dies are used to generate a designated forward current at 150 mA, among the batch of LED dies produced from the same manufacturer, there exists a distribution range of required forward voltages from 2.9 volts (Minimum Forward Voltage, $V_{FMIN}$) to 3.3 volts (Maximum Forward Voltage, $V_{FMAX}$) to generate the same designated forward current, the batch of LED dies is further divided and grouped by the manufacturer into a few voltage bins with each voltage bin having a much smaller subrange of forward voltages bounded by a bin minimum forward voltage $V_{BMIN}$ and a bin maximum forward voltage $V_{BMAX}$ for generating the same forward current. For instance, the distribution range may be divided into four voltage bins with a first bin accommodating a forward voltage subrange from 2.9 volts to 3.0 volts, a second voltage bin accommodating a forward voltage subrange from 3.0 volts to 3.1 volts, a third bin accommodating a forward voltage subrange from 3.1 volts to 3.2 volts, and a fourth bin accommodating a forward voltage subrange from 3.2 volts to 3.3 volts. The LED dies grouped in the first bin belong to the most efficient LED dies produced from the wafer as they only need lowest forward voltages to generate same designated forward current, then followed by the second bin, then followed by the third bin and then the fourth bin being the least efficient LED dies produced by the wafer as they need highest forward voltages to generate same forward current. LED manufacturers sell LED dies by voltage bins with each voltage bin containing a plurality of LED dies which requires different forward voltages to generate a designated forward current for emitting light. Such division of LED dies by voltage bins is necessitated in order to minimize a volatility of forward voltages for generating a designated constant forward current. Otherwise, a large swing of forward voltages between the maximum forward voltage $V_{FMAX}$ and the minimum forward voltage $V_{FMIN}$ could easily cause an LED load fail because the $V_{FMAX}$ required for driving the least efficient LED die(s) could be too close to or exceeding the maximum operating voltage $V_{max}$, which could cause the LED load damaged or burned out since all LED dies are electrically connected in series. In other words without the division of forward voltages by voltage bins it would be difficult to comply with the constraints of $V_{th}<V<V_{max}$. Similar bin arrangements are also applicable to color temperature performance and brightness performance for LED dies produced from a wafer. Generally speaking, LED bins with lower forward voltages can be priced higher than LED bins with higher forward voltages. Both the minimum forward voltage $V_{BMIN}$ and the maximum forward voltage $V_{BMAX}$ in each bin selected are required to comply with voltage operating constraint $V_{th}<V<V_{max}$, wherein V is a variable of forward voltage in the subrange of the voltage bin selected, wherein $V_{th}$ is a reference value of a threshold voltage required to trigger each LED in the batch of LED dies produced from the manufacturer to emit light and $V_{max}$ is a reference value of a maximum operating voltage across each LED in the batch of LEDs from the manufacturer at which the LED is vulnerable to a thermal damage. Please notice $V_{BMIN}$ and $V_{BMAX}$ respectively represent the lowest forward voltage and the highest forward voltage among the batch of LED dies for a selected voltage bin produced by the LED manufacturer to generate a designated constant forward current for outputting a designated lumens whereas the threshold voltage $V_{th}$ and the maximum operating voltage $V_{max}$ respectively refer to a minimum forward voltage to trigger any LED die to start generating a forward current and a maximum forward voltage at which the LED die is possibly vulnerable to a thermal damage.

When an LED load of an LED lighting device is configured with a plurality of N pieces of LEDs electrically connected in series or N sets of in parallel connected LEDs electrically connected in series, a working voltage $V_N$ imposed on the LED load is therefore required to be in a range between $N \times V_{th}$ and $N \times V_{max}$, namely, $N \times V_{th} < V_N < N \times V_{max}$.

When the plurality of LEDs are white light LEDs produced by coating at least one phosphor compound on surfaces of blue light LEDs, a reference value of the threshold voltage $V_{th}$ is estimated at 2.5 volts and a reference value of the maximum operating voltage is estimated at 3.5 volts subject to an operating condition that a temperature of each LED connecting pin is controlled at or below 80 degrees centigrade thru an adequate design of a heat sink, therefore the voltage V across each LED of the N pieces of LEDs is thereby required to comply with an operating constraint of 2.5 volts<V<3.5 volts and the working voltage $V_N$ imposed on the LED load is thereby confined in a domain expressed by $N \times 2.5$ volts$<V_N<N \times 3.5$ volts. For any LED lighting device comprising an LED load it is required that the LED load in conjunction with an adequate level of power source is configured with a combination of in series and or in parallel connections of LED chips such that the electric current passing through each LED chip of the LED load remains at an adequate level such that a voltage V across each LED chip complies with the voltage operating constraint of $V_{th}<V<V_{max}$ featuring electrical characteristics of the LED chip and the working voltage $V_N$ across the LED load configured with N number of LED chips connected in series complies with an operating constraint of $N \times V_{th}<V_N<N \times V_{max}$.

FIGS. 8A, 8B, 8C and 8D comprises 4 drawings schematically and respectively showing a V-I relationship chart (Forward Current vs. Forward Voltage) for a #2835 0.5 watt white light LED chip from each of 4 different LED manufacturers; as can be seen from the chart when a forward voltage V is below a threshold voltage at around 2.5 volts, the LED chip is essentially not conducted so a forward current I is essentially equal to zero, as the forward voltage exceeds 2.5 volts the LED chip is activated to generate a current flow to emit light, as the forward voltage continues to increase, the forward current I increases exponentially at an accelerated pace, at a maximum forward voltage at around 3.5 volts the forward current I becomes 250 mA or higher, which could generates a heat that could start damaging the PN junction of the LED chip (Cree J Series 2835 LEDs). While an LED die can be designed with a larger PN junction for operating a higher level of forward current for generating a higher lumens output, it is to be noticed the operating constraint of forward voltage has little to do with the dimensions of PN junction designed, therefore $V_{th}<V<V_{max}$ remains effective and necessary as such forward voltage constraint is attributable to the materials used in making the phosphor based white light LED. Although an LED is a current driven light emitter, it is to be recognized that ultimately it is the voltage that generates the current flow to drive the LED to emit light, no voltage no light emission so to speak. As shown in the V-I relationship chart, when the forward voltage is increased from 2.5 volts to 3.5 volts for the Cree 2835 LED, the corresponding forward current is substantially increased from 0 to 250 mA. Such feature of a high performance leverage of a large variation of forward current against a small variation of forward voltage makes it inappropriate to use a voltage as a variable to accurately control lumens output of an LED load. Instead, it is more appropriate to use and to vary the constant current to operate the LED load. There are at least two reasons which support the use of the constant current source for operating the LED load: first, when a forward voltage varies by a 5% tolerance the forward current could vary in multiple like 40% to 50% for example. This could cause some LED(s) damaged in the LED load since we all know the LED dies from the same wafer have different forward voltages for generating same forward current; second, when the forward voltage varies a 5% tolerance the forward current could vary in multiple to result into a 40% to 50% fluctuation in light intensity which obviously cannot be accepted by consumers. A constant current source is always configured with a voltage power source to work in conjunction with a constant current control circuit which comprises a feedback circuit to provide a current information to the controller of the voltage power source for continuously adjusting output voltage level such that the current is kept constant.

In the semiconductor industry including the LED, the values of electrical parameters which characterize the natural inherent properties of semiconductor materials often are not precise or fixed, they always come with a range of distribution with a narrow dispersion, namely a reference range. For semiconductor devices in different categories of applications such as silicon based diode versus compound semiconductors based LED such as GaAs or GaP, their respective values of electrical parameters have very different distribution ranges though they all have the common features of having to operate in a conduction period between different threshold voltages and different maximum operating voltages. For semiconductor devices in the same category of application, the values are also different among different manufacturers though the variation ranges are much smaller and more predictable. Even the same white light LED dies produced from the same wafer there still exists a small yet predictable variation range of distribution as disclosed in the above descriptions for Cree 2835 LED about the structure of the LED voltage bins. They are just the natural inherent properties of semiconductor materials that the electrical parameters of semiconductor materials are impossibly represented by fixed values instead they always come with ranges of probability distribution with a narrow dispersion. With the above explanations being disclosed it is necessary to interpret or define the threshold voltage being a narrow interval comprised of a reference value plus a small tolerance e.g. 5% to 10%, or the reference ranges, therefore the reference value of threshold voltage at 2.5 volts with 5% tolerance would mean 2.5 volts+5%×2.5 volts=2.625 volts and the reference value of maximum operating voltage at 3.5 volts would mean 3.5 volts-5%×3.5 volts=3.325 volts, therefore the forward voltage V is interpretably operated as 2.5 volts<2.625 volts≤V≤3.325 volts<3.5 volts.

FIG. 9 is a data sheet showing data of the minimum forward voltages and maximum forward voltages for generating a designated forward current for LED dies produced from various LED manufacturers. They are the variation ranges of forward voltages formed by pairs of Maximum Forward Voltage and Minimum Forward Voltage of LED dies manufactured by different manufacturers before being divided and grouped into different voltage bins. Such variation ranges formed by each $V_{FMAX}$ and $V_{FMIN}$ are also required to satisfy the operating formula 2.5 volts<V<3.5 volts.

In summary, the compliance of voltage operating constraint $V_{th}<V<V_{max}$ featuring electrical characteristics of an LED chip is a critical technology for ensuring a normal performance of the LED load. Failing to comply with such voltage operating constraint can quickly age or seriously damage the semiconductor structure of the LED chip with a consequence of quick lumens depreciation of the LED bulbs and the product lifetime being substantially shortened, which will be unacceptable to the consumers.

The compliance of the operating constraint $V_{th}<V<V_{max}$ is a necessary matter for any LED lighting device though it is not an obvious matter as it requires complicated technologies to calculate and coordinate among an adequate level of power source, a control circuitry and a non-linear V-I relationship of light-emitting load. For conventional lighting load such as incandescent bulb there exists no such operating constraint. This is why in the past years there had been many consumers complaining about malfunction of LED bulbs that the consumers were frustrated with the fast depreciation of lumens output and substantially shortened product lifetime of the LED bulbs purchased and used. A good example was a law suit case filed by the Federal Trade Commission on Sep. 7, 2010 (Case No. SACV10-01333 JVS) for a complaint against a leading lighting manufacturer for marketing deceptive LED lamps and making false claims with respect to the life time of their LED lamps and a huge amount of monetary relief was claimed with the Court in the complaint.

To further elaborate the importance of the constraints of operating formula $V_{th}<V<V_{max}$, it is necessary for the applicant to describe the following system operating flow chart to explain how the operating formula plays its indispensable role in LED driver design such that an LED light so designed is always ensured of being operated in a safety range when energized and the LED light can be expected as an energy saving and long lasting light source;

System Flowchart for Designing an LED Driver of an LED Light:
 a) Step 1 Determine a maximum lumens output before a lumens loss by the light diffuser. For example, use a maximum lumens $L_{max}$=3200 lumens.
 b) Step 2 Select an LED die capable of generating X lumens, e.g. X=80 lumens and then calculate a minimum quantity $Q_{min}$ of the LED dies for configuring the light emitting unit. $Q_{min}$=3200/80=40 LEDs.
 c) Step 3 Obtain the corresponding value of the forward current I which generates the required lumens (e.g. 80 lumens) from the LED manufacturer's data pool.
 d) Step 4 Select and obtain an LED voltage bin comprising a plurality of LED dies with different forward voltages able to produce same forward current on the V-I relationship curves to generate same lumens output (e.g. 80 lumens). The selected voltage bin comprising a plurality of LED dies with different forward voltages form a bin voltage domain bounded by the minimum forward voltage $V_{BMIN}$ and the maximum forward voltage $V_{BMAX}$.
 e) Step 5 At this stage both the LED manufacturer and the circuit designer of the LED light are obliged to carefully check both $V_{BMIN}$ and $V_{BMAX}$ are in full compliance with the operating constraints of 2.5 volts<V<3.5 volts, wherein V is a variable of forward voltages in the voltage domain bounded by $V_{BMIN}$ and $V_{BMAX}$, or equivalently $V_{th}<V_{BMIN}$ and $V_{BMAX}<V_{max}$.
 If V is within the domain between 2.5 volts and 3.5 volts, the selected LED voltage bin is acceptable. If V is outside of the domain then the LED voltage bin selected is not acceptable because the LED light would fail its performance as disclosed in the specification and claims. Under such circumstances either the lumens output level is to be reduced until the corresponding forward voltage falls in the domain or a different LED die which can satisfy the voltage operating constraint needs to be selected.
 f) Step 6 Determine a matrix of in parallel and in series connections of the minimum quantity of LED dies (e.g. 40 LED dies)
 g) Step 7 Calculate the voltage and the total wattage required to successfully drive the LED light to perform the maximum lumens output.

The present disclosure of a two-level LED security light provides a unique lifestyle lighting solution. The motivation of creating such lifestyle lighting solution has less to do with the energy saving aspect of the low level illumination mode because LED is already a very energy saving light source compared with the conventional incandescent light source. For instance, a 10-watt LED security light when operated at a low level at 30% illumination it only saves 7 watts, which is not as significant as a 100-watt incandescent bulb which can save as much as 70 watts when operated at 30% illumination for a low level mode. While it is always good to save some extra energy, it is however not the main incentives for developing the present invention; the lifestyle lighting solution of the present disclosure is featured with two innovations which meaningfully improve the exquisite tastes of living in the evening, the first innovation is the creation of an aesthetic scene for the outdoor living environment, wherein at dusk the LED security light is automatically turned on by the photo sensor to perform the low level illumination which is necessary for creating a soft and aesthetic night scene for the outdoor living area (such soft and aesthetic night view is not achievable by the high level illumination however), the second innovation is the creation of a navigation capacity similar to a light house effect for guiding people to safely move toward a destination in the outdoor living area without getting lost or encountering an accident. These two innovative functions coupled with the motion sensor to increase illumination when people enter into the short detection area makes the present invention a perfect lifestyle lighting solution for enjoying an exquisite taste of evening life.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:
1. A multi-level LED security light comprising:
a light-emitting unit configured with at least a first LED load for emitting light with a first color temperature in a range between 2000K and 3000K and at least a second LED load for emitting light with a second color temperature in a range between 4000K and 6500K;

a diffuser covering the first LED load and the second LED load to create a diffused light with a mingled light color temperature;
a loading and power control unit;
a light sensing control unit;
a motion sensing unit;
a power supply unit; and
an external control unit including at least one external control device outputting at least one external control signal;
wherein the loading and power control unit comprises at least a first controller and a switching circuitry, wherein the switching circuitry includes at least a first controllable semiconductor switching device and a second controllable semiconductor switching device, wherein the first controller is electrically and respectively coupled with the light sensing control unit, the motion sensing unit, the first controllable semiconductor switching device, the second controllable semiconductor switching device, and the at least one external control device;
wherein the switching circuitry is electrically coupled with a power source of the power supply unit and the light-emitting unit, wherein the power source is a DC power source configured in the power supply unit to output at least one DC power;
wherein the first LED load and the second LED load are respectively and electrically coupled to the first controllable semiconductor switching device and the second controllable semiconductor switching device of the switching circuitry;
wherein the first controller outputs control signals to respectively control a first conduction rate of the first controllable semiconductor switching device and a second conduction rate of the second controllable semiconductor switching device to perform different illumination modes of the multi-level LED security light characterized by different light intensities and different mingled light color temperatures according to signals respectively received from the light sensing control unit, the motion sensing unit and the at least one external control device;
wherein at dusk when a light intensity level of an ambient light detected by the light sensing control unit is lower than a first predetermined value, the loading and power control unit manages to deliver an average electric current to the light-emitting unit to operate a first illumination mode to perform a first level illumination characterized by a first light intensity and a first mingled light color temperature for a first predetermined time duration; wherein at dawn when the light intensity level of the ambient light detected by the light sensing control unit is higher than a second predetermined value, the loading and power control unit manages to switch off the light-emitting unit; wherein when a motion signal is detected by the motion sensing unit, the loading and power control unit manages to increase the average electric current delivered to the light-emitting unit to operate a second illumination mode to perform a second level illumination characterized by a second light intensity and a second mingled light color temperature for a second predetermined time duration before switching back to the first illumination mode to perform the first level illumination, wherein the second light intensity is always higher than the first light intensity and the second mingled light color temperature is always higher than or equal to the first mingled light color temperature;
wherein the at least one external control device is used for adjusting and setting at least one operating parameter of the multi-level LED security light including but not limited to at least one of the first light intensity of the first illumination mode, the second light intensity of the second illumination mode, the first mingled light color temperature of the first illumination mode, the second mingled light color temperature of the second illumination mode, the first predetermined time duration of the first illumination mode or the second predetermined time duration of the second illumination mode.

2. The multi-level LED security light according to claim 1, wherein the first light intensity is adjustable in a range greater than 0% but less than 50% of a maximum light intensity designed for the light-emitting unit of the multi-level LED security light and the second light intensity is adjustable in a range greater than or equal to 50% of the maximum light intensity designed for the light-emitting unit of the multi-level LED security light.

3. The multi-level LED security light according to claim 1, wherein the LEDs of the first LED load and the LEDs of the second LED load are respectively designed with a configuration of in series and/or in parallel connections such that when incorporated with a level setting of the DC power source an electric current passing through each LED of the first LED load and each LED of the second LED load remains at a level such that a voltage V across each LED complies with an operating constraint of $V_{th}<V<V_{max}$ featuring electrical characteristics of an LED, wherein Vth is a reference value of a threshold voltage required to trigger the LED to start emitting light and $V_{max}$ is a reference value of a maximum operating voltage across the LED to avoid a thermal damage or burning out of LED construction, wherein when each of the first LED load and the second LED load is configured with a plurality of LEDs electrically connected in series or sets of in parallel connected LEDs electrically connected in series, a working voltage across the first LED load or the second LED load is confined in a domain between a minimum voltage equal to the sum of the threshold voltages of all LEDs electrically connected in series or sets of in parallel connected LEDs electrically connected in series and a maximum voltage equal to the sum of the maximum operating voltages of all LEDs electrically connected in series or sets of in parallel connected LEDs electrically connected in series.

4. The multi-level LED security light according to claim 3, wherein when the plurality of LEDs are phosphor based white light LEDs produced by coating at least one phosphor compound on surfaces of blue light LEDs, the reference value of the threshold voltage is estimated at 2.5 volts and the reference value of the maximum operating voltage is estimated at 3.5 volts, wherein the LED has the voltage V across each LED complying with an operating constraint of 2.5 volts<V<3.5 volts and the working voltages imposed on the first LED load and the second LED load respectively represented by $V_N$ and $V_M$ are confined in domains expressed by N×2.5 volts<$V_N$<N×3.5 volts and M×2.5 volts<$V_M$<M×3.5 volts, wherein N and M are positive integrals denoting respective numbers of in series connected LEDs in the first LED load and the second LED load, wherein N is greater than or equal to 1, wherein a value of M is required to be greater than or equal to a value of N.

5. The multi-level LED security light according to claim 1, wherein the first controllable semiconductor switching device is a first LED driver outputting a first electric power with a constant current delivered to the first LED load; wherein the second controllable semiconductor switching device is a second LED driver outputting a second electric power with a constant current delivered to the second LED load.

6. The multi-level LED security light according to claim 1, wherein when the light-emitting unit is operated in the first illumination mode, a light intensity of the first LED load and a light intensity of the second LED load are respectively adjustable to tune the first mingled light color temperature of the diffused light created thru the light diffuser; wherein upon receiving the at least one external control signal from the at least one external control device the first controller operates in response to reversely and complementarily adjust the light intensity of the first LED load and the light intensity of the second LED load with the same pace; wherein for tuning to a lower mingled light color temperature, the first controller upon receiving the at least one external control signal operates to control the switching circuitry to increase a first electric power delivered to the first LED load and at the same time to decrease a second electric power delivered to the second LED load such that a sum of the first electric power and the second electric power remains unchanged; wherein for tuning to a higher mingled light color temperature, the first controller upon receiving the at least one external control signal operates to control the switching circuitry to decrease the first electric power delivered to the first LED load and at the same time to increase the second electric power delivered to the second LED load such that a sum of the first electric power and the second electric power remains unchanged.

7. The multi-level LED security light according to claim 1, wherein when the light-emitting unit is operated in the second illumination mode, a light intensity of the first LED load and a light intensity of the second LED load are respectively adjustable to tune the second mingled light color temperature of the diffused light created thru the light diffuser; wherein upon receiving the at least one external control signal from the at least one external control device the first controller operates in response to reversely and complementarily adjust the light intensity of the first LED load and the light intensity of the second LED load with the same pace; wherein for tuning to a lower mingled light color temperature, the first controller upon receiving the at least one external control signal operates to control the switching circuitry to increase a first electric power delivered to the first LED load and at the same time to decrease a second electric power delivered to the second LED load such that a sum of the first electric power and the second electric power remains unchanged; wherein for tuning to a higher mingled light color temperature, the first controller upon receiving the at least one external control signal operates to control the switching circuitry to decrease the first electric power delivered to the first LED load and at the same time to increase the second electric power delivered to the second LED load such that the sum of the first electric power and the second electric power remains unchanged.

8. The multi-level LED security light according to claim 1, wherein when the light-emitting unit is in a conduction state, a light intensity of the first LED load and a light intensity of the second LED load are respectively adjustable, wherein the first controller in response to the at least one external control signal received respectively outputs a first PWM signal to control the first conduction rate of the first controllable semiconductor switching device and a second PWM signal to control the second conduction rate of the second controllable semiconductor switching device with an arrangement that the first conduction rate of the first controllable semiconductor switching device and the second conduction rate of the second controllable semiconductor switching device are reversely and complementarily adjusted such that a sum of the first electric power delivered to the first LED load and the second electric power delivered to the second LED load is maintained at a constant level while the mingled light color temperature of the light emitted by the first LED load and the light emitted by the second LED load thru the light diffuser is proportionately adjusted according to the at least one external control signal to perform a color temperature tuning of the first mingled light color temperature of the first level illumination or the second mingled light color temperature of the second level illumination.

9. The multi-level LED security light according to claim 8, wherein the at least one external control device includes a voltage divider, wherein the voltage divider is configured to output at least one voltage signal with a voltage value, wherein the at least one voltage signal with a voltage value is the at least one external control signal, wherein upon receiving the at least one external control signal the first controller operates to perform a corresponding mingled light color temperature according to the voltage value of the at least one voltage signal generated by the voltage divider.

10. The multi-level LED security light according to claim 1, wherein the first controller is programmed to operate with at least one color temperature switching scheme comprising a plurality of different mingled light color temperature tuning processes for tuning and selecting the first mingled light color temperature of the first illumination mode or for tuning and selecting the second mingled light color temperature of the second illumination mode, wherein paired combinations of the first conduction rate of the first controllable semiconductor switching device and the second conduction rate of the second controllable semiconductor switching device for respectively controlling a first electric power delivered to the first LED load and a second electric power delivered to the second LED load for creating different mingled light color temperatures are preprogrammed for operating a pick and play process according to the at least one first external control signal received and interpreted by the first controller for performing a selected mingled light color temperature; wherein in programming the paired combinations of different conduction rates of the switching circuitry, the first electric power delivered to the first LED load and the second electric power delivered to the second LED load are complementarily and reversely adjusted such that a sum of the first electric power delivered to the first LED load and the second electric power delivered to the second LED load remains unchanged.

11. The multi-level LED security light according to claim 10, wherein the at least one external control device includes a voltage divider, wherein the voltage divider is configured to output at least one voltage signal with a voltage value, wherein the first controller operates the pick and play process to activate a corresponding mingled light color temperature tuning process in the at least one color temperature switching scheme according to the voltage value of the at least one voltage signal outputted by the voltage divider.

12. The multi-level LED security light according to claim 11, wherein the voltage divider is designed with a step-less/free setting switch, wherein the voltage divider is configured to operate with a variable resistor to output a voltage value corresponding to a final parking location of a switching motion of the step-less/free setting switch on the variable resistor; wherein a full range of the voltage value outputted by the voltage divider corresponding to a full length of the variable resistor is divided into a plurality of different voltage domains for respectively activating the pick and play process, wherein the step-less/free setting switch is allowed to park at any location on the variable resistor to generate a corresponding voltage value to the first controller, wherein the first controller is designed to operate the pick and play process according to a belonging of a voltage domain with respect to the corresponding voltage value received from the voltage divider for selecting and activating a corresponding mingled light color temperature tuning process in the at least one color temperature switching scheme corresponding to the voltage domain.

13. The multi-level LED security light according to claim 10, wherein the at least one external control device includes a selection switch configured with a plurality of switching positions with each of the plurality of switching positions respectively for activating a corresponding process in the first controller, wherein when a switching position is operated by the selection switch, a corresponding mingled light color temperature switching process is activated to perform a corresponding mingled light color temperature.

14. The multi-level LED security light according to claim 13, wherein the selection switch is a slide switch, a rotary switch, a pull chain switch or any switch design having a capacity to perform the same selection function.

15. The multi-level LED security light according to claim 10, wherein the at least one external control device includes at least one push button or one touch pad and the at least one external control signal is a voltage signal generated by operating the push button or the touch pad, wherein upon receiving the voltage signal the first controller operates the pick and play process to alternately perform the selected mingled light color temperature in the at least one color temperature switching scheme according to a preset sequence.

16. The multi-level LED security light according to claim 10, wherein the at least one external control device includes at least one wireless signal receiver to receive a wireless external control signal from a mobile device, a smart phone, a smart speaker or a cloud sever to convert the wireless external control signal into the at least one external control signal interpretable and executable by the first controller for activating the pick and play process for selecting a corresponding mingled light color temperature tuning process in the at least one color temperature switching scheme for performing a corresponding first mingled light color temperature or a corresponding second mingled light color temperature.

17. The multi-level LED security light according to claim 10, wherein the at least one external control device is a power interruption detection circuitry electrically coupled to the first controller for detecting a short power interruption signal; wherein when the short power interruption signal is detected, the first controller operates to alternately switch a selection of different mingled light color temperatures according to the at least one color temperature switching scheme preprogrammed.

18. A multi-level LED security light comprising:
a light-emitting unit, configured with at least a first LED load for emitting light with a first color temperature in a range between 2000K and 3000K and at least a second LED load for emitting light with a second color temperature in a range between 4000K and 6500K;
a diffuser covering the first LED load and the second LED load to create a diffused light with a mingled light color temperature;
a loading and power control unit;
a light sensing control unit;
a motion sensing unit;
a power supply unit; and
an external control unit including at least one external control device outputting at least one external control signal;
wherein the loading and power control unit comprises at least a first controller and a switching circuitry, wherein the first controller is electrically and respectively coupled with the light sensing control unit, the motion sensing unit, the switching circuitry and the at least one external control device; wherein the switching circuitry is electrically coupled with a power source of the power supply unit and the light-emitting unit, wherein the power source is a DC power source configured in the power supply unit to output at least one DC power; wherein the switching circuitry comprises at least a first controllable semiconductor switching device and a second controllable semiconductor switching device; wherein the first LED load and the second LED load are respectively and electrically coupled to the first controllable semiconductor switching device and the second controllable semiconductor switching device; wherein the first controller outputs a first control signal to control a first conduction rate of the first controllable semiconductor switching device for delivering a first electric power to the first LED load and simultaneously a second control signal to control a second conduction rate of the second controllable semiconductor switching device for delivering a second electric power to the second LED load such that the light-emitting unit respectively generates illuminations of different light intensities and different mingled light color temperatures for performing different illumination modes according to signals respectively received from the light sensing control unit, the motion sensing unit and the at least one external control device; wherein at dusk when a light intensity level of an ambient light detected by the light sensing control unit is lower than a first predetermined value, the loading and power control unit manages to deliver an electric power to the light-emitting unit to perform a first illumination mode with a first level illumination characterized by a first light intensity and a first mingled light color temperature for a first predetermined time duration with the motion sensing unit being temporarily ignored by the first controller for controlling an illumination; wherein upon a maturity of the first predetermined time duration the loading and power control unit manages to cutoff the electric power delivered to the light-emitting unit and at the same time the motion sensing unit is activated by the first controller for controlling the illumination; wherein when a motion signal is detected by the motion sensing unit, the loading and power control unit manages to deliver the electric power to the light-emitting unit to perform a second illumination mode with a second level illumination characterized by a second light intensity and a second mingled light color temperature for a second predetermined time duration before being switched back to a turned off state; wherein the second light intensity of the second level illumination is higher than or equal to the first light intensity of the first level illumination wherein at dawn when the light intensity level of the ambient light detected by the light sensing control unit is higher than a second predetermined value, the loading and power control unit manages to switch off the light-emitting unit;

wherein the at least one external control device is used for adjusting and setting at least one operating parameter of the multi-level LED security light including but not limited to at least one of the first mingled light color temperature, the second mingled light color temperature, the first light intensity, the second light intensity, the first predetermined time duration, or the second predetermined time duration;

wherein the LEDs of the first LED load and the LEDs of the second LED load are respectively designed with a configuration of in series and/or in parallel connections such that when incorporated with a level setting of the DC power source of the power supply unit an electric current passing through each LED of the first LED load and each LED of the second LED load remains at a level such that a voltage V across each LED chip complies with an operating constraint of $V_{th}<V<V_{max}$ featuring electrical characteristics of the LED chip, wherein Val is a reference value of a threshold voltage required to trigger the LED to start emitting light and Vmax is a reference value of a maximum operating voltage across the LED to avoid a thermal damage or burning out of LED construction.

19. The lifestyle multi-level LED security light according to claim 18, wherein when each of the first LED load and the second LED load is configured with a plurality of LEDs electrically connected in series or sets of in parallel connected LEDs electrically connected in series, a working voltage across the first LED load or the second LED load is confined in a domain between a minimum voltage equal to a sum of the threshold voltages of all LEDs electrically connected in series or sets of in parallel connected LEDs electrically connected in series and a maximum voltage equal to the sum of the maximum operating voltages of all LEDs electrically connected in series or sets of in parallel connected LEDs electrically connected in series.

20. The multi-level LED security light according to claim 19, wherein when the plurality of LEDs are phosphor based white light LEDs produced by coating at least one phosphor compound on surfaces of blue light LEDs, the reference value of the threshold voltage is estimated at 2.5 volts and the reference value of the maximum operating voltage is estimated at 3.5 volts, wherein the LED has the voltage V across each LED complying with an operating constraint of 2.5 volts<V<3.5 volts and the working voltages imposed on the first LED load and the second LED load respectively represented by $V_N$ and $V_M$ are confined in domains expressed by N×2.5 volts<$V_N$<N×3.5 volts and M×2.5 volts<$V_M$<M×3.5 volts, wherein N and M are positive integrals greater than or equal to 1 denoting respective numbers of in series connected LEDs in the first LED load and in the second LED load.

21. The multi-level LED security light according to claim 18, wherein the first controllable semiconductor switching device is a first LED driver outputting the first electric power delivered to the first LED load; wherein the second controllable semiconductor switching device is a second LED driver outputting the second electric power delivered to the second LED load.

22. The multi-level LED security light according to claim 18, wherein the first mingled light color temperature of the first level illumination in performing the first illumination mode is the first color temperature, wherein the second controllable semiconductor switching device is in a cutoff state and the first controller outputs the first control signal to control the first conduction rate of the first controllable semiconductor switching device to deliver the electric power to the light-emitting unit to determine the light intensity of the first illumination mode.

23. The multi-level LED security light according to claim 18, wherein the second mingled light color temperature of the second level illumination in performing the second illumination mode is the second color temperature, wherein the first controllable semiconductor switching device is in a cutoff state and the first controller outputs the second control signal to control the second conduction rate of the second controllable semiconductor switching device to deliver the electric power to the light-emitting unit to determine the light intensity of the second illumination mode.

24. The multi-level LED security light according to claim 18, wherein when the light-emitting unit is in the first illumination mode, a light intensity of the first LED load and a light intensity of the second LED load are respectively adjustable to tune the mingled light color temperature of the diffused light created thru the light diffuser; wherein upon receiving the at least one external control signal from the at least one external control device the first controller operates to reversely and complementarily adjust the light intensity of the first LED load and the light intensity of the second LED load with the same pace such that a sum of the first electric power delivered to the first LED load and the second electric power delivered to the second LED load remains unchanged; wherein for tuning to a lower mingled light color temperature, the first controller upon receiving the at least one external control signal operates to control the first controllable semiconductor switching device to increase the first electric power delivered to the first LED load and at the same time operates to control the second controllable semiconductor switching device to proportionally decrease the second electric power delivered to the second LED load; wherein for tuning to a higher mingled light color temperature, the first controller upon receiving the at least one external control signal operates to control the first controllable semiconductor switching device to decrease the first electric power delivered to the first LED load and at the same time operates to control the second controllable semiconductor switching device to proportionally increase the second electric power delivered to the second LED load.

25. The multi-level LED security light according to claim 18, wherein when the light-emitting unit is in the second illumination mode, a light intensity of the first LED load and a light intensity of the second LED load are respectively adjustable to tune the mingled light color temperature of the diffused light created thru the light diffuser; wherein upon receiving the at least one external control signal from the at least one external control device the first controller operates to reversely and complementarily adjust the light intensity of the first LED load and the light intensity of the second LED load with the same pace such that a sum of the first electric power delivered to the first LED load and the second electric power delivered to the second LED load remains unchanged; wherein for tuning to a lower mingled light color temperature, the first controller upon receiving the at least one external control signal operates to control the first controllable semiconductor switching device to increase the first electric power delivered to the first LED load and at the same time operates to control the second controllable semiconductor switching device to proportionally decrease the second electric power delivered to the second LED load;

wherein for tuning to a higher mingled light color temperature, the first controller upon receiving the at least one external control signal operates to control the first controllable semiconductor switching device to decrease the first electric power delivered to the first LED load and at the same time operates to control the second controllable semiconductor switching device to proportionally increase the second electric power delivered to the second LED load.

26. The multi-level LED security light according to claim 18, wherein when the light-emitting unit is in a conduction state, a light intensity of the first LED load and a light intensity of the second LED load are respectively adjustable, wherein the first controller in response to the at least one external control signal received respectively outputs a first PWM signal to control the first conduction rate of the first controllable semiconductor switching device and a second PWM signal to control the second conduction rate of the second controllable semiconductor switching device with an arrangement that the first conduction rate of the first controllable semiconductor switching device and the second conduction rate of the second controllable semiconductor switching device are reversely and complementarily adjusted such that a sum of the first electric power delivered to the first LED load and the second electric power delivered to the second LED load is maintained at a constant level while the mingled light color temperature of the light emitted by the first LED load and the light emitted by the second LED load thru the light diffuser is proportionately adjusted according to the at least one external control signal to perform a color temperature tuning of the first mingled light color temperature of the first level illumination or the second mingled light color temperature of the second level illumination.

27. The multi-level LED security light according to claim 26, wherein the first external control device includes a voltage divider, wherein the voltage divider is configured to output at least one voltage signal with a voltage value, wherein the at least one voltage signal with a voltage value is the at least one external control signal, wherein upon receiving the at least one external control signal the first controller operates to perform a corresponding mingled light color temperature according to the voltage value of the at least one voltage signal generated by the voltage divider.

28. The multi-level LED security light according to claim 18, wherein the first controller is programmed to operate with at least one color temperature switching scheme comprising a plurality of different mingled light color temperature tuning processes for tuning and selecting the first mingled light color temperature of the first illumination mode or for tuning and setting the second mingled light color temperature of the second illumination mode, wherein paired combinations of the first conduction rate of the first controllable semiconductor switching device and the second conduction rate of the second controllable semiconductor switching device for respectively controlling the first electric power delivered to the first LED load and the second electric power delivered to the second LED load for creating different mingled light color temperatures are preprogrammed for operating a pick and play process according to the at least one external control signal received and interpreted by the first controller for performing a selected mingled light color temperature; wherein in programming the paired combinations of different conduction rates of the switching circuitry, the first electric power delivered to the first LED load and the second electric power delivered to the second LED load are complementarily and reversely adjusted such that a sum of the first electric power delivered to the first LED load and the second electric power delivered to the second LED load remains unchanged.

29. The multi-level LED security light according to claim 28, wherein the at least one external control device includes a voltage divider, wherein the voltage divider is configured to output at least one voltage signal with a voltage value, wherein upon receiving the at least one external control signal the first controller operates the pick and play process to activate a corresponding mingled light color temperature process in the at least one color temperature switching scheme according to the voltage value of the at least one voltage signal outputted by the voltage divider.

30. The multi-level LED security light according to claim 29, wherein the voltage divider is designed with a step-less/free setting switch, wherein the voltage divider is configured to operate with a variable resistor to output a voltage value corresponding to a final parking location of a switching motion of the step-less/free setting switch on the variable resistor; wherein a full range of the voltage value outputted by the voltage divider corresponding to a full length of the variable resistor is divided into a plurality of different voltage domains for respectively activating the pick and play process, wherein the step-less/free setting switch is allowed to park at any location on the variable resistor to generate a corresponding voltage value to the first controller, wherein the first controller is designed to operate the pick and play process according to a belonging of a voltage domain with respect to the corresponding voltage value received from the voltage divider for selecting and activating a corresponding mingled light color temperature tuning process in the at least one color temperature switching scheme corresponding to the voltage domain.

31. The multi-level LED security light according to claim 28, wherein the at least one external control device includes at least one push button or one touch pad and the at least one external control signal is a voltage signal generated by operating the push button or the touch pad, wherein upon receiving the voltage signal the first controller operates the pick and play process to alternately perform the selected mingled light color temperature in the at least one color temperature switching scheme according to a preset sequence.

32. The multi-level LED security light according to claim 28, wherein the at least one external control device includes a selection switch configured with a plurality of switching positions with each of the plurality of switching positions respectively for activating a corresponding process in the first controller, wherein when a switching position is operated by the selection switch, a corresponding mingled light color temperature switching process is activated to perform a corresponding mingled light color temperature.

33. The multi-level LED security light according to claim 32, wherein the selection switch is a slide switch, a rotary switch, a pull chain switch or any switch design having a capacity to perform the same selection function.

34. The multi-level LED security light according to claim 28, wherein the at least one external control device includes a power interruption detection circuitry electrically coupled to the first controller for detecting a short power interruption signal; wherein when the short power interruption signal is detected, the first controller operates to alternately switch a selection of different mingled light color temperatures according to the at least one color temperature switching scheme preprogrammed.

35. The multi-level LED security light according to claim 28, wherein the at least one external control device includes at least one wireless signal receiver to receive a wireless external control signal from a mobile device, a smart phone, a smart speaker or a cloud sever and to convert the wireless external control signal into the at least one external control signal interpretable and executable by the first controller for activating the pick and play process for selecting a corresponding mingled light color temperature tuning process in the at least one color temperature switching scheme for performing a corresponding first mingled light color temperature or a corresponding second mingled light color temperature.

36. A multi-level LED security light comprising:
a light-emitting unit, configured with at least a first LED load for emitting light with a first color temperature in a range between 2000K and 3000K and at least a second LED load for emitting light with a second color temperature in a range between 4000K and 6500K;
a diffuser covering the first LED load and the second LED load to create a diffused light with a mingled light color temperature;
a loading and power control unit;
a light sensing control unit;
a motion sensing unit;
a power supply unit; and
an external control unit including at least one external control device outputting at least one external control signal;
wherein the loading and power control unit comprises at least a first controller and a switching circuitry, wherein the first controller is electrically and respectively coupled with the light sensing control unit, the motion sensing unit, the switching circuitry and the at least one external control device; wherein the switching circuitry is electrically coupled with at least one power source of the power supply unit and the light-emitting unit, wherein the at least one power source is a DC power source configured in the power supply unit to output at least one DC power; wherein the switching circuitry comprises at least a first controllable semiconductor switching device and a second controllable semiconductor switching device; wherein the first LED load and the second LED load are respectively and electrically coupled to the first controllable semiconductor switching device and the second controllable semiconductor switching device; wherein the first controller outputs a first control signal to control a first conduction rate of the first controllable semiconductor switching device for delivering a first electric power to the first LED load and simultaneously the first controller also outputs a second control signal to control a second conduction rate of the second controllable semiconductor switching device for delivering a second electric power to the second LED load such that the light-emitting unit respectively generates illuminations of different light intensities and different mingled light color temperatures for performing different illumination modes according to signals respectively received from the light sensing control unit, the motion sensing unit and the at least one external control device;
wherein at dusk when a light intensity level of an ambient light detected by the light sensing control unit is lower than a first predetermined value, the loading and power control unit manages to deliver an average electric current to the light-emitting unit to perform a first illumination mode with a first level illumination characterized by a first light intensity and a first mingled light color temperature for a first predetermined time duration with the motion sensing unit being temporarily ignored by the first controller for controlling an illumination; wherein upon a maturity of the first predetermined time duration the loading and power control unit manages to reduce the average electric current delivered to the light-emitting unit to perform a second illumination mode with a second level illumination characterized by a second light intensity and a second mingled light color temperature for a second predetermined time duration and at the same time the motion sensing unit is activated by the first controller for controlling the illumination; wherein when a motion signal is detected by the motion sensing unit, the loading and power control unit manages to increase the average electric current delivered to light-emitting unit to perform a third illumination mode with a third level illumination characterized by a third light intensity and a third mingled light color temperature for a third predetermined time duration before being switched back to the second level illumination, wherein the third light intensity of the third level illumination is higher than or equal to the first light intensity of the first level illumination, wherein the first light intensity of the first level illumination is higher than the second light intensity of the second level illumination; wherein at dawn when the light intensity level of the ambient light detected by the light sensing control unit is higher than a second predetermined value, the loading and power control unit manages to switch off the light-emitting unit;
wherein the at least one external control device is used for adjusting and setting at least one operating parameter of the multi-level LED security light including but not limited to at least one of the first mingled light color temperature of the first level illumination, the second mingled light color temperature of the second level illumination, the third mingled light color temperature of the third level illumination, the first light intensity of the first level illumination, the second light intensity of the second level illumination, the third light intensity of the third level illumination, the first predetermined time duration of the first level illumination, the second predetermined time duration of the second level illumination, or the third predetermined time duration of the third level illumination;
wherein the LEDs of the first LED load and the LEDs of the second LED load are respectively designed with a configuration of in series and/or in parallel connections such that when incorporated with a level setting of the DC power source of the power supply unit an electric current passing through each LED of the first LED load and each LED of the second LED load remains at a level such that a voltage V across each LED complies with an operating constraint of $V_{th}<V<V_{max}$ featuring electrical characteristics of an LED, wherein $V_{th}$ is a reference value of a threshold voltage required to trigger the LED to start emitting light and $V_{max}$ is a reference value of a maximum operating voltage across the LED to avoid a thermal damage or burning out of LED construction.

37. The multi-level LED security light according to claim 36, wherein when each of the first LED load and the second LED load is configured with a plurality of LEDs electrically connected in series or sets of in parallel connected LEDs electrically connected in series, a working voltage across the first LED load or the second LED load is confined in a domain between a minimum voltage equal to the sum of the threshold voltages of all LEDs electrically connected in series or sets of in parallel connected LEDs electrically connected in series and a maximum voltage equal to the sum of the maximum operating voltages of all LEDs electrically connected in series or sets of in parallel connected LEDs electrically connected in series.

38. The multi-level LED security light according to claim 37, wherein when the plurality of LEDs are phosphor based white light LEDs produced by coating at least one phosphor compound on surfaces of blue light LEDs, the reference value of the threshold voltage is estimated at 2.5 volts and the reference value of the maximum operating voltage is estimated at 3.5 volts, wherein the LED has the voltage V across each LED complying with an operating constraint of 2.5 volts<V<3.5 volts and the working voltages imposed on the first LED load and the second LED load respectively represented by $V_N$ and $V_M$ are confined in domains expressed by N×2.5 volts<$V_N$<N×3.5 volts and M×2.5 volts<$V_M$<M×3.5 volts, wherein N and M are positive integrals greater than or equal to 1 denoting respective numbers of in series connected LEDs in the first LED load and the second LED load.

39. The multi-level LED security light according to claim 36, wherein the first controllable semiconductor switching device is a first LED driver outputting the first electric power delivered to the first LED load; wherein the second controllable semiconductor switching device is a second LED driver outputting the second electric power delivered to the second LED load.

40. The multi-level LED security light according to claim 36, wherein the first mingled light color temperature in performing the first illumination mode is the first color temperature, wherein the second controllable semiconductor switching device is in a cutoff state and the first controller outputs the first control signal to control the first conduction rate of the first controllable semiconductor switching device to deliver the electric power to the light-emitting unit to determine the light intensity and the first mingled light color temperature of the first illumination mode.

41. The multi-level LED security light according to claim 36, wherein the second mingled light color temperature in performing the second illumination mode is the second color temperature, wherein the first controllable semiconductor switching device is in a cutoff state and the first controller outputs the second control signal to control the second conduction rate of the second controllable semiconductor switching device to deliver the electric power to the light-emitting unit to determine the light intensity and the second mingled light color temperature of the second illumination mode.

42. The multi-level LED security light according to claim 36, wherein when the light-emitting unit is in a conduction state, a light intensity of the first LED load and a light intensity of the second LED load are respectively adjustable, wherein the first controller in response to the at least one external control signal received respectively outputs a first PWM signal to control the first conduction rate of the first controllable semiconductor switching device and a second PWM signal to control the second conduction rate of the second controllable semiconductor switching device with an arrangement that the first conduction rate of the first controllable semiconductor switching device and the second conduction rate of the second controllable semiconductor switching device are reversely and complementarily adjusted such that a sum of the first electric power delivered to the first LED load and the second electric power delivered to the second LED load is maintained at a constant level while the mingled light color temperature of the light emitted by the first LED load and the light emitted by the second LED load thru the light diffuser is proportionately adjusted according to the at least one external control signal to perform a color temperature tuning of the first mingled light color temperature of the first level illumination or the second mingled light color temperature of the second level illumination.

43. The multi-level LED security light according to claim 42, wherein the first external control device includes a voltage divider, wherein the voltage divider is configured to output at least one voltage signal with a voltage value, wherein the at least one voltage signal with a voltage value is the at least one external control signal, wherein upon receiving the at least one external control signal the first controller operates to perform a corresponding mingled light color temperature according to the voltage value of the at least one voltage signal generated by the voltage divider.

44. The multi-level LED security light according to claim 36, wherein when the light-emitting unit is in the first illumination mode, a light intensity of the first LED load and a light intensity of the second LED load are respectively adjustable to tune the first mingled light color temperature; wherein upon receiving the at least one external control signal from the at least one external control device the first controller operates to reversely and complementarily adjust the light intensity of the first LED load and the light intensity of the second LED load with the same pace such that a sum of the first electric power delivered to the first LED load and the second electric power delivered to the second LED load remains unchanged; wherein for tuning to a lower mingled light color temperature, the first controller upon receiving the at least one external control signal from the at least one external control device operates to control the first controllable semiconductor switching device to increase the first electric power delivered to the first LED load and at the same time operates to control the second controllable semiconductor switching device to proportionally decrease the second electric power delivered to the second LED load; wherein for tuning to a higher mingled light color temperature, the first controller upon receiving the at least one external control signal from the at least one external control device operates to control the first controllable semiconductor switching device to decrease the first electric power delivered to the first LED load and at the same time operates to control the second controllable semiconductor switching device to proportionally increase the second electric power delivered to the second LED load.

45. The multi-level LED security light according to claim 36, wherein when the light-emitting unit is in the second illumination mode, a light intensity of the first LED load and a light intensity of the second LED load are respectively adjustable to tune the second mingled light color temperature; wherein upon receiving the at least one external control signal from the at least one external control device the first controller operates to reversely and complementarily adjust the light intensity of the first LED load and the light intensity of the second LED load with the same pace such that a sum of the first electric power delivered to the first LED load and the second electric power delivered to the second LED load remains unchanged; wherein for tuning to a lower mingled light color temperature, the first controller upon receiving the at least one external control signal from the at least one external control device operates to control the first controllable semiconductor switching device to increase the first electric power delivered to the first LED load and at the same time operates to control the second controllable semiconductor switching device to proportionally decrease the second electric power delivered to the second LED load; wherein for tuning to a higher mingled light color temperature, the first controller upon receiving the at least one external control signal from the at least one external control device operates to control the first controllable semiconductor switching device to decrease the first electric power delivered to the first LED load and at the same time operates to control the second controllable semiconductor switching device to proportionally increase the second electric power delivered to the second LED load.

46. The multi-level LED security light according to claim 36, wherein the first controller is programmed to operate with at least one color temperature switching scheme comprising a plurality of different mingled light color temperature tuning processes for tuning and selecting the first mingled light color temperature of the first illumination mode or for tuning and selecting the second mingled light color temperature of the second illumination mode, wherein paired combinations of the first conduction rate of the first controllable semiconductor switching device and the second conduction rate of the second controllable semiconductor switching device for respectively controlling the first electric power delivered to the first LED load and the second electric power delivered to the second LED load for creating different mingled light color temperatures are preprogrammed for operating a pick and play process according to the at least one external control signal received and interpreted by the first controller for performing a selected mingled light color temperature; wherein in programming the paired combinations of different conduction rates of the switching circuitry, the first electric power delivered to the first LED load and the second electric power delivered to the second LED load are complementarily and reversely adjusted such that a total of the first electric power delivered to the first LED load and the second electric power delivered to the second LED load remains unchanged.

47. The multi-level LED security light according to claim 46, wherein the at least one external control device includes a voltage divider, wherein the voltage divider is configured to output at least a voltage signal with a voltage value, wherein the first controller operates the pick and play process to activate a corresponding mingled light color temperature tuning process in the at least one color temperature switching scheme according to the voltage value of the at least one voltage signal outputted by the voltage divider.

48. The multi-level LED security light according to claim 47, wherein the voltage divider is designed with a step-less/free setting switch, wherein the voltage divider is configured to operate with a variable resistor to output a voltage value corresponding to a final parking location of a switching motion of the step-less/free setting switch on the variable resistor; wherein a full range of the voltage value outputted by the voltage divider corresponding to a full length of the variable resistor is divided into a plurality of different voltage domains for respectively activating the pick and play process, wherein the step-less/free setting switch is allowed to park at any location on the variable resistor to generate a corresponding voltage value to the first controller, wherein the first controller is designed to operate the pick and play process according to a belonging of a voltage domain with respect to the corresponding voltage value received from the voltage divider for selecting and activating a corresponding mingled light color temperature process in the at least one color temperature switching scheme corresponding to the voltage domain.

49. The multi-level LED security light according to claim 46, wherein the at least one external control device includes a push button or a touch pad and the at least one external control signal is a voltage signal generated by operating the push button or the touch pad, wherein upon receiving the voltage signal the first controller operates the pick and play process to alternately perform the selected mingled light color temperature in the at least one color temperature switching scheme according to a preset sequence.

50. The multi-level LED security light according to claim 46, wherein the at least one external control device includes a selection switch configured with a plurality of switching positions with each of the plurality of switching positions respectively for activating a corresponding process in the first controller, wherein when a switching position is operated by the selection switch, a corresponding mingled light color temperature switching process is activated to perform a corresponding mingled light color temperature.

51. The multi-level LED security light according to claim 50, wherein the selection switch is a slide switch, a rotary switch, a pull chain switch or any switch design having a capacity to perform the same selection function.

52. The multi-level LED security light according to claim 46, wherein the at least one external control device includes a power interruption detection circuitry electrically coupled to the first controller for detecting a short power interruption signal; wherein when the short power interruption signal is detected, the first controller operates to alternately switch a selection of different mingled light color temperatures according to the at least one color temperature switching scheme preprogrammed.

53. The multi-level LED security light according to claim 46, wherein the at least one external control device includes a wireless signal receiver to receive a wireless external control signal from a mobile device, a smart phone, a smart speaker or a cloud sever and to convert the wireless external control signal into the at least one external control signal interpretable and executable by the first controller for activating the pick and play process for selecting a corresponding mingled light color temperature tuning process in the at least one color temperature switching scheme for performing a corresponding first mingled light color temperature or a corresponding second mingled light color temperature.

54. A multi-level LED security light comprising:
a light-emitting unit configured with a plurality of LEDs;
a loading and power control unit;
a light sensing control unit;
a motion sensing unit;
a power supply unit; and
an external control unit including at least one external control device outputting at least one external control signal;
wherein the plurality of LEDs are divided into at least a first LED load comprising N number of LEDs and a second LED load comprising M number of LEDs, wherein N and M are positive integers, wherein N is greater than or equal to 1, wherein a value of M is required to be greater than or equal to a value of N; wherein the N number LEDs emit light with a low color temperature in a low color temperature range between 2000K and 3000K and the M number LEDs emit light with a high color temperature in a high color temperature range between 4000 K and 6500K;
wherein the loading and power control unit includes at least a first controller and a switching circuitry, wherein the switching circuitry is electrically coupled with a DC power source configured in the power supply unit and the light-emitting unit, wherein the switching circuitry comprises at least two controllable semiconductor switching devices including a first controllable semiconductor switching device electrically connected with the DC power source and the first LED load and a second controllable semiconductor switching device electrically connected with the DC power source and the second LED load;

wherein the first controller is electrically coupled with the light sensing control unit, the motion sensing unit, the first controllable semiconductor switching device, the second controllable semiconductor switching device and the at least one external control device;

wherein the first controller outputs a first control signal to control at least a conduction state of the first controllable semiconductor switching device for delivering a first electric power to the first LED load and at least a second control signal to control at least a second conduction rate of at least the second controllable semiconductor switching device for delivering a second electric power to the second LED load such that the light-emitting unit respectively generates different illuminations of different light intensities with different light color temperatures according to signals respectively received from the light sensing control unit, the motion sensing unit and the at least one external control device;

wherein at dusk when a light intensity level of an ambient light detected by the light sensing control unit is lower than a first predetermined value, the loading and power control unit manages to deliver at least a first electric power to the light-emitting unit to generate a first level illumination characterized by a first light intensity with a first color temperature in a color temperature range between 2000K and 6500K for a first predetermined time duration;

wherein at dawn, when the light intensity level of the ambient light detected by the light sensing control unit is higher than a second predetermined value, the loading and power control unit manages to switch off the light-emitting unit;

wherein when a motion signal is detected by the motion sensing unit, the loading and power control unit manages to deliver at least a second electric power to the light-emitting unit to generate a second level illumination characterized by a second light intensity with a second color temperature in the color temperature range from 2700K to 6500K for a second predetermined time duration before switching back to perform the first level illumination with the first color temperature, wherein the second light intensity is greater than the first light intensity and the second color temperature is higher than the first color temperature;

wherein the at least one external control device is used for adjusting and setting at least one operating parameter of the multi-level LED security light including but not limited to at least a time length of the first predetermined time duration, a time length of the second predetermined time duration, a light intensity value of the first light intensity of the first level illumination, a light intensity value of the second light intensity of the second level illumination, a color temperature value of the first color temperature of the first level illumination, a color temperature value of the second color temperature of the second level illumination and a detection sensitivity of the motion sensing unit;

wherein the plurality of LEDs in conjunction with a power level setting of the DC power source of the power supply unit are respectively designed with a configuration of in series and/or in parallel connections of LEDs such that an electric current passing through each LED of the light-emitting unit remains at a level such that a voltage V across each LED complies with an operating constraint of $V_{th}<V<V_{max}$ featuring electrical characteristics of an LED;

wherein $V_{th}$ is a reference value of a threshold voltage required to trigger each LED to start emitting light and $V_{max}$ is a reference value of a maximum operating voltage across each LED to avoid a thermal damage or burning out of LED construction;

wherein when each LED load of the light-emitting unit is configured with a plurality of LEDs electrically connected in series or sets of in parallel connected LEDs electrically connected in series, a working voltage across each LED load of the light-emitting unit is confined in a domain between a minimum voltage equal to a sum of the threshold voltages of all LEDs electrically connected in series or sets of in parallel connected LEDs electrically connected in series and a maximum voltage equal to the sum of the maximum operating voltages of all LEDs electrically connected in series or sets of in parallel connected LEDs electrically connected in series;

wherein when the plurality of LEDs are phosphor based white light LEDs produced by coating at least one phosphor compound on surfaces of blue light LEDs, the reference value of the threshold voltage is estimated at 2.5 volts and the reference value of the maximum operating voltage is estimated at 3.5 volts, therefore the voltage V across each LED is required to comply with the operating constraint of 2.5 volts<V<3.5 volts and the working voltages imposed on the first LED load and the second LED load respectively represented by $V_N$ and $V_M$ are confined in domains expressed by $N_s \times 2.5$ volts<$V_N$<$N_s \times 3.5$ volts and $M_s \times 2.5$ volts<$V_M$<$M_s \times 3.5$ volts, wherein $N_s$ and $M_s$ are positive integers with $N_s$ and $M_s$ respectively denoting the numbers of in series connected LEDs in the first LED load and the second LED load wherein $N_s \leq N$ and $M_s \leq M$.

55. The multi-level LED security light according to claim 54, wherein the second light intensity is adjustable in a range between 0% and 100% of a maximum light intensity designed for the second level illumination.

56. The multi-level LED security light according to claim 54, wherein the value of M is greater than the value of N and a total wattage of the M number LEDs is greater than a total wattage of the N number LEDs, wherein the first LED load and the second LED load are not covered by a common light diffuser; wherein the first electric power is delivered only to the first LED load for driving the N number LEDs to perform the first level illumination characterized by the first light intensity with the low color temperature in the low color temperature range between 2000K and 3000K, wherein the second electric power is delivered to the second LED load for driving the M number LEDs to perform the second level illumination characterized by the second light intensity with the high color temperature in the high color temperature range between 4000K and 6500K.

57. The multi-level LED security light according to claim 54, wherein the first controllable semiconductor switching device is a first LED driver outputting the first electric power with a constant current delivered to the first LED load; wherein the second controllable semiconductor switching device is a second LED driver outputting the second electric power with a constant current delivered to the second LED load.

58. The multi-level LED security light according to claim 54, wherein the value of M is equal to the value of N and a total wattage of the first LED load is identical to a total wattage of the second LED load, wherein the first LED load and the second LED load are covered by a common light diffuser to generate a diffused light with a mingled light color temperature in the first level illumination or in the second level illumination, wherein the first color temperature of the first level illumination is a first mingled light color temperature and the second color temperature of the second level illumination is a second mingled light color temperature, wherein the first controller outputs a first PWM (pulse width modulation) signal to control a first conduction rate of the first controllable semiconductor switching device and a second PWM signal to control the second conduction rate of the second controllable semiconductor switching device; wherein the first controller is programmed to operate at least one color temperature switching scheme comprising a plurality of different mingled light color temperature performances for tuning and selecting the first mingled light color temperature of the first level illumination or for tuning and setting the second mingled light color temperature of the second level illumination, wherein paired combinations of the first conduction rate of the first controllable semiconductor switching device and the second conduction rate of the second controllable semiconductor switching device respectively for controlling the first electric power delivered to the first LED load and the second electric power delivered to the second LED load for creating different mingled light color temperatures are preprogrammed for operating a pick and play process according to the at least one external control signal received from the at least one external control device and interpreted by the first controller for performing a selected mingled light color temperature; wherein in programming the paired combinations of different conduction rates of the switching circuitry, the first electric power delivered to the first LED load and the second electric power delivered to the second LED load are complementarily and reversely adjusted such that a total of the first electric power delivered to the first LED load and the second electric power delivered to the second LED load remains unchanged.

59. The multi-level LED security light according to claim 58, wherein the at least one external control device includes voltage divider, wherein the voltage divider is configured to output at least one voltage signal with a voltage value, wherein the first controller operates the pick and play process to activate a corresponding mingled light color temperature tuning process in the at least one color temperature switching scheme according to the voltage value of the at least one voltage signal outputted by the voltage divider.

60. The multi-level LED security light according to claim 59, wherein the voltage divider is designed with a step-less/free setting switch, wherein the voltage divider is configured to operate with a variable resistor to output an analog signal with a voltage value corresponding to a final parking location of a switching motion of the step-less/free setting switch on the variable resistor; wherein the first controller is further designed to convert the analog signal from the voltage divider into an executable digital signal for activating the pick and play process, wherein a full range of the voltage value outputted by the voltage divider corresponding to a full length of the variable resistor is divided into a plurality of different digital voltage domains respectively represented by a digital value for respectively activating the pick and play process, wherein the step-less/free setting switch is allowed to park at any location on the variable resistor to generate a corresponding voltage value, wherein the corresponding voltage value is converted into a corresponding digital signal according to a belonging of a voltage domain with respect to the corresponding voltage value received from the voltage divider.

61. The multi-level LED security light according to claim 58, wherein the at least one external control device includes a selection switch configured with a plurality of switching positions with each of the plurality of switching positions respectively for activating a corresponding process in the first controller, wherein when a switching position is operated by the selection switch, a corresponding mingled light color temperature switching process is activated to perform a corresponding mingled light color temperature.

62. The multi-level LED security light according to claim 61, wherein the selection switch is a slide switch, a rotary switch, a pull chain switch or any switch design having a capacity to perform the same selection function.

63. The multi-level LED security light according to claim 58, wherein the at least one external control device includes at least one push button or one touch pad and the at least one external control signal is a voltage signal generated by operating the push button or the touch pad, wherein upon receiving the voltage signal the first controller operates the pick and play process to alternately perform the selected mingled light color temperature in the at least one color temperature switching scheme according to a preset sequence.

64. The multi-level LED security light according to claim 58, wherein the at least one external control device is a power interruption detection circuitry electrically coupled to the first controller for detecting a short power interruption signal; wherein when the short power interruption signal is detected, the first controller operates to alternately switch a selection of different mingled light color temperatures according to the at least one color temperature switching scheme preprogrammed.

65. The multi-level LED security light according to claim 58, wherein the at least one external control device includes a wireless signal receiver to receive a wireless external control signal from a mobile device, a smart phone, a smart speaker or a cloud sever and to convert the wireless external control signal into the at least one external control signal interpretable and executable by the first controller for activating the pick and play process for selecting a corresponding mingled light color temperature tuning process in the at least one color temperature switching scheme for performing a corresponding first mingled light color temperature performance or a corresponding second mingled light color temperature performance.

66. The multi-level LED security light according to claim 54, wherein the plurality of LEDs of the light-emitting unit is divided into the first LED load comprising the N number of LEDs emitting light with a first low color temperature in the range between 2000K and 3000K, the second LED load comprising the M number of LEDs emitting light with a high color temperature in the range between 4000K and 6500K and a third LED load comprising L number of LEDs emitting light with a second low color temperature in the range between 2000K and 3000K; wherein N, M and L are positive integers with M=L>N, wherein the second LED load and the third LED load are covered by a common light diffuser to generate a diffused light with a mingled light color temperature; wherein the switching circuitry includes the first controllable semiconductor switching device, the second controllable semiconductor switching device and a third controllable semiconductor switching device; wherein the first controllable semiconductor switching device is electrically connected between the DC power source and the first LED load with the N number of LEDs, wherein the second controllable semiconductor switching device is electrically connected between the DC power source and the second LED load with the M number of LEDs, wherein the third controllable semiconductor switching device is electrically connected between the DC power source and the third LED load with the L number of LEDs, wherein the first controller is electrically coupled with the light sensing control unit, the motion sensing unit, the first controllable semiconductor switching device, the second controllable semiconductor switching device, the third controllable semiconductor switching device and the at least one external control device;

wherein at dusk when the light intensity level of the ambient light detected by the light sensing control unit is lower than the first predetermined value, the first controller outputs a first PWM signal to conduct the first controllable semiconductor switching device to deliver the first electric power to the first LED load to perform the first level illumination characterized by the first light intensity with the first low color temperature for the first predetermined time duration;

wherein at dawn when the light intensity level of the ambient light detected by the light sensing control unit is higher than the second predetermined value, the first controller operates to cutoff the switching circuitry to switch off the light-emitting unit;

wherein when the motion signal is detected by the motion sensing unit, the first controller operates to output a second PWM signal to control a second conduction rate of the second controllable semiconductor switching device to deliver a second electric power to the second LED load and a third PWM (pulse width modulation) signal to control a third conduction rate of the third controllable semiconductor switching device to deliver a third electric power to the third LED load for performing the second level illumination;

wherein the first controller is programmed to operate with at least one color temperature switching scheme comprising a plurality of different mingled light color temperature tuning processes for tuning and selecting a mingled light color temperature of the second level illumination, wherein paired combinations of the second conduction rate of the second controllable semiconductor switching device and the third conduction rate of the third controllable semiconductor switching device respectively for controlling the second electric power delivered to the second LED load and the third electric power delivered to the third LED load for creating different mingled light color temperatures are preprogrammed for operating a pick and play process according to the at least one external control signal interpretable and executable by the first controller for performing a selected mingled light color temperature;

wherein in programming the paired combinations of different conduction rates of the switching circuitry, the second electric power delivered to the second LED load and the third electric power delivered to the third LED load are complementarily and reversely adjusted such that a sum of the second electric power delivered to the first LED load and the third electric power delivered to the third LED load remains unchanged.

67. An LED security light comprising:
a light-emitting unit;
a loading and power control unit;
a light sensing control unit;
a motion sensing unit;
a power supply unit; and
an external control unit comprising at least one external control device;
wherein the light-emitting unit is configured with at least a first LED load comprising a plurality of LEDs emitting light with a first color temperature in a range between 2000K and 6500K;
wherein the loading and power control unit comprises a controller and a switching circuitry, wherein the switching circuitry comprises at least a first controllable semiconductor switching device;
wherein the controller is electrically coupled with the switching circuitry, the light sensing control unit, the motion sensing unit and the at least one external control device; wherein the switching circuitry is electrically coupled with the power supply unit and the light-emitting unit, wherein the controller outputs different pulse width modulation (PWM) signals to control the switching circuitry for delivering different average electric currents to drive the light-emitting unit for generating different illuminations, wherein the controller outputs each PWM signal respectively to control a conduction period $T_{on}$ and a cutoff period $T_{off}$ of each controllable semiconductor switching device in each duty cycle $T(T=T_{on}+T_{off})$ to control the switching circuitry for delivering different average electric currents to the light-emitting unit for generating different levels of illuminations; wherein the controller outputs at least a first PWM signal and at least a second PWM signal respectively to control the switching circuitry such that the light-emitting unit respectively performs at least a first illumination mode with a first level illumination and at least a second illumination mode with a second level illumination according to signals respectively received from the light sensing control unit, the motion sensing unit and the at least one external control device;
wherein at dusk when a light intensity level of an ambient light detected by the light sensing control unit is lower than a first predetermined value, the controller operates to output the first PWM signal to control a conduction rate of at least the first controllable semiconductor switching device to deliver an average electric current to the light-emitting unit to perform the first illumination mode with the first level illumination for a first predetermined time duration;
wherein when a motion signal is detected by the motion sensing unit, the controller operates to output the second PWM signal to control the conduction rate of at least the first controllable semiconductor switching device to increase the average electric current delivered to the light-emitting unit to perform the second illumination mode with the second level illumination for a second predetermined time duration before being switched back to the first illumination mode with the first level illumination;
wherein the light intensity level of the second level illumination is higher than the light intensity level of the first level illumination;
wherein at dawn when the light intensity level of the ambient light detected by the light sensing control unit is higher than a second predetermined value, the light-emitting unit is switched off by the loading and power control unit;

wherein the at least one external control device is used for adjusting and setting at least one operating parameter of the LED security light including but not limited to a time length of the first predetermined time duration, a time length of the second predetermined time duration, the light intensity level of the first level illumination or the light intensity level of the second level illumination;

wherein the power supply unit is an AC/DC power converter to convert AC power into a DC power to be delivered to the switching circuitry, wherein the switching circuitry is designed with a driving circuitry to output a DC voltage with a constant current electric power to drive at least the first LED load such that an electric current passing through each LED of at least the first LED load remains at a level, and a voltage V across each LED complies with an operating constraint of $V_{th}<V<V_{max}$ featuring LED electrical characteristics;

wherein $V_{th}$ is a reference value of a threshold voltage required to trigger each LED to start emitting light and $V_{max}$ is a reference value of a maximum operating voltage across each LED at which an LED construction in the plurality of LEDs could be vulnerable to a thermal damage; wherein the voltage V is a variable within a narrow dispersion range characterized by an LED voltage bin selected for generating a designated constant forward current;

wherein when at least the first LED load is configured with a plurality of N number LEDs electrically connected in series or N sets of LEDs electrically connected in series, wherein N is a positive integer greater than or equal to 2, wherein a working voltage VN across the LED load is confined in a domain between a minimum voltage equal to the sum of the threshold voltages of all LEDs electrically connected in series or sets of LEDs electrically connected in series and a maximum voltage equal to the sum of the maximum operating voltages of all LEDs electrically connected in series or sets of LEDs electrically connected in series, expressed as $N \times V_{th} < V_N < N \times V_{max}$; wherein when the plurality of LEDs are phosphor based white light LEDs produced by coating at least one phosphor compound on surfaces of blue light LEDs, the reference value of the threshold voltage $V_{th}$ is estimated at 2.5 volts and the reference value of the maximum operating voltage is estimated at 3.5 volts subject to an operating condition that a temperature of each LED connecting pin is controlled at or below 80 degrees centigrade, wherein the voltage V across each LED of the N pieces of LEDs is required to comply with an operating constraint of 2.5 volts<V<3.5 volts and the working voltage $V_N$ imposed on the LED load is thereby confined in a domain expressed by N×2.5 volts<$V_N$<N×3.5 volts.

68. The LED security light according to claim 67, wherein the at least one external control device comprises a voltage divider, wherein when the voltage divider is activated, a DC voltage value is selected and generated by operating a selection switch or by tuning a variable resistor to trigger the controller to activate a corresponding process designed for adjusting and setting the light intensity of the first level illumination in a first predesigned range.

69. The LED security light according to claim 68, wherein the first predesigned range is greater than 0% but less than 100% of a maximum light intensity designed for the LED security light.

70. The LED security light according to claim 67, wherein the light intensity of the second level illumination is adjustable in a second predesigned range, wherein the at least one external control device comprises a voltage divider, wherein when the voltage divider is activated, a DC voltage value is selected and generated by operating a selection switch or by turning a variable resistor to trigger the controller to activate a corresponding process designed for adjusting and setting the light intensity of the second level illumination in the second predesigned range.

71. The LED security light according to claim 70, wherein the second predesigned range is greater than 0% but less than or equal to 100% of a maximum light intensity designed for the LED security light.

72. The LED security light according to claim 67, wherein the at least one external control device is a time setting unit comprising a first timer; wherein the first timer of the time setting unit is configured with a voltage divider for adjusting and setting the time length of the first predetermined time duration of the first level illumination in the first illumination mode, wherein the voltage divider comprises a selection switch or a variable resistor, wherein the voltage divider is electrically coupled to the controller, wherein when the voltage divider is activated, a DC voltage value is selected and generated by operating the selection switch or by tuning the variable resistor to trigger the controller to activate a corresponding process designed for adjusting and setting the time length of the first predetermined time duration of the first level illumination in the first illumination mode.

73. The LED security light according to claim 72, wherein the time length of the first predetermined time duration of the first level illumination is ended at a time point when the light intensity level of the ambient light detected by the light sensing control unit is higher than the second predetermined value and the light-emitting unit accordingly is switched off by the loading and power control unit, wherein the LED security light performs a dusk to dawn security light.

74. The LED security light according to claim 67, wherein the at least one external control device is a time setting unit comprising a second timer; wherein the second timer of the time setting unit is configured with a voltage divider for adjusting and setting a time length of the second predetermined time duration of the second level illumination in the second illumination mode, wherein the voltage divider comprises a selection switch or a variable resistor, wherein the voltage divider is electrically coupled to the controller, wherein when the voltage divider is activated, a DC voltage value is selected and generated by operating the selection switch or by tuning the variable resistor to trigger the controller to activate a corresponding process designed for adjusting and setting the time length of the second predetermined time duration of the second level illumination in the second illumination mode.

75. The LED security light according to claim 67, wherein the at least one external control device is a wireless remote control device comprising a wireless signal receiver, wherein the wireless remote control device is capable of receiving a wireless external control signal to convert the wireless external control signal into an external control signal interpretable and executable by the controller for adjusting the at least one operating parameter of the LED security light, wherein when the controller receives the external control signal the controller operates to activate a process to accordingly adjust the at least one operating parameter of the LED security light.

76. An LED security light comprising:
a light-emitting unit;
a loading and power control unit;
a light sensing control unit;
a motion sensing unit;
a power supply unit; and
an external control unit comprising at least one external control device;
wherein the light-emitting unit is configured with at least a first LED load comprising a plurality of LEDs emitting light with a first color temperature in a range between 2000K and 6500K;
wherein the loading and power control unit comprises a controller and a switching circuitry, wherein the switching circuitry comprises at least a first controllable semiconductor switching device;
wherein the controller is electrically coupled with the switching circuitry, the light sensing control unit, the motion sensing unit and the at least one external control device; wherein the switching circuitry is electrically coupled with the power supply unit and the light-emitting unit, wherein the controller outputs different pulse width modulation (PWM) signals to respectively control the switching circuitry for delivering different average electric currents to drive the light-emitting unit for generating different levels of illuminations, wherein the controller outputs each PWM signal respectively to control a conduction period $T_{on}$ and a cutoff period $T_{off}$ of each controllable semiconductor switching device in each duty cycle T ($T=T_{on}+T_{off}$) to control the switching circuitry for delivering different average electric currents to the light-emitting unit for generating different levels of illuminations; wherein the controller outputs at least a first PWM signal and at least a second PWM signal respectively to control the switching circuitry such that the light-emitting unit respectively performs at least a first illumination mode with a first level illumination and at least a second illumination mode with a second level illumination according to signals respectively received from the light sensing control unit, the motion sensing unit and the at least one external control device;
wherein at dusk when a light intensity level of an ambient light detected by the light sensing control unit is lower than a first predetermined value, the controller operates to output at least the first PWM signal to control the switching circuitry to deliver a first average electric current to the light-emitting unit to perform the first illumination mode with the first level illumination for a first predetermined time duration with the motion sensing unit being temporarily ignored by the controller for controlling an illumination;
wherein upon a maturity of the first predetermined time duration the loading and power control unit manages to cutoff the average electric current to turn off the light-emitting unit and at the same time the motion sensing unit is resumed activated by the controller for controlling the illumination;
wherein when a motion signal is detected by the motion sensing unit, the controller operates to output the second PWM signal to control the switching circuitry to deliver a second average electric current to the light-emitting unit to perform the second illumination mode with the second level illumination for a second predetermined time duration before the light-emitting unit is switched back to a turned off state;
wherein the light intensity level of the second level illumination is higher than the light intensity level of the first level illumination;
wherein at dawn when the light intensity level of the ambient light detected by the light sensing control unit is higher than a second predetermined value, the light-emitting unit is switched off by the loading and power control unit;
wherein the at least one external control device is used for adjusting and setting at least one operating parameter of the LED security light including but not limited to at least one of a time length of the first predetermined time duration, a time length of the second predetermined time duration, a light intensity of the first level illumination or a light intensity of the second level illumination;
wherein the power supply unit is an AC/DC power converter to convert AC power into a DC power to be delivered to the switching circuitry, wherein the switching circuitry is designed with a driving circuitry to output a DC voltage with a constant current electric power to drive the LED load such that an electric current passing through each LED of the LED load remains at a level such that a voltage V across each LED complies with an operating constraint of $V_{th}<V<V_{max}$ featuring LED electrical characteristics;
wherein $V_{th}$ is a reference value of a threshold voltage required to trigger each LED to start emitting light and $V_{max}$ is a reference value of a maximum operating voltage across each LED at which an LED construction in the plurality of LEDs could be vulnerable to a thermal damage;
wherein when the LED load is configured with a plurality of N number LEDs electrically connected in series or N sets of LEDs electrically connected in series, wherein N is a positive integer greater than or equal to 1, wherein a working voltage $V_N$ across the LED load is confined in a domain between a minimum voltage equal to the sum of the threshold voltages of all LEDs electrically connected in series or sets of LEDs electrically connected in series and a maximum voltage equal to the sum of the maximum operating voltages of all LEDs electrically connected in series or sets of LEDs electrically connected in series, expressed as $N\times V_{th}<V_N<N\times V_{max}$; wherein when the plurality of LEDs are phosphor based white light LEDs produced by coating at least one phosphor compound on surfaces of blue light LEDs, the reference value of the threshold voltage $V_{th}$ is estimated at 2.5 volts and the reference value of the maximum operating voltage is estimated at 3.5 volts subject to an operating condition that a temperature of each LED connecting pin is controlled at or below 80 degrees centigrade, wherein the voltage V across each LED of the N pieces of LEDs is required to comply with an operating constraint of 2.5 volts<V<3.5 volts and the working voltage $V_N$ imposed on the LED load is thereby confined in a domain expressed by $N\times 2.5$ volts<$V_N$<$N\times 3.5$ volts.

77. The LED security light according to claim 76, wherein the light intensity of the first level illumination in the first illumination mode is adjustable; wherein a first external control device in the external control unit outputs a first external control signal to the controller, wherein the controller correspondingly outputs a different first PWM signal to control the conduction rate of the controllable semiconductor switching device for adjusting the light intensity of the first level illumination in the first illumination mode; wherein the first external control device comprises a voltage divider, wherein when the voltage divider is activated, a DC voltage value is selected and generated by operating a selection switch or by tuning a variable resistor to trigger the controller to activate a corresponding process designed for adjusting and setting the light intensity of the first level illumination in a first predesigned range.

78. The LED security light according to claim 77, wherein the first predesigned range is greater than 0% but less than 100% of a maximum light intensity designed for the LED security light.

79. The LED security light according to claim 76, wherein the light intensity of the second level illumination in the second illumination mode is adjustable;
wherein a second external control device in the external control unit outputs a second external control signal to the controller, wherein the controller correspondingly outputs a different second PWM signal to control the controllable semiconductor switching device for adjusting the light intensity of the second level illumination in the second illumination mode; wherein the second external control device comprises a voltage divider, wherein when the voltage divider is activated, a DC voltage value is selected and generated by operating a selection switch or by turning a variable resistor to trigger the controller to activate a corresponding process designed for adjusting and setting the light intensity of the second level illumination in a second predesigned range.

80. The LED security light according to claim 79, wherein the second predesigned range is greater than 0% but less than or equal to 100% of a maximum light intensity designed for the LED security light.

81. The LED security light according to claim 76, wherein the at least one external control device further comprises a time setting unit including at least a first timer; wherein the first timer of the time setting unit is configured with a voltage divider for adjusting and setting the time length of the first predetermined time duration of the first level illumination in the first illumination mode, wherein the voltage divider comprises a selection switch or a variable resistor, wherein the voltage divider is electrically coupled to the controller, wherein when the voltage divider is activated, a DC voltage value is selected and generated by operating a selection switch or by tuning the variable resistor to trigger the controller to activate a corresponding process designed for adjusting and setting the time length of the first predetermined time duration of the first level illumination in the first illumination mode.

82. The LED security light according to claim 81, wherein the time length of the first predetermined time duration of the first level illumination is optionally ended at a time point when the ambient light detected by the light sensing control unit is higher than the second predetermined value and the light-emitting unit accordingly is switched off by the loading and power control unit, wherein the LED security light performs a dusk to dawn security light.

83. The LED security light according to claim 76, wherein the at least one external control device further includes a time setting unit comprising at least a second timer; wherein the second timer of the time setting unit is configured with a voltage divider for adjusting and setting the time length of the second predetermined time duration of the second level illumination in the second illumination mode, wherein the voltage divider comprises a selection switch or a variable resistor, wherein the voltage divider is electrically coupled to the controller, wherein when the voltage divider is activated, a DC voltage value is selected and generated by operating a selection switch or by tuning the variable resistor to trigger the controller to activate a corresponding process designed for adjusting and setting the time length of the second predetermined time duration of the second level illumination in the second illumination mode.

84. The LED security light according to claim 76, wherein the at least one external control device is a wireless remote control device comprising a wireless signal receiver, wherein the wireless remote control device is capable of receiving a wireless external control signal and converting the wireless external control signal into an external control signal interpretable and executable by the controller for adjusting the at least one operating parameter of the LED security light, wherein when the controller receives the external control signal the controller operates to activate a process to accordingly adjust the at least one operating parameter of the LED security light; wherein the at least one operating parameter is the light intensity of the first level illumination, the light intensity of the second level illumination, the time length of the first predetermined time duration, or the time length of the second predetermined time duration.

85. An LED security light comprising:
a light-emitting unit;
a loading and power control unit;
a light sensing control unit;
a motion sensing unit;
a power supply unit; and
an external control unit comprising at least one external control device;
wherein the light-emitting unit is configured with at least a first LED load comprising a plurality of LEDs emitting light with a first color temperature in a range between 2000K and 6500K;
wherein the loading and power control unit comprises a controller and a switching circuitry, wherein the switching circuitry comprises at least a first controllable semiconductor switching device;
wherein the controller is electrically coupled with the switching circuitry, the light sensing control unit, the motion sensing unit and the at least one external control device; wherein the switching circuitry is electrically coupled with the power supply unit and the light-emitting unit, wherein the controller outputs different pulse width modulation (PWM) signals to respectively control the switching circuitry for delivering different average electric currents to drive the LED load of the light-emitting unit for generating different illuminations, wherein the controller outputs each PWM signal respectively to control a conduction period $T_{on}$ and a cutoff period $T_{off}$ of each controllable semiconductor switching device in each duty cycle T ($T=T_{on}+T_{off}$) to control the switching circuitry for delivering different average electric currents to the light-emitting unit for generating different levels of illuminations; wherein the controller outputs at least a first PWM signal, at least a second PWM signal and at least a third PWM signal respectively to control the switching circuitry such that the light-emitting unit respectively performs at least a first illumination mode with a first level illumination, at least a second illumination mode with a second level illumination and at least a third illumination mode with a third level illumination;

wherein at dusk when a light intensity level of an ambient light detected by the light sensing control unit is lower than a first predetermined value, the loading and power control unit operates to deliver an average electric current to the LED load to turn on the light-emitting unit to perform the first illumination mode with the first level illumination for a first predetermined time duration with the motion sensing unit being temporarily ignored for controlling an illumination;

wherein upon a maturity of the first predetermined time duration the loading and power control unit manages to reduce the average electric current delivered to the LED load to enable the light-emitting unit to perform the second illumination mode with the second level illumination for a second predetermined time duration and at the same time the motion sensing unit is activated by the controller for controlling the illumination;

wherein when a motion signal is detected by the motion sensing unit, the loading and power control unit operates to increase the average electric current to the LED load of the light-emitting unit to perform the third illumination mode with the third level illumination for a third predetermined time duration before the light-emitting unit is switched back to perform the second illumination with the second level illumination;

wherein a light intensity of the third level illumination is higher than a light intensity of the second level illumination;

wherein at dawn when the light intensity level of the ambient light detected by the light sensing control unit is higher than a second predetermined value, the light-emitting unit is switched off by the loading and power control unit;

wherein the at least one external control device is used for adjusting and setting at least one operating parameter of the LED security light including but not limited to at least one of a time length of the first predetermined time duration, a time length of the second predetermined time duration, a time length of the third predetermined time duration, a light intensity of the first level illumination, a light intensity of the second level illumination or a light intensity of the third level illumination;

wherein the power supply unit is an AC/DC power converter to convert AC power into a DC power to be delivered to the switching circuitry, wherein the switching circuitry is designed with a driving circuitry to output a DC voltage with a constant current electric power to drive the LED load such that an electric current passing through each LED of the LED load remains at a level such that a voltage V across each LED complies with an operating constraint of $V_{th}<V<V_{max}$ featuring LED electrical characteristics;

wherein $V_{th}$ is a reference value of a threshold voltage required to trigger each LED to start emitting light and Vmax is a reference value of a maximum operating voltage across each LED at which an LED construction in the plurality of LEDs could be vulnerable to a thermal damage;

wherein when the LED load is configured with a plurality of N number LEDs electrically connected in series, or N sets of LEDs electrically connected in series, wherein N is a positive integer greater than or equal to 2, wherein a working voltage VN across the LED load is confined in a domain between a minimum voltage equal to the sum of the threshold voltages of all LEDs electrically connected in series or sets of LEDs electrically connected in series and a maximum voltage equal to the sum of the maximum operating voltages of all LEDs electrically connected in series or sets of LEDs electrically connected in series, expressed as $N\times V_{th}<V_N<N\times V_{max}$, wherein when the plurality of LEDs are phosphor based white light LEDs produced by coating at least one phosphor compound on surfaces of blue light LEDs, the reference value of the threshold voltage $V_{th}$ is estimated at 2.5 volts and the reference value of the maximum operating voltage is estimated at 3.5 volts subject to an operating condition that a temperature of each LED connecting pin is controlled at or below 80 degrees centigrade, wherein the voltage V across each LED of the N pieces of LEDs is required to comply with an operating constraint of 2.5 volts<V<3.5 volts and the working voltage $V_N$ imposed on the LED load is thereby confined in a domain expressed by $N\times 2.5$ volts$<V_N<N\times 3.5$ volts.

86. The LED security light according to claim 85, wherein a light intensity of the first level illumination in the first illumination mode is adjustable; wherein the at least one external control device outputs a first external control signal to the controller, wherein the controller correspondingly outputs a different first PWM signal to control the controllable semiconductor switching device for adjusting the light intensity of the first level illumination in the first illumination mode; wherein the at least one external control device comprises a voltage divider, wherein when the voltage divider is activated, a DC voltage value is selected and generated by operating a selection switch or by turning a variable resistor to trigger the controller to activate a corresponding process designed for adjusting and setting the light intensity of the first level illumination in a first predesigned range.

87. The LED security light according to claim 86, wherein the first predesigned range is greater than 0% but less than or equal to 100% of a maximum light intensity designed for the LED security light.

88. The LED security light according to claim 85, wherein the light intensity of the second level illumination in the second illumination mode is adjustable; wherein the at least one external control device outputs a second external control signal to the controller, wherein the controller correspondingly outputs a different second PWM signal to control the controllable semiconductor switching device for adjusting the light intensity of the second level illumination in the second illumination mode;

wherein the at least one external control device comprises a voltage divider, wherein when the voltage divider is activated, a DC voltage value is selected and generated by operating a selection switch or by turning a variable resistor to trigger the controller to activate a corresponding process designed for adjusting and setting the light intensity of the second level illumination in a second predesigned range; wherein the second predesigned range is adjustable in the range greater than 0% but less than or equal to 50% of a maximum light intensity designed for the LED security light.

89. The LED security light according to claim 85, wherein the light intensity of the third level illumination in the third illumination mode is adjustable; wherein the at least one external control device outputs a third external control signal to the controller, wherein the controller correspondingly outputs a different third PWM signal to control the controllable semiconductor switching device for adjusting the light intensity of the third level illumination in the third illumination mode; wherein the at least one external control device comprises a voltage divider, wherein when the voltage divider is activated, a DC voltage value is selected and generated by operating a selection switch or by turning a variable resistor to trigger the controller to activate a corresponding process designed for adjusting and setting the light intensity of the third level illumination in a third predesigned range.

90. The LED security light according to claim 89, wherein the third predesigned range is greater than or equal to 50% but less than or equal to 100% of a maximum light intensity designed for the LED security light.

91. The LED security light according to claim 85, wherein the at least one external control device further includes a time setting unit comprising at least a first timer; wherein the first timer of the time setting unit is configured with a voltage divider for adjusting and setting a time length of the predetermined time duration of the first level illumination in the first illumination mode, wherein the voltage divider comprises a variable resistor, wherein the voltage divider is electrically coupled to the controller, wherein when the voltage divider is activated, a DC voltage value is selected and generated by operating a selection switch or by tuning the variable resistor to trigger the controller to activate a corresponding process designed for adjusting and setting the time length of the predetermined time duration of the first level illumination in the first illumination mode.

92. The LED security light according to claim 91, wherein the time length of the first predetermined time duration of the first level illumination is optionally ended at a time point when the ambient light detected by the light sensing control unit is higher than the second predetermined value and the light-emitting unit accordingly is switched off at dawn by the loading and power control unit, wherein the LED security light performs a dusk to dawn security light.

93. The LED security light according to claim 85, wherein the at least one external control device further includes a time setting unit comprising at least a second timer; wherein the second timer of the time setting unit is configured with a voltage divider for adjusting and setting a time length of the second preset time period of the third level illumination in the third illumination mode, wherein the voltage divider comprises a variable resistor, wherein the voltage divider is electrically coupled to the controller, wherein when the voltage divider is activated, a DC voltage value is selected and generated by operating a selection switch or by tuning the variable resistor to trigger the controller to activate a corresponding process designed for adjusting and setting the time length of the second preset time period of the third level illumination in the third illumination mode.

94. The LED security light according to claim 85, wherein the at least one external control device further includes a time setting unit comprising at least a third timer; wherein the third timer of the time setting unit is configured with a voltage divider for adjusting and setting a time length of the first preset time period of the second level illumination in the second illumination mode, wherein the voltage divider comprises a selection switch or a variable resistor, wherein the voltage divider is electrically coupled to the controller, wherein when the voltage divider is activated, a DC voltage value is selected and generated by operating a selection switch or by tuning the variable resistor to trigger the controller to activate a corresponding process designed for adjusting and setting the time length of the first preset time period of the second level illumination in the second illumination mode.

95. The LED security light according to claim 85, wherein the at least one external control device is a wireless remote control device comprising a wireless signal receiver, wherein the wireless remote control device is capable of receiving a wireless external control signal and converting the wireless external control signal into an external control signal interpretable and executable by the controller for adjusting the at least one operating parameter of the LED security light, wherein when the controller receives the external control signal the controller operates to activate a process to accordingly adjust the at least one operating parameter of the LED security light; wherein the at least one operating parameter is the light intensity of the first level illumination, the light intensity of the second level illumination, the light intensity of the third level illumination, the time length of the first predetermined time duration, the time length of the second predetermined time duration, or the time length of the third predetermined time duration.

96. An LED security light comprising:
a light-emitting unit;
a loading and power control unit;
a light sensing control unit;
a motion sensing unit;
a power supply unit; and
an external control unit comprising at least one external control device;
wherein the light-emitting unit is configured with at least a first LED load comprising a plurality of LEDs emitting light with a first color temperature in a range between 2000K and 6500K;
wherein the loading and power control unit comprises a controller and a switching circuitry, wherein the switching circuitry comprises at least a first controllable semiconductor switching device;
wherein the controller is electrically coupled with the switching circuitry, the light sensing control unit, the motion sensing unit, and the at least one external control device;
wherein the switching circuitry is electrically coupled with the power supply unit and the light-emitting unit, wherein the controller outputs at least one pulse width modulation (PWM) signal to control the switching circuitry for delivering at least one average electric current to drive the LED load of the light-emitting unit for generating at least one illumination according to signals respectively received from the light sensing control unit, the motion sensing unit and the at least one external control device;
wherein at dusk when a light intensity level of an ambient light detected by the light sensing control unit is lower than a first predetermined value, the loading and power control unit operates to activate the motion sensing unit;
wherein when a motion signal is detected by the motion sensing unit, the controller operates to output a first PWM signal to control at least a first conduction rate of at least the first controllable semiconductor switching device to deliver an average electric current to at least the first LED load of the light-emitting unit to perform a first level illumination for a first predetermined time duration before being switched back to a turned off state for detecting a next motion signal;
wherein the at least one external control device is used for adjusting and setting at least one operating parameter of the LED security light including but not limited to at least one of a time length of the first predetermined time duration or a light intensity of the first level illumination;
wherein at dawn when the light intensity level of the ambient light detected by the light sensing control unit is higher than a second predetermined value, the light-emitting unit is switched off by the loading and power control unit;

wherein the power supply unit is an AC/DC power converter to convert AC power into a DC power delivered to the switching circuitry, wherein the switching circuitry is designed with a driving circuitry to output a DC voltage with a constant current electric power to drive the LED load such that an electric current passing through each LED of the LED load remains at a level such that a voltage V across each LED complies with an operating constraint of $V_{th}<V<V_{max}$ featuring LED electrical characteristics;

wherein $V_{th}$ is a reference value of a threshold voltage required to trigger each LED to start emitting light and $V_{max}$ is a reference value of a maximum operating voltage across each LED at which at least an LED construction in the plurality of LEDs could be vulnerable to a thermal damage;

wherein when at least the first LED load is configured with a plurality of N number LEDs electrically connected in series or N sets of LEDs electrically connected in series, wherein N is a positive integer greater than or equal to 2, wherein a working voltage VN across the first LED load is confined in a domain between a minimum voltage equal to the sum of the threshold voltages of all LEDs electrically connected in series or sets of LEDs electrically connected in series and a maximum voltage equal to the sum of the maximum operating voltages of all LEDs electrically connected in series or sets of LEDs electrically connected in series, expressed as $N \times V_{th} < V_N < N \times V_{max}$;

wherein when the plurality of LEDs are phosphor based white light LEDs produced by coating at least one phosphor compound on surfaces of blue light LEDs, the reference value of the threshold voltage $V_{th}$ is estimated at 2.5 volts and the reference value of the maximum voltage is estimated at 3.5 volts subject to an operating condition that a temperature of each LED connecting pin is controlled at or below 80 degrees centigrade, wherein the voltage V across each LED of the N pieces of LEDs is required to comply with an operating constraint of 2.5 volts<V<3.5 volts and the working voltage $V_N$ imposed on the LED load is thereby confined in a domain expressed by N×2.5 volts<$V_N$<N×3.5 volts.

97. The LED security light according to claim 96, wherein a light intensity of the first level illumination is adjustable, wherein the at least one external control device outputs at least one external control signal to the controller, wherein the controller correspondingly outputs a different first PWM signal to control the conduction rate of the controllable semiconductor switching device for adjusting the light intensity of the first level illumination; wherein the at least one external control device comprises a voltage divider, wherein when the voltage divider is activated, a DC voltage value is selected and generated by operating a selection switch or by tuning a variable resistor to trigger the controller to activate a corresponding process designed for adjusting and setting the light intensity of the first level illumination in a predesigned range.

98. The LED security light according to claim 97, wherein the predesigned range is greater than 0% but less than or equal to 100% of a maximums light intensity designed for the LED security light.

99. The LED security light according to claim 96, wherein the at least one external control device further includes a time setting unit comprising at least a first timer for adjusting and setting the time length of the first predetermined time duration, wherein the first timer of the time setting unit is configured with a voltage divider for adjusting and setting a time length of the first predetermined time duration of the first level illumination, wherein the voltage divider is configured with a selection switch or a variable resistor, wherein the voltage divider is electrically coupled to the controller, wherein when the voltage divider is activated by operating the selection switch or by tuning the variable resistor, a DC voltage with a value being the first external control signal is delivered to the controller, wherein the controller accordingly operates to control the time length of the first PWM signal for adjusting and setting the time length of the first predetermined time duration of the first level illumination.

100. The LED security light according to claim 96, wherein the at least one external control device is a wireless remote control device comprising a wireless signal receiver, wherein the wireless remote control device is capable of receiving a wireless external control signal and converting the wireless external control signal into an external control signal interpretable and executable by the controller for adjusting at least an operating parameter of the LED security light, wherein when the controller receives the external control signal, the controller operates to activate a process to accordingly adjust the operating parameter of the LED security light.

101. The LED security light according to claim 100, wherein the operating parameter is the light intensity of the first level illumination or a time length of the first predetermined time duration.

102. A multi-level LED security light comprising:
a light-emitting unit configured with at least a first LED load for emitting light with a first color temperature in a range between 2000K and 3000K and at least a second LED load for emitting light with a second color temperature in a range between 4000K and 6500K;
a diffuser covering the first LED load and the second LED load to create a diffused light with a mingled light color temperature;
a loading and power control unit;
a light sensing control unit;
a motion sensing unit;
a power supply unit; and
an external control unit including at least one external control device to output at least one external control signal;
wherein the loading and power control unit comprises at least a first controller and a switching circuitry, wherein the switching circuitry comprises a first controllable semiconductor switching device and a second controllable semiconductor switching device, wherein the first controller is electrically and respectively coupled with the light sensing control unit, the motion sensing unit, the first controllable semiconductor switching device, the second controllable semiconductor switching device, and the at least one external control device;
wherein the switching circuitry is electrically coupled in series with a power source of the power supply unit and the light-emitting unit, wherein the power source is a DC power source configured in the power supply unit to output at least one DC power;
wherein the first LED load and the second LED load are respectively and electrically coupled to the first controllable semiconductor switching device and the second controllable semiconductor switching device of the switching circuitry;

wherein the first controller outputs control signals to respectively control a first conduction rate of the first controllable semiconductor switching device and a second conduction rate of the second controllable semiconductor switching device to perform different illumination modes of the multi-level LED security light characterized by different light intensities and different mingled light color temperatures according to signals respectively received from the light sensing control unit, the motion sensing unit and the at least one external control device;

wherein at dusk when a light intensity level of an ambient light detected by the light sensing control unit is lower than a first predetermined value, the loading and power control unit manages to deliver an average electric power to the light-emitting unit to operate a first illumination mode to perform a first level illumination characterized by a first light intensity and a first mingled light color temperature for a first predetermined time duration;

wherein at dawn when the light intensity level of the ambient light detected by the light sensing control unit is higher than a second predetermined value, the loading and power control unit manages to switch off the light-emitting unit; wherein when a motion signal is detected by the motion sensing unit, the loading and power control unit manages to increase the average electric power delivered to the light-emitting unit to operate a second illumination mode to perform a second level illumination characterized by a second light intensity and a second mingled light color temperature for a second predetermined time duration before switching back to the first illumination mode to perform the first level illumination, wherein the second light intensity is always higher than the first light intensity and the second mingled light color temperature is always higher than the first mingled light color temperature;

wherein the at least one external control device is used for adjusting and setting at least one operating parameter of the multi-level LED security light including but not limited to at least one of the first mingled light color temperature of the first level illumination, the second mingled light color temperature of the second level illumination, the first light intensity of the first level illumination, the second light intensity of the second level illumination, the first predetermined time duration of the first level illumination or the second predetermined time duration of the second level illumination;

wherein the LEDs of the first LED load and the LEDs of the second LED load are respectively designed with a configuration of in series and/or in parallel connections such that when incorporated with a level setting of the DC power source an electric current passing through each LED of the first LED load and each LED of the second LED load remains at a level such that a voltage V across each LED complies with an operating constraint of $V_{th}<V<V_{max}$ featuring electrical characteristics of an LED, wherein $V_{th}$ is a reference value of a threshold voltage required to trigger the LED to start emitting light and $V_{max}$ is a reference value of a maximum operating voltage across the LED to avoid a thermal damage or burning out of LED construction;

wherein when the plurality of LEDs are phosphor based white light LEDs produced by coating at least one phosphor compound on surfaces of blue light LEDs, the reference value of the threshold voltage is estimated at 2.5 volts and the reference value of the maximum operating voltage is estimated at 3.5 volts, therefore the voltage V across each LED is required to comply with the operating constraint of 2.5 volts<V<3.5 volts and the working voltages imposed on the first LED load and the second LED load respectively represented by $V_N$ and $V_M$ are confined in domains expressed by N×2.5 volts<$V_N$<N×3.5 volts and M×2.5 volts<$V_M$<M×3.5 volts, wherein N and M are positive integrals denoting respective numbers of in series connected LEDs in the first LED load and the second LED load, wherein N and M are positive integers, wherein N is greater than or equal to 1, wherein a value of M is required to be greater than or equal to a value of N.

103. The multi-level LED security light according to claim 102, wherein the first light intensity is adjustable in a range greater than 0% but less than or equal to 100% of a maximum light intensity designed for the first illumination mode, wherein the second light intensity is adjustable in a range greater than 0% but less than or equal to 100% of the maximum light intensity designed for the second illumination mode.

104. The multi-level LED security light according to claim 102, wherein the at least one external control device is a voltage divider or a wireless signal receiver, designed with a capacity to generate the at least one external control signal interpretable and executable by the controller for tuning and setting the first mingled light color temperature of the first illumination mode or for tuning and setting the second mingled light color temperature of the second illumination mode, wherein the first controller is programmed to operate with at least one color temperature switching scheme comprising a plurality of different mingled light color temperature performances for tuning and selecting the first mingled light color temperature of the first level illumination or for tuning and selecting the second mingled light color temperature of the second level illumination, wherein paired combinations of the first conduction rate of the first controllable semiconductor switching device and the second conduction rate of the second controllable semiconductor switching device for respectively controlling a first electric power delivered to the first LED load and a second electric power delivered to the second LED load for creating different mingled light color temperatures are preprogrammed for operating a pick and play process according to the at least one external control signal executable and interpretable by the first controller for operating a selection of the first mingled light color temperature performance or the second mingled light color temperature performance; wherein in programming the paired combinations of the first conduction rate and the second conduction rate of the switching circuitry, the first electric power delivered to the first LED load and the second electric power delivered to the second LED load are complementarily and reversely adjusted such that a sum of the first electric power delivered to the first LED load and the second electric power delivered to the second LED load remains unchanged.

105. An LED security light comprising:
a light-emitting unit;
a loading and power control unit;
a light sensing control unit;
a motion sensing unit;
a power supply unit; and
an external control unit comprising at least one external control device;
wherein the light-emitting unit is configured with at least one LED load comprising a plurality of LEDs emitting light with at least one color temperature in a range between 2000K and 6500K;

wherein the loading and power control unit comprises a controller and a switching circuitry, wherein the switching circuitry comprises at least one controllable semiconductor switching device;

wherein the controller is electrically coupled with the switching circuitry, the light sensing control unit, the motion sensing unit, and the at least one external control device; wherein the switching circuitry is electrically coupled with the power supply unit and the light-emitting unit, wherein the controller outputs different pulse width modulation (PWM) signals to control the switching circuitry for delivering different average electric currents to drive the light-emitting unit for generating different illuminations, wherein the controller outputs each PWM signal respectively to control a conduction period $T_{on}$ and a cutoff period $T_{off}$ of each controllable semiconductor switching device in each duty cycle T ($T=T_{on}+T_{off}$) to control the switching circuitry for delivering different average electric currents to the light-emitting unit for generating different levels of illuminations; wherein the controller outputs at least a first PWM signal and a second PWM signal respectively to control the switching circuitry such that the light-emitting unit respectively performs at least a first illumination performance mode with a first level illumination and at least a second illumination performance mode with a second level illumination according to signal(s) received from the light sensing control unit and the motion sensing unit;

wherein at dusk when a light intensity level of an ambient light detected by the light sensing control unit is lower than a first predetermined value, the controller operates to output at least the first PWM signal to control the switching circuitry to deliver an average electric current to the light-emitting unit to perform the first illumination performance mode with the first level illumination for a first predetermined time duration;

wherein when a motion signal is detected by the motion sensing unit, the controller operates to output at least the second PWM signal to control the switching circuitry to increase the average electric current delivered to the light-emitting unit to perform the second illumination performance mode with the second level illumination for a second predetermined time duration before being switched back to the first level illumination;

wherein a light intensity of the second level illumination is higher than a light intensity of the first level illumination;

wherein at dawn when the light intensity level of the ambient light detected by the light sensing control unit is higher than a second predetermined value, the light-emitting unit is switched off by the loading and power control unit;

wherein the at least one external control device is used for adjusting and setting at least one operating parameter of the LED security light including but not limited to at least one of a time length of the first predetermined time duration, a time length of the second predetermined time duration, a light intensity of the first level illumination, a light intensity of the second level illumination, a light color temperature of the first level illumination or a light color temperature of the second level illumination;

wherein the power supply unit is an AC/DC power converter to convert AC power into a DC power delivered to the switching circuitry, wherein the switching circuitry is designed with a driving circuitry to output a DC voltage with a constant current electric power to drive the at least one LED load such that an electric current passing through each LED of the at least one LED load remains at a level, and a voltage V across each LED complies with an operating constraint of $V_{th}<V<V_{max}$ featuring LED electrical characteristics;

wherein $V_{th}$ is a reference value of a threshold voltage required to trigger each LED to start emitting light and $V_{max}$ is a reference value of a maximum operating voltage across each LED at which an LED construction in the plurality of LEDs could be vulnerable to a thermal damage;

wherein when each LED load of the at least one LED load is configured with a plurality of N number LEDs electrically connected in series, or N sets of LEDs electrically connected in series, wherein N is a positive integer greater than or equal to 2, a working voltage $V_N$ across each LED load is confined in a domain between a minimum voltage equal to the sum of the threshold voltages of all LEDs or sets of LEDs electrically connected in series and a maximum voltage equal to the sum of the maximum operating voltages of all LEDs or sets of LEDs electrically connected in series, expressed as $N \times V_{th} < V_N < N \times V_{max}$;

wherein when the plurality of LEDs are phosphor based white light LEDs produced by coating at least one phosphor compound on surfaces of blue light LEDs, the reference value of the threshold voltage $V_{th}$ is estimated at 2.5 volts and the reference value of the maximum operating voltage is estimated at 3.5 volts subject to an operating condition that a temperature of each LED connecting pin is controlled at or below 80 degrees centigrade thru a heat sink, wherein the voltage V across each LED of the N pieces of LEDs is required to comply with an operating constraint of 2.5 volts<V<3.5 volts and the working voltage $V_N$ imposed on the LED load is thereby confined in a domain expressed by $N \times 2.5$ volts $< V_N < N \times 3.5$ volts.

106. The LED security light according to claim 105, wherein the at least one external control device is a wireless external control signal receiver electrically coupled with the controller to receive, decode and convert at least one wireless instruction signal transmitted from a mobile device into at least one value of at least one operating variable delivered to the controller, wherein the controller is programmed with an APP (software application) to interpret and process the at least one value of the at least one operating variable for setting at least one functional performance of the at least one operating parameter, wherein the at least one value of the at least one operating variable represents a setting decision by a user of the mobile device for choosing at least one functional performance of the at least one operating parameter of the LED security light including at least a time length setting, a light intensity setting, a light color temperature setting, a detection sensitivity setting or an illumination performance mode switching and setting among a plurality of two different illumination performance modes.

107. The LED security light according to claim 106, wherein the LED security light is designed with an on line free setting method working in conjunction with the mobile device for setting at least one operating parameter of the LED security light, comprising:

using a user interface APP (software application) comprising at least one free setting algorithm to be loaded in the mobile device according to an APP (software application) installation instruction manual included in a product package of the LED security light to operate, conclude and transform at least one user's setting decision into at least one operating variable of at least one operating parameter of the LED security light;

transmitting via the mobile device at least one wireless instruction signal carrying at least one message of the at least one operating variable to the LED security light for processing at least one value of the at least one operating parameter of the LED security light according to the user's setting decision; and using the controller of the LED security light, designed with a capacity to interpret the at least one wireless instruction signal received by the wireless signal receiver to accordingly manage to output at least one control signal to control, select or set the at least one value of the at least one operating parameter of the LED security light;

wherein the at least one value of the at least one operating parameter is stored in a memory accessible to the controller for a repetitive performance, wherein the at least one value of the at least one operating parameter stored is replaceable by processing a new operating variable selected by the user.

108. The LED security light according to claim 107, wherein the user interface APP (software application) is operable on a touch screen panel of the mobile device, wherein the free setting algorithm is a capacity scale simulation process implemented by a visual configuration of a free setting operator incorporated with a capacity scale simulator and an indicator of the capacity operating rate to facilitate making the at least one user's setting decision in setting at least one desired level of the at least one operating parameter, wherein when the free setting operator is activated by the user to interact with the capacity scale simulator, the user interface APP (software application) responsively manages to gradually adjust a value of the capacity operating rate according to an instantaneous state of interaction between the free setting operator and the capacity scale simulator with the indicator of the capacity operating rate simultaneously showing the instantaneous state of the capacity operating rate, wherein the capacity operating rate shown in the indicator can be an operating percentage, an operating chart, an actual operating value or an actual functional performance of a relevant operating parameter, wherein when a free setting motion of the free setting operator is ceased with at least one setting decision, the user interface APP (software application) manages to generate the at least one operating variable corresponding to a selection of the at least one capacity operating rate and accordingly operates to transmit the at least one wireless instruction signal carrying a message of the operating variable to the LED security light for setting the relevant operating parameter; wherein the capacity scale simulator is implemented by dividing a full operating capacity of the at least one operating parameter into N capacity operating rates ranging from a minimum capacity operating rate greater than 0% of the full operating capacity to a maximum operating rate equal to 100% of the full operating capacity of the at least one operating parameter, wherein the free setting algorithm is configured with at least one capacity operating rate switching scheme comprising the N capacity operating rates respectively and alternatively activated and selected by the free setting operator, wherein N is a positive integer greater than or equal to 2.

109. The LED security light according to claim 108, wherein the capacity scale simulator is a virtual track, wherein the virtual track can be configured with a linear virtual track or an arc virtual track, wherein the free setting algorithm is implemented by operating the free setting operator to interact with the virtual track and the indicator of the capacity operating rate, wherein the free setting operator is slidable by the user's finger along the virtual track with the indicator of the capacity operating rate simultaneously showing instantaneous state of a changing capacity operating rate while the sliding motion of the free setting operator is being conducted, wherein a full length of the virtual track represents a simulation of a value of the full operating capacity of the at least one operating parameter, wherein the capacity operating rate is incrementally changed according to a length of the sliding motion and is determined by a final parking location of the free setting operator on the virtual track when the sliding motion stops.

110. The LED security light according to claim 107, wherein the user interface APP (software application) is operable on a touch screen panel of the mobile device, wherein the capacity scale simulator is a virtual keyboard, wherein the virtual keyboard is configured with N virtual keys representing the free setting operator operable and selectable by the user, wherein each virtual key is indicated with a corresponding capacity operating rate easily recognizable by the user, wherein when a virtual key is clicked by the user, the corresponding capacity operating rate is determined by the free setting algorithm, wherein when a setting decision is concluded, the user interface APP (software application) manages to generate the at least one operating variable corresponding to a selection of the at least one capacity operating rate in the at least one capacity operating rate switching scheme and accordingly operates to transmit the at least one wireless instruction signal carrying a message of the operating variable to the LED security light for setting the relevant operating parameter.

111. The LED security light according to claim 107, wherein the mobile device is a mobile phone, a pad, a PDA, a personal computer, a smart switch, a smart speaker or a remote control device, featured with a capacity to download the user APP (software application) from an Internet or a cloud server for selecting and setting the at least one operating parameter of the LED security light.

112. The LED security light according to claim 107, wherein the free setting algorithm of the user interface APP (software application) is a voice recognition software loaded in a mobile device from the internet or the cloud server to transform a voice instruction of the user's setting decision into at least one operating variable of the at least one operating parameter of the LED security light and convert the at least one operating variable into the at least one wireless instruction signal for transmitting to the wireless signal receiver of the LED security light.

113. The LED security light according to claim 107, wherein the at least one operating parameter is for setting a light color temperature of the first level illumination or a light color temperature of the second level illumination; wherein the light emitting unit includes a first LED load emitting light with a first color temperature in a range between 2000K and 3000K and a second LED load emitting light with a second color temperature in a range between 4000K and 6500K, wherein the first LED load and the second LED load are electrically connected and covered by a light diffuser to create an effect of a mingled light color temperature; wherein the switching circuitry includes at least a first controllable semiconductor switching device and a second controllable semiconductor switching device respectively connected to the first LED load and the second LED load, wherein the controller in response to the at least one wireless instructional signal of the at least one operating variable received from the wireless signal receiver operates to activate a color temperature tuning process to respectively control different combinations of conduction rates between a first conduction rate of the first controllable semiconductor switching device and a second conduction rate of the second controllable semiconductor switching device to manage electric powers respectively allocated to the first LED load and the second LED load for tuning the mingled light color temperature, wherein for performing a power allocation between the first LED load and the second LED load the first conduction rate of the first controllable semiconductor switching device and the second conduction rate of the second controllable semiconductor switching device are reversely and complementarily adjusted such that a total electric power delivered to light-emitting unit remains unchanged.

114. An LED security light, comprising a light-emitting unit comprising at least one LED load emitting light with at least one color temperature in a range between 1800K and 6500K;
- a loading and power control unit;
- a photo sensor;
- a motion sensor;
- a power supply unit; and
- an external control unit, electrically coupled with the loading and power control unit;
- wherein the loading and power control unit comprises a controller and a switching circuitry, wherein the controller is electrically coupled with the photo sensor, the motion sensor, the switching circuitry and the external control unit;
- wherein the switching circuitry is electrically coupled with a power source of the power supply unit and the light emitting unit, wherein the power source is a DC power source;
- wherein the switching circuitry comprises at least one controllable semiconductor switching device; wherein the controller outputs different pulse width modulation signals to control at least one conduction rate of the at least one controllable semiconductor switching device in each cycle period of the DC power characterized by a $T_{on}$ and a $T_{off}$ for delivering different average electric currents to the light-emitting unit such that the light-emitting unit respectively generates illuminations of different light intensities activated by the photo sensor, the motion sensor and the external control unit;
- wherein at dusk when a light intensity level of an ambient light detected by the photo sensor is lower than a first predetermined value, the loading and power control unit operates to activate the motion sensor with the light-emitting unit remaining in a turned off state;
- wherein when a motion signal is detected by the motion sensor, the loading and power control unit operates to deliver an average electric current to the light-emitting unit to perform a first level illumination emitting light with a first light intensity and a first color temperature for a preset time period before being switched back to the turned off state, wherein the first light intensity is set in a range being greater than zero, but less than or equal to 100% of a maximum illumination capacity designed for the LED security light;
- wherein at dawn when the light intensity level of the ambient light detected by the photo sensor is higher than a second predetermined value, the light emitting unit is switched off by the loading and power control unit;
- wherein the external control unit is a wireless signal receiver electrically coupled with the controller to receive, decode and convert at least one wireless instruction signal into at least one value of at least one operating variable interpretable to the controller, wherein the controller is programmed with an APP (software application) for interpreting and processing the at least one value of the at least one operating variable for setting at least one operating parameter of the LED security light, wherein the at least one operating variable represents a setting decision by a user for choosing at least one functional performance of the at least one operating parameter of the LED security light, wherein the at least one operating parameter is used for controlling at least one of various functional performance settings of the LED security light including a time length setting, a light intensity setting, a light color temperature setting, a detection sensitivity setting or an illumination performance mode switching and setting among a plurality of different illumination performance modes;
- wherein the power supply unit is an AC/DC power converter to convert AC power into a DC power delivered to the switching circuitry, wherein the switching circuitry is designed with a driving circuitry to output a DC voltage with a constant current electric power to drive at least one LED load such that an electric current passing through each LED of the at least one LED load remains at a level such that a voltage V across each LED complies with an operating constraint of $V_{th} < V < V_{max}$ featuring LED electrical characteristics; wherein $V_{th}$ is a reference value of a threshold voltage required to trigger each LED to start emitting light and $V_{max}$ is a reference value of a maximum operating voltage across each LED at which an LED construction in the plurality of LEDs could be vulnerable to a thermal damage;
- wherein when each LED load of the at least one LED load is configured with a plurality of N number LEDs electrically connected in series or N sets of LEDs electrically connected in series, wherein N is a positive integer greater than or equal to 2, a working voltage VN across each LED load is confined in a domain between a minimum voltage equal to the sum of the threshold voltages of all LEDs electrically connected in series or sets of LEDs electrically connected in series and a maximum voltage equal to the sum of the maximum operating voltages of all LEDs electrically connected in series or sets of LEDs electrically connected in series, expressed as $N \times V_{th} < V_N < N \times V_{max}$;
- wherein when the plurality of LEDs are phosphor based white light LEDs produced by coating at least one phosphor compound on surfaces of blue light LEDs, the reference value of the threshold voltage Vth is estimated at 2.5 volts and the reference value of the maximum operating voltage is estimated at 3.5 volts subject to an operating condition that a temperature of each LED connecting pin is controlled at or below 80 degrees centigrade thru a heat sink, wherein the voltage V across each LED of the N pieces of LEDs is required to comply with an operating constraint of 2.5 volts<V<3.5 volts and the working voltage $V_N$ imposed on the at least one LED load is thereby confined in a domain expressed by N×2.5 volts<$V_N$<N×3.5 volts.

115. The LED security light according to claim 114, wherein the LED security light is designed with an on line free setting method working in conjunction with a mobile device for setting the at least one operating parameter of the LED security light, comprising:
   using a user interface APP (software application) comprising at least one free setting algorithm loaded in a mobile device to transform a user's setting decision into at least one operating variable of the at least one operating parameter of the LED security light;
   transmitting via the mobile device at least one wireless instruction signal carrying at least one message of the at least one operating variable to the LED security light according to the user's setting decision; and
   using a controller of the LED lighting device designed with a capacity to interpret and convert the at least one wireless instruction signal into the at least one operating variable of the at least one operating parameter and accordingly manage to output at least one control signal to control a switching circuitry of the LED lighting device to control, adjust and set a functional performance of the at least one operating parameter;
   wherein when the user's interface APP is activated and concluded with at least one setting decision, the user interface APP manages to transmit via the mobile device the at least one wireless instruction signal carrying at least one message of the at least one operating variable to the LED security light, wherein the at least one operating variable is used for controlling, adjusting and setting the functional performance of the at least one operating parameter of the LED security light;
   wherein the at least one operating variable of the at least one operating parameter is stored in a memory of the controller for a repetitive performance, wherein the at least one operating variable of the at least one operating parameter stored is replaceable by a new operating variable reset by the user;
   wherein the user interface APP is operable on a touch screen panel of the mobile device, wherein the free setting algorithm is configured with a capacity scale simulation process implemented by a visual configuration of a free setting operator working in conjunction with a capacity scale simulator and an indicator of a capacity operating rate to facilitate the user's decision making process in setting a desired level of the functional performance of the at least one operating parameter, wherein the capacity scale simulation process is configured with at least one capacity operating rate switching scheme comprising a plurality of different capacity operating rates, wherein when the free setting operator is activated by the user to interact with the capacity scale simulator, the user's interface APP responsively manages to determine a value of the capacity operating rate in the at least one capacity operating rate switching scheme by selection or by computation according to an instantaneous state of an interaction between the free setting operator and the capacity scale simulator with the indicator of the capacity operating rate simultaneously showing an instantaneous value of the capacity operating rate or an illumination performance state of the at least one operating parameter, wherein the instantaneous value of the capacity operating rate or the illumination performance state of the at least one operating parameter shown in the indicator can be an operating percentage, an operating chart, an operating value, an actual functional performance or a performance mode selection code of a relevant operating parameter, wherein when a free setting motion of the free setting operator is ceased, the user interface APP manages to generate the at least one operating variable corresponding to the capacity operating rate or the illumination performance state being determined and accordingly operates to transmit the at least one wireless instruction signal carrying the at least one message of the at least one operating variable to the LED security light for execution;
   wherein the capacity scale simulator is implemented by dividing a full operating capacity of the at least one operating parameter into N capacity operating rates ranging from a minimum capacity operating rate greater than 0% of the full operating capacity to a maximum operating rate equal to 100% of the full operating capacity of the at least one operating parameter, wherein the free setting algorithm is configured with the at least one capacity operating rate switching scheme comprising the N capacity operating rates respectively and alternatively activated and selected by the free setting operator, wherein N is a positive integer greater than or equal to two.

116. The LED security light according to claim 115, wherein the capacity scale simulator is a virtual track, wherein the virtual track can be configured with a linear virtual track or an arc virtual track, wherein the free setting algorithm is implemented by operating the free setting operator to interact with the virtual track and the indicator of the capacity operating rate, wherein the free setting operator is slidable by the user's finger or a touch pen along the virtual track with the indicator of the capacity operating rate simultaneously showing instantaneous state of a changing capacity operating rate while the sliding motion of the free setting operator is being conducted, wherein the state shown in the indicator of the capacity operating rate can be the operating percentage, the operating chart, the operating value or a selection of an illumination performance of the at least one operating parameter, wherein a full length of the virtual track represents a simulation of a value of the full operating capacity of the at least one operating parameter, wherein the capacity operating rate is incrementally changed according to a length of the sliding motion and is determined by a final parking location of the free setting operator on the virtual track when the sliding motion stops.

117. The LED security light according to claim 115, wherein the capacity scale simulator is a capacity operating rate running process, wherein the free setting operator is a virtual button, wherein the free setting algorithm is implemented by the virtual button interacting with the capacity operating rate running process and the indicator of the capacity operating rate, wherein the virtual button is designed on the touch screen panel of the mobile device, wherein when the virtual button is continuously touched by a user's finger or a touch pen, the free setting algorithm operates to activate the capacity operating rate running process of the at least one capacity operating rate switching scheme to stepwise increase the capacity operating rate from a minimum level to a maximum level, or to stepwise decrease the capacity operating rate from the maximum level to the minimum level, or to increase stepwisely from the minimum level to the maximum level and then to decrease stepwisely from the maximum level to the minimum level to complete the capacity operating rate running process of the at least one capacity operating rate switching scheme; wherein during the capacity operating rate running process the instantaneous state of a stepwise changing capacity operating rate is simultaneously shown in the indicator of the capacity operating rate, wherein the state of the capacity operating rate can be the operating percentage, the operating chart, the operating value or the actual functional performance of the at least one operating parameter, wherein at the moment when the user's finger or the touch pen is removed from the virtual button, the capacity operating rate running process is instantly ceased with the capacity operating rate thereby being locked in at the instantaneous level of the last step of the capacity operating rate running process.

118. The LED security light according to claim 115, wherein the capacity scale simulator is a capacity operating rate running process of the at least one capacity operating rate switching scheme, wherein the free setting operator is a touch sensor configured with a sensing zone designed in a neighborhood of the indicator of the capacity operating rate on the touch screen panel of the mobile device, wherein the free setting algorithm is implemented by the touch sensor interacting with the capacity operating rate running process and the indicator of the capacity operating rate; wherein when the user touches the sensing zone of the touch sensor to operate a forward slide on the touch screen panel of the mobile device, the free setting algorithm responsively operates to alternately select a next higher capacity operating rate according to a sequence of an increasing pattern of the N capacity operating rates in the at least one capacity operating rate switching scheme, wherein when the user touches the sensing zone of the touch sensor to operate a backward slide on the touch screen of the mobile device, the free setting algorithm responsively operates to alternately select a next lower capacity operating rate according to a sequence of a decreasing pattern of the N capacity operating rates in the at least one capacity operating rate switching scheme.

119. The LED security light according to claim 115, wherein the capacity scale simulator is a capacity operating rate running process of the at least one capacity operating rate switching scheme, wherein the free setting operator is a virtual button, wherein the free setting algorithm is implemented by the virtual button interacting with the capacity operating rate running process and the indicator of the capacity operating rate, wherein the virtual button is designed on the touch screen panel of the mobile device, wherein each time when the virtual button is clicked, the free setting algorithm operates to alternately pick and play a corresponding capacity operating rate according to a sequential order of a clicking motion with an increasing pattern or with a decreasing pattern of the N different capacity operating rates in the at least one capacity operating rate switching scheme, or according to a running cycle performance of the clicking motion from a minimum level of the capacity operating rate to increase stepwisely to a maximum level of the capacity operating rate and then from the maximum level of capacity operating rate to decrease stepwisely to the minimum level of capacity operating rate to complete the capacity operating rate running process of the at least one capacity operating rate switching scheme.

120. The LED security light according to claim 115, wherein the capacity scale simulator is a virtual keyboard, wherein the virtual keyboard is configured with N virtual keys representing the free setting operator operable and selectable by the user, wherein each virtual key is indicated with a corresponding capacity operating rate easily recognizable by the user, wherein when a virtual key is clicked by the user, the corresponding capacity operating rate is determined by the free setting algorithm, wherein when a setting decision is concluded, the user interface APP (software application) manages to generate the at least one operating variable corresponding to a selection of the at least one capacity operating rate in the at least one capacity operating rate switching scheme and accordingly operates to transmit the at least one wireless instruction signal carrying a message of the operating variable to the LED security light for setting the relevant operating parameter.

121. The LED security light according to claim 114, wherein the wireless signal receiver is a Wi-Fi wireless signal receiver, a Blue Tooth wireless signal receiver, a Zig Bee wireless signal receiver or a RF wireless signal receiver.

122. The LED security light according to claim 114, wherein the at least one operating parameter is for setting a timer for performing a manual override illumination mode, wherein the security light is controlled by the photo sensor and the timer for performing a general illumination mode with the motion sensor being temporarily disabled before switching to perform a motion sensing illumination mode, wherein the timer is a time length setting timer or a clock time setting timer.

123. The LED security light according to claim 114, wherein the at least one operating parameter is for setting the preset time period for performing the first level illumination.

124. The LED security light according to claim 114, wherein the at least one operating parameter is for setting the detection distance of the motion sensor.

125. The LED security light according claim 114, wherein the at least one operating parameter is for setting the light intensity level of the first level illumination.

126. The LED security light according to claim 114, wherein the at least one operating parameter is for setting a light color temperature of the first level illumination; wherein the light-emitting unit includes a first LED load emitting light with a first color temperature in a range between 2000K and 3000K and a second LED load emitting light with a second color temperature in a range between 4000K and 6500K, wherein the first LED load and the second LED load are electrically connected and covered by a light diffuser to create an effect of a mingled light color temperature; wherein the switching circuitry includes at least a first controllable semiconductor switching device and a second controllable semiconductor switching device respectively connected to the first LED load and the second LED load, wherein the controller in response to the at least one wireless instructional signal of the at least one operating variable received from the wireless signal receiver operates to activate a color temperature tuning process to respectively control different combinations of conduction rates between a first conduction rate of the first controllable semiconductor switching device and a second conduction rate of the second controllable semiconductor switching device to manage electric powers respectively allocated to the first LED load and the second LED load for tuning the mingled light color temperature, wherein for performing a power allocation between the first LED load and the second LED load the first conduction rate of the first controllable semiconductor switching device and the second conduction rate of the second controllable semiconductor switching device are reversely and complementarily adjusted such that a total electric power delivered to light-emitting unit remains unchanged.

127. The LED security light according to claim 115, wherein the mobile device is a mobile phone, a PDA, a notebook, a smart watch, a smart speaker or a remote controller, featured with a capacity to download the user interface APP from an internet or a cloud server for controlling and setting the at least one operating parameter of the LED security light.

128. The LED security light according to claim 115, wherein the free setting algorithm of the user interface APP is a voice recognition software loaded in the mobile device from an internet or a cloud server to transform a voice instruction of the user's setting decision into at least one operating variable of the at least one operating parameter of the LED security light and convert the at least one operating variable into the at least one wireless instruction signal for transmitting to the wireless signal receiver of the LED security light.

129. An LED security light, comprising a light emitting unit comprising at least one LED load emitting light with at least one color temperature;
a loading and power control unit;
a photo sensor;
a power supply unit; and
an external control unit, electrically coupled with the loading and power control unit;
wherein the loading and power control unit comprises a controller and a switching circuitry, wherein the controller is electrically coupled with the photo sensor, the switching circuitry and the external control unit;
wherein the switching circuitry is electrically coupled with a power source of the power supply unit and the light emitting unit, wherein the power source is a DC power source;
wherein the switching circuitry comprises at least one controllable semiconductor switching device; wherein the controller outputs different pulse width modulation signals to control at least one conduction rate of the at least one controllable semiconductor switching device in each cycle period of the DC power characterized by a $T_{on}$ and a $T_{off}$ for delivering different average electric currents to the light-emitting unit such that the light-emitting unit respectively generates different levels of illuminations activated by the photo sensor and the external control unit;
wherein at dusk when a light intensity level of an ambient light detected by the photo sensor is lower than a first predetermined value, the loading and power control unit operates to deliver an average electric current to the light-emitting unit to perform an illumination;
wherein at dawn when the light intensity level of the ambient light detected by the photo sensor is higher than a second predetermined value, the loading and power control unit operates to cutoff the average electric current delivered to the light-emitting unit to switch off the LED security light;
wherein the external control unit is a wireless signal receiver electrically coupled with the controller to receive, decode and convert at least one wireless instruction signal into at least one value of at least one operating variable interpretable to the controller, wherein the controller is programmed with an APP (software application) for interpreting and processing the at least one value of the at least one operating variable for setting at least one operating parameter, wherein the at least one operating variable represents a setting decision by a user for choosing at least one functional performance of the at least one operating parameter of the LED security light, wherein the at least one operating parameter is used for controlling at least one of various functional performance settings of the LED security light including a time length setting, a light intensity setting, a light color temperature setting, a detection sensitivity setting or an illumination performance mode switching and setting among a plurality of different illumination performance modes;
wherein the power supply unit is an AC/DC power converter to convert AC power into a DC power delivered to the switching circuitry, wherein the switching circuitry is designed with a driving circuitry to output a DC voltage with a constant current electric power to drive at least one LED load such that an electric current passing through each LED of the at least one LED load remains at a level such that a voltage V across each LED complies with an operating constraint of $V_{th}<V<V_{max}$ featuring LED electrical characteristics; wherein $V_{th}$ is a reference value of a threshold voltage required to trigger each LED to start emitting light and $V_{max}$ is a reference value of a maximum operating voltage across each LED at which an LED construction in the plurality of LEDs could be vulnerable to a thermal damage;
wherein when each LED load of the at least one LED load is configured with a plurality of N number LEDs electrically connected in series or N sets of LEDs electrically connected in series, wherein N is a positive integer greater than or equal to 2, a working voltage VN across each LED load is confined in a domain between a minimum voltage equal to the sum of the threshold voltages of all LEDs electrically connected in series or sets of LEDs electrically connected in series and a maximum voltage equal to the sum of the maximum operating voltages of all LEDs electrically connected in series or sets of LEDs electrically connected in series, expressed as $N \times V_{th} < V_N < N \times V_{max}$;
wherein when the plurality of LEDs are phosphor based white light LEDs produced by coating at least one phosphor compound on surfaces of blue light LEDs, the reference value of the threshold voltage $V_{th}$ is estimated at 2.5 volts and the reference value of the maximum operating voltage is estimated at 3.5 volts subject to an operating condition that a temperature of each LED connecting pin is controlled at or below 80 degrees centigrade thru a heat sink, wherein the voltage V across each LED of the N pieces of LEDs is required to comply with an operating constraint of 2.5 volts<V<3.5 volts and the working voltage $V_N$ imposed on the LED load is thereby confined in a domain expressed by $N \times 2.5$ volts $< V_N < N \times 3.5$ volts.

130. The LED security light according to claim 129, wherein the LED security light is designed with an on line free setting method working in conjunction with a mobile device for setting the at least one operating parameter of the LED security light, comprising:
using a user interface APP (software application) comprising at least one free setting algorithm loaded in a mobile device to transform a user's setting decision into at least one operating variable of the at least one operating parameter of the LED security light;
transmitting via the mobile device at least one wireless instruction signal carrying at least one message of the at least one operating variable to the LED security light according to the user's setting decision; and
using a controller of the LED lighting device designed with a capacity to interpret and convert the at least one wireless instruction signal into the at least one operating variable of the at least one operating parameter and accordingly manage to output at least one control signal to control a switching circuitry of the LED lighting device to control, adjust and/or select a functional performance of the at least one operating parameter;

wherein when the user's interface APP is activated and concluded with at least one setting decision, the user interface APP manages to transmit via the mobile device the at least one wireless instruction signal carrying at least one message of the at least one operating variable to the LED security light, wherein the at least one operating variable is used for controlling, adjusting and or selecting the functional performance of the at least one operating parameter of the LED security light;

wherein the at least one operating variable of the at least one operating parameter is stored in a memory of the controller for a repetitive performance, wherein the at least one operating variable of the at least one operating parameter stored is replaceable by a new operating variable reset by the user;

wherein the user interface APP is operable on a touch screen panel of the mobile device, wherein the free setting algorithm is configured with a capacity scale simulation process implemented by a visual configuration of a free setting operator working in conjunction with a capacity scale simulator and an indicator of a capacity operating rate to facilitate the user's decision making process in setting a desired level of the functional performance of the at least one operating parameter, wherein the free setting algorithm is configured with at least one capacity operating rate switching scheme comprising a plurality of different capacity operating rates, wherein when the free setting operator is activated by the user to interact with the capacity scale simulator, the user's interface APP responsively manages to determine a value of the capacity operating rate in the at least one capacity operating rate switching scheme by selection or by computation according to an instantaneous state of an interaction between the free setting operator and the capacity scale simulator with the indicator of the capacity operating rate simultaneously showing an instantaneous value of the capacity operating rate or an illumination performance state of the at least one operating parameter, wherein the instantaneous value of the capacity operating rate or the illumination performance state of the at least one operating parameter shown in the indicator can be an operating percentage, an operating chart, an operating value, an actual functional performance or a performance mode selection code of a relevant operating parameter, wherein when a free setting motion of the free setting operator is ceased, the user interface APP manages to generate the at least one operating variable corresponding to the capacity operating rate or the illumination performance state being determined and accordingly operates to transmit the at least one wireless instruction signal carrying the at least one message of the at least one operating variable to the LED security light for execution;

wherein the capacity scale simulator is implemented by dividing a full operating capacity of the at least one operating parameter into N capacity operating rates ranging from a minimum capacity operating rate greater than 0% of the full operating capacity to a maximum capacity operating rate equal to 100% of the full operating capacity of the at least one operating parameter, wherein the free setting algorithm is configured with the at least one capacity operating rate switching scheme comprising the N capacity operating rates respectively and alternatively activated and selected by the free setting operator, wherein N is a positive integer greater than or equal to 2.

131. The LED security light according to claim 130, wherein the capacity scale simulator is a virtual track, wherein the virtual track can be configured with a linear virtual track or an arc virtual track, wherein the free setting algorithm is implemented by operating the free setting operator to interact with the virtual track and the indicator of the capacity operating rate, wherein the free setting operator is slidable by the user's finger or a touch pen along the virtual track with the indicator of the capacity operating rate simultaneously showing instantaneous state of a changing capacity operating rate while the sliding motion of the free setting operator is being conducted, wherein the state shown in the indicator of the capacity operating rate can be the operating percentage, the operating chart, the operating value or a selection of an illumination performance of the at least one operating parameter, wherein a full length of the virtual track represents a simulation of a value of the full operating capacity of the at least one operating parameter, wherein the capacity operating rate is incrementally changed according to a length of the sliding motion and is determined by a final parking location of the free setting operator on the virtual track when the sliding motion stops.

132. The LED security light according to claim 130, wherein the capacity scale simulator is a capacity operating rate running process of the at least one capacity rate switching scheme, wherein the free setting operator is a virtual button, wherein the free setting algorithm is implemented by the virtual button interacting with the capacity operating rate running process and the indicator of the capacity operating rate, wherein the virtual button is designed on the touch screen panel of the mobile device, wherein when the virtual button is continuously touched by a user's finger or a touch pen, the free setting algorithm operates to activate the capacity operating rate running process of the at least one capacity operating rate switching scheme to stepwisely increase the capacity operating rate from a minimum level to a maximum level, or to stepwisely decrease the capacity operating rate from the maximum level to the minimum level, or to increase stepwisely from the minimum level to the maximum level and then to decrease stepwisely from the maximum level to the minimum level to complete a full running cycle of the capacity operating rate running process of the at least one capacity operating rate switching scheme; wherein during the capacity operating rate running process the instantaneous state of a stepwise changing capacity operating rate is simultaneously shown in the indicator of the capacity operating rate, wherein the state of the capacity operating rate can be the operating percentage, the operating chart, the operating value or the actual functional performance of the at least one operating parameter, wherein at the moment when the user's finger or the touch pen is removed from the virtual button, the capacity operating rate running process is instantly ceased with the capacity operating rate thereby being locked in at the instantaneous level of the last step of the capacity operating rate running process.

133. The LED security light according to claim 130, wherein the capacity scale simulator is a capacity operating rate running process of the at least one capacity operating rate switching scheme, wherein the free setting operator is a virtual button, wherein the free setting algorithm is implemented by the virtual button interacting with the capacity operating rate running process and the indicator of the capacity operating rate, wherein the virtual button is designed on the touch screen panel of the mobile device, wherein each time when the virtual button is clicked, the free setting algorithm operates to alternately pick and play a corresponding capacity operating rate according to a sequential order of a clicking motion with an increasing pattern or with a decreasing pattern of the N different capacity operating rates in the at least one capacity operating rate switching scheme, or according to a running cycle performance from a minimum level of the capacity operating rate to increase stepwisely to a maximum level of the capacity operating rate and then from the maximum level of capacity operating rate to decrease stepwisely to the minimum level of capacity operating rate to complete the running cycle performance of the capacity operating rate switching scheme.

134. The LED security light according to claim 130, wherein the capacity scale simulator is a virtual keyboard, wherein the virtual keyboard is configured with N virtual keys representing the free setting operator operable and selectable by the user, wherein each virtual key is indicated with a corresponding capacity operating rate easily recognizable by the user, wherein when a virtual key is clicked by the user, the corresponding capacity operating rate is determined by the free setting algorithm, wherein when a setting decision is concluded, the user interface APP (software application) manages to generate the at least one operating variable corresponding to a selection of the at least one capacity operating rate in the at least one capacity operating rate switching scheme and accordingly operates to transmit the at least one wireless instruction signal carrying a message of the operating variable to the LED security light for setting the relevant operating parameter.

135. The LED security light according to claim 130, wherein the capacity scale simulator is a capacity operating rate running process of the at least one capacity operating rate switching scheme, wherein the free setting operator is a touch sensor configured with a sensing zone designed in a neighborhood of the indicator of the capacity operating rate on the touch screen panel of the mobile device, wherein the free setting algorithm is implemented by the touch sensor interacting with the capacity operating rate running process of the at least one capacity operating rate switching scheme and the indicator of the capacity operating rate; wherein when the user touches the sensing zone of the touch sensor to operate a forward slide on the touch screen panel of the mobile device, the free setting algorithm responsively operates to alternately select a next higher capacity operating rate according to a sequence of an increasing pattern of the N capacity operating rates in the at least one capacity operating rate switching scheme, wherein when the user touches the sensing zone of the touch sensor to operate a backward slide on the touch screen of the mobile device, the free setting algorithm responsively operates to alternately select a next lower capacity operating rate according to a sequence of a decreasing pattern of the N capacity operating rates in the at least one capacity operating rate switching scheme.

136. The LED security light according to claim 129, wherein the wireless signal receiver is a Wi-Fi wireless signal receiver, a Blue Tooth wireless signal receiver, a Zig Bee wireless signal receiver or a RF wireless signal receiver.

137. The LED security light according to claim 129, wherein the at least one operating parameter is for setting a timer for performing a manual override illumination mode, wherein the LED security light is controlled by the photo sensor and the timer for performing a general illumination mode with the motion sensor being temporarily disabled before switching to perform a motion sensing illumination mode, wherein the timer is a time length setting timer or a clock time setting timer.

138. The LED security light according to claim 129, wherein the at least one operating parameter is for setting a light color temperature of the first level illumination; wherein the light emitting unit comprises at least a first LED load emitting light with a first color temperature in a range between 2000K and 3000K and a second LED load emitting light with a second color temperature in a range between 4000K and 6500K, wherein the first LED load and the second LED load are electrically connected and covered by a light diffuser to create an effect of a mingled light color temperature; wherein the switching circuitry includes at least a first controllable semiconductor switching device and a second controllable semiconductor switching device electrically and respectively connected to the first LED load and the second LED load, wherein the controller in response to the at least one wireless instructional signal of the at least one operating variable received from the wireless signal receiver operates to activate a color temperature tuning process to respectively control different paired combinations of conduction rates between a first conduction rate of the first controllable semiconductor switching device and a second conduction rate of the second controllable semiconductor switching device to manage electric powers respectively allocated to the first LED load and the second LED load for tuning the mingled light color temperature, wherein for performing a power allocation between the first LED load and the second LED load, the first conduction rate of the first controllable semiconductor switching device and the second conduction rate of the second controllable semiconductor switching device are reversely and complementarily adjusted such that a total electric power delivered to light-emitting unit remains unchanged.

139. The LED security light according to claim 129, wherein the mobile device is a mobile phone, a PDA, a notebook, a smart watch, a smart speaker or a remote controller, featured with a capacity to download the user interface APP from an internet or a cloud server for controlling and setting the at least one operating parameter of the LED security light.

140. The LED security light according to claim 129, wherein the free setting algorithm of the user interface APP is a voice recognition software loaded in the mobile device from an internet or a cloud server to transform a voice instruction of the user's setting decision into at least one operating variable of the at least one operating parameter of the LED security light and convert the at least one operating variable into the at least one wireless instruction signal for transmitting to the wireless signal receiver of the LED security light.

141. An on line free setting method for setting at least one operating parameter of an LED lighting device, comprising:
  using a user interface APP (software application) comprising at least one free setting algorithm loaded in a mobile device to transform a user's setting decision into at least one operating variable of the at least one operating parameter of the LED lighting device;
  transmitting via the mobile device at least one wireless instruction signal carrying at least one message of the at least one operating variable to the LED lighting device according to the user's setting decision; and
  using a controller of the LED lighting device designed with a capacity to interpret and convert the at least one wireless instruction signal into the at least one operating variable of the at least one operating parameter and accordingly manage to output at least one control signal to control a switching circuitry of the LED lighting device to control, adjust and or select a functional performance of the at least one operating parameter;

wherein when the user's interface APP is activated and concluded with at least one setting decision, the user interface APP manages to transmit via the mobile device the at least one wireless instruction signal carrying at least one message of the at least one operating variable to the LED lighting device, wherein the at least one operating variable is used for controlling, adjusting and or selecting the functional performance of the at least one operating parameter of the LED lighting device;

wherein the at least one operating variable of the at least one operating parameter is stored in a memory of the controller for a repetitive performance, wherein the at least one operating variable of the at least one operating parameter stored is replaceable by a new operating variable reset by the user;

wherein the at least one operating parameter is used for controlling at least one of various functional performance settings of the LED lighting device including a timer setting, a light intensity setting, a light color temperature setting, a detection sensitivity setting or an illumination performance mode switching and setting among a plurality of different illumination performance modes;

wherein the user interface APP is operable on a touch screen panel of the mobile device, wherein the free setting algorithm is configured with a capacity scale simulation process implemented by a visual configuration of a free setting operator working in conjunction with a capacity scale simulator and an indicator of a capacity operating rate to facilitate the user's decision making process in setting a desired level of the functional performance of the at least one operating parameter, wherein the free setting algorithm is configured with at least one capacity operating rate switching scheme comprising a plurality of different capacity operating rates, wherein when the free setting operator is activated by the user to interact with the capacity scale simulator, the user's interface APP responsively manages to determine a value of the capacity operating rate in the at least one capacity operating rate switching scheme by selection or by computation according to an instantaneous state of an interaction between the free setting operator and the capacity scale simulator with the indicator of the capacity operating rate simultaneously showing an instantaneous value of the capacity operating rate or the illumination performance state of the at least one operating parameter, wherein the instantaneous value of the capacity operating rate or the illumination performance state of the at least one operating parameter shown in the indicator can be an operating percentage, an operating chart, an operating value, an actual functional performance or a performance mode selection code of a relevant operating parameter, wherein when a free setting motion of the free setting operator is ceased, the user interface APP manages to generate the at least one operating variable corresponding to the capacity operating rate or the illumination performance state being determined and accordingly operates to transmit the at least one wireless instruction signal carrying the at least one message of the at least one operating variable to the LED lighting device for execution;

wherein the capacity scale simulator is implemented by dividing a full operating capacity of the at least one operating parameter into N capacity operating rates ranging from a minimum capacity operating rate greater than 0% of the full operating capacity to a maximum capacity operating rate equal to 100% of the full operating capacity of the at least one operating parameter, wherein the free setting algorithm is configured with the at least one capacity operating rate switching scheme comprising the N capacity operating rates respectively and alternatively activated and selected by the free setting operator, wherein N is a positive integer greater than or equal to 2.

142. The on line free setting method for setting at least one operating parameter of an LED lighting device according to claim 141, wherein the capacity operating scale simulator is a virtual track designed on the touch screen panel of the mobile device, wherein the virtual track can be configured with a linear virtual track or an arc virtual track, wherein the free setting operator is slidable by the user's finger along the virtual track with the indicator of the capacity operating rate simultaneously showing an instantaneous value of the changing capacity operating rate while a sliding motion of the free setting operator is being conducted, wherein the value shown in the indicator of the capacity operating rate can be the operating percentage, the operating chart, the operating value, the actual functional performance or the performance mode selection code of the at least one operating parameter, wherein a full length of the virtual track represents a simulation of a value of the full operating capacity of the at least one operating parameter, wherein the capacity operating rate is incrementally changed according to a length of the sliding motion and is determined by a final parking location of the free setting operator on the virtual track when the sliding motion stops.

143. The on line free setting method for setting at least one operating parameter of an LED lighting device according to claim 142, wherein the at least one capacity operating rate switching scheme is implemented by dividing the virtual track into N sensing compartments aligned from one end of the virtual track thru the other end of the virtual track with each of N sensing compartments represents a value of the N capacity operating rates in the at least one capacity operating rate switching scheme, wherein each sensing compartment of the N sensing compartments is configured with a touch sensing capacity designed to execute a designated capacity operating rate valued increasingly or decreasingly along a sliding direction of the virtual track, wherein when the sliding motion is ceased and the free setting operator is parked in a sensing compartment on the virtual track, the at least one operating variable is generated by the user's interface APP representing the user's selection of the capacity operating rate of the at least one capacity operating rate switching scheme of the at least one operating parameter and simultaneously a selected capacity operating rate is shown in the indicator, the at least one operating variable generated is then transmitted by the mobile device to the LED lighting device for execution.

144. The on line free setting method for setting at least one operating parameter of an LED lighting device according to claim 141, wherein the capacity scale simulator is a capacity operating rate running process of the at least one capacity operating rate switching scheme, wherein the free setting operator is a virtual button, wherein the free setting algorithm is implemented by the free setting operator interacting with the capacity operating rate running process of the at least one capacity operating rate switching scheme and the indicator of the capacity operating rate, wherein each time when the virtual button is clicked, the free setting algorithm operates to alternately pick and play a corresponding capacity operating rate according to a sequential order of a clicking motion with an increasing pattern or with a decreasing pattern of the N different capacity operating rates in the at least one capacity operating rate switching scheme, or according to a running cycle performance from a minimum level of the capacity operating rate to increase stepwisely to a maximum level of the capacity operating rate and then from the maximum level of capacity operating rate to decrease stepwisely to the minimum level of capacity operating rate to complete the running cycle performance of the capacity operating rate switching scheme.

145. The on line free setting method for setting at least one operating parameter of an LED lighting device according to claim 141, wherein the capacity scale simulator is a capacity operating rate running process of the at least one capacity operating rate switching scheme, wherein the free setting operator is a virtual button, wherein the free setting algorithm is implemented by the virtual button interacting with the capacity operating rate running process and the indicator of the capacity operating rate, wherein the virtual button is designed on the touch screen panel of the mobile device, wherein when the virtual button is continuously touched by a user's finger or a touch pen, the free setting algorithm operates to activate the capacity operating rate running process of the at least one capacity operating rate switching scheme to stepwisely increase the capacity operating rate from a minimum level to a maximum level, or to stepwisely decrease the capacity operating rate from the maximum level to the minimum level, or to increase stepwisely from the minimum level of the capacity operating rate to the maximum level of the capacity operating rate and then to decrease stepwisely the capacity operating rate from the maximum level to the minimum level to complete a full running cycle performance of the at least one capacity operating rate switching scheme; wherein during the capacity operating rate running process the instantaneous state of a stepwise changing capacity operating rate is simultaneously shown in the indicator of the capacity operating rate, wherein the state of the capacity operating rate can be the operating percentage, the operating chart, the operating value or the actual functional performance of the at least one operating parameter, wherein at the moment when the user's finger or the touch pen is removed from the virtual button, the capacity operating rate running process is instantly ceased with the capacity operating rate thereby being locked in at the instantaneous level of the last step of the capacity operating rate running process.

146. The on line free setting method for setting at least one operating parameter of an LED lighting device according to claim 141, wherein the capacity scale simulator is a virtual keyboard, wherein the virtual keyboard is configured with N virtual keys representing the free setting operator operable and selectable by the user, wherein each virtual key is indicated with a corresponding capacity operating rate easily recognizable by the user, wherein when a virtual key is clicked by the user, the corresponding capacity operating rate is determined by the free setting algorithm, wherein when a setting decision is concluded, the user interface APP (software application) manages to generate the at least one operating variable corresponding to a selection of the at least one capacity operating rate in the at least one capacity operating rate switching scheme and accordingly operates to transmit the at least one wireless instruction signal carrying a message of the at least one operating variable to the LED security light for setting the relevant operating parameter.

147. The on line free setting method for setting at least one operating parameter of an LED lighting device according to claim 141, wherein the capacity scale simulator is a capacity operating rate running process of the at least one capacity operating rate switching scheme and the free setting operator is a touch sensor configured with a sensing zone designed in a neighborhood of the indicator of the capacity operating rate on the touch screen panel of the mobile device to interact with the capacity operating rate running process of the at least one capacity operating rate switching scheme, wherein when the user touches the sensing zone of the touch sensor to operate a forward slide on the touch screen panel of the mobile device, the free setting algorithm responsively operates to alternately select a next higher capacity operating rate according to a sequence of an increasing pattern of the N capacity operating rates in the at least one capacity operating rate switching scheme, wherein when the user touches the sensing zone of the touch sensor to operate a backward slide on the touch screen of the mobile device, the free setting algorithm responsively operates to alternately select a next lower capacity operating rate according to a sequence of a decreasing pattern of the N capacity operating rates in the at least one capacity operating rate switching scheme.

148. An on line free setting method for setting at least one operating parameter of a ceiling fan with light kit, comprising:
using a user interface APP (software application) comprising at least one free setting algorithm loaded in a mobile device to transform a user's setting decision into at least one operating variable of at least one operating parameter of the ceiling fan with light kit;
transmitting via the mobile device at least one wireless instruction signal carrying at least one message of the at least one operating variable to the ceiling fan with light kit; and
using at least one controller of the ceiling fan with light kit designed with a capacity to interpret and convert the at least one wireless instruction signal into at least one capacity operating rate of the at least one operating parameter and accordingly manage to output at least one control signal to control a switching circuitry of the ceiling fan with light kit to adjust a functional performance of the at least one operating parameter with a selected value;
wherein when the user's interface APP is activated and concluded with at least one setting decision, the user interface APP manages to transmit via the mobile device the at least one wireless instruction signal carrying at least one message of the at least one operating variable to the ceiling fan with light kit, wherein the at least one operating variable is the at least one capacity operating rate to be used for producing and processing at least one value of the at least one operating parameter of the ceiling fan with light kit;
wherein the at least one value of the at least one operating parameter is stored in a memory of the at least one controller for a repetitive performance, wherein the at least one value of the at least one operating parameter stored is replaceable by processing a new operating variable set by the user;
wherein the at least one operating parameter is used for controlling at least one of various lighting and electrical characteristics of the ceiling fan with light kit including at least a time setting, at least a fan speed setting, a fan rotation direction setting, at least a light intensity setting and at least a light color temperature setting;

wherein the user interface APP is operable on a touch screen panel of the mobile device, wherein the free setting algorithm is a capacity scale simulation process implemented by a visual configuration of a free setting operator working in conjunction with a capacity scale simulator and an indicator of a capacity operating rate to facilitate the user's decision making process in setting a desired level of the at least one operating parameter, wherein the free setting algorithm is configured with at least one capacity operating rate switching scheme including a plurality of different capacity operating rates, wherein when the free setting operator is activated by the user to interact with the capacity scale simulator, the user's interface APP responsively manages to determine a value of the capacity operating rate in the at least one capacity operating rate switching scheme by selection or by computation according to an instantaneous state of an interaction between the free setting operator and the capacity scale simulator with the indicator of the capacity operating rate simultaneously showing an instantaneous value of the capacity operating rate, wherein the instantaneous value of the capacity operating rate shown in the indicator can be an operating percentage, an operating chart, an operating value or an actual functional performance picture of a relevant operating parameter, wherein when a free setting motion of the free setting operator is ceased, the user interface APP manages to generate the at least one operating variable corresponding to the capacity operating rate being determined and accordingly operates to transmit the at least one wireless instruction signal carrying the at least one message of the at least one operating variable to the ceiling fan with light kit for execution; wherein the capacity scale simulator is implemented by dividing a full operating capacity of the at least one operating parameter into N capacity operating rates ranging from a minimum capacity operating rate greater than 0% of the full operating capacity to a maximum operating rate equal to 100% of the full operating capacity of the at least one operating parameter, wherein the free setting algorithm is configured with the at least one capacity operating rate switching scheme comprising the N capacity operating rates respectively and alternatively activated and selected by the free setting operator, wherein N is a positive integer greater than or equal to two.

149. The on line free setting method for setting at least one operating parameter of a ceiling fan with light kit according to claim 148, wherein the mobile device is a mobile phone, a pad, a PDA, a notebook, a smart watch, a smart speaker or a remote controller featured with a capacity to download the user interface APP from an Internet or a cloud server for controlling and setting the at least one operating parameter of the ceiling fan with light kit.

150. The on line free setting method for setting at least one operating parameter of a ceiling fan with light kit according to claim 148, wherein the free setting algorithm of the user interface APP is a voice recognition software loaded in the mobile device from the internet or the cloud server to transform a voice instruction of the user's setting decision into at least one operating variable of the at least one operating parameter of the ceiling fan with light kit and convert the at least one operating variable into the at least one wireless instruction signal for transmitting to the wireless signal receiver of the ceiling fan with light kit.

151. The on line free setting method for setting at least one operating parameter of a ceiling fan with light kit according to claim 148, wherein the light kit is an LED lighting device.

152. The on line free setting method for setting at least one operating parameter of a ceiling fan with light kit according to claim 148, wherein the capacity scale simulator is a virtual track, wherein the free setting algorithm is implemented by the visual configuration of the free setting operator, the virtual track and the indicator of the capacity operating rate, wherein the free setting operator is slidable by the user's finger or a touch pen along the virtual track with the indicator of the capacity operating rate simultaneously showing the instantaneous state of the changing capacity operating rate while a sliding motion of the free setting operator is being conducted, wherein the instantaneous state shown in the indicator of the capacity operating rate can be the operating percentage, the operating chart, the operating value or the actual functional performance picture of the at least one operating parameter, wherein a full length of the virtual track represents a simulation of a value of a full operating capacity of the at least one operating parameter, wherein the capacity operating rate is determined by a parking location of the free setting operator on the virtual track when the sliding motion stops.

153. The on line free setting method for setting at least one operating parameter of a ceiling fan with light kit according to claim 152, wherein the at least one capacity operating rate switching scheme is implemented by dividing the virtual track into N sensing compartments aligned from one end of the virtual track thru the other end of the virtual track with each of N sensing compartments represents a value of the N capacity operating rates in the at least one capacity operating rate switching scheme, wherein each sensing compartment of the N sensing compartments is configured with a touch sensing capacity designed to execute a designated capacity operating rate valued increasingly or decreasingly along a sliding direction of the virtual track, wherein when the sliding motion is ceased and the free setting operator is parked in a sensing compartment on the virtual track, the at least one operating variable is generated by the user's interface APP representing the user's selection of the capacity operating rate of the at least one capacity operating rate switching scheme of the at least one operating parameter and simultaneously a selected capacity operating rate is shown in the indicator, the at least one operating variable generated is then transmitted by the mobile device to the ceiling fan with light kit for execution.

154. The on line free setting method for setting at least one operating parameter of a ceiling fan with light kit according to claim 148, wherein the capacity scale simulator is a capacity operating rate running process of the at least one capacity operating rate switching scheme, wherein the free setting operator is a virtual button, wherein the free setting algorithm is implemented by the virtual button interacting with the capacity operating rate running process and the indicator of the capacity operating rate, wherein the virtual button is designed on the touch screen panel of the mobile device, wherein when the virtual button is continuously touched by a user's finger or a touch pen, the free setting algorithm operates to activate the capacity operating rate running process of the at least one capacity operating rate switching scheme to stepwisely increase the capacity operating rate from a minimum level to a maximum level, or to stepwisely decrease the capacity operating rate from the maximum level to the minimum level, or to increase stepwisely the capacity operating rate from the minimum level to the maximum level and then to decrease stepwisely the capacity operating rate from the maximum level to the minimum level to complete a full running cycle performance of the at least one capacity operating rate switching scheme; wherein during the capacity operating rate running process the instantaneous state of a stepwise changing capacity operating rate is simultaneously shown in the indicator of the capacity operating rate, wherein the state of the capacity operating rate can be the operating percentage, the operating chart, the operating value or the actual functional performance of the at least one operating parameter, wherein at the moment when the user's finger or the touch pen is removed from the virtual button, the capacity operating rate running process is instantly ceased with the capacity operating rate thereby being locked in at the instantaneous level of the last step of the capacity operating rate running process.

155. The on line free setting method for setting at least one operating parameter of a ceiling fan with light kit according to claim 148, wherein the capacity scale simulator is a capacity operating rate running process of the at least one capacity operating rate switching scheme, wherein the free setting operator is a virtual button, wherein the free setting algorithm is implemented by the free setting operator interacting with the capacity operating rate running process of the at least one capacity operating rate switching scheme and the indicator of the capacity operating rate, wherein each time when the virtual button is clicked, the free setting algorithm operates to alternately pick and play a corresponding capacity operating rate according to a sequential order of a clicking motion with an increasing pattern or with a decreasing pattern of the N different capacity operating rates in the at least one capacity operating rate switching scheme, or according to a running cycle performance from a minimum level of the capacity operating rate to increase stepwisely to a maximum level of the capacity operating rate and then from the maximum level of capacity operating rate to decrease stepwisely to the minimum level of capacity operating rate to complete the running cycle of the capacity operating rate switching scheme.

156. The on line free setting method for setting at least one operating parameter of a ceiling fan with light kit according to claim 148, wherein the capacity scale simulator is a virtual keyboard, wherein the virtual keyboard is configured with N virtual keys representing the free setting operator operable and selectable by the user, wherein each virtual key is indicated with a corresponding capacity operating rate easily recognizable by the user, wherein when a virtual key is clicked by the user, the corresponding capacity operating rate is determined by the free setting algorithm, wherein when a setting decision is concluded, the user interface APP (software application) manages to generate the at least one operating variable corresponding to a selection of the at least one capacity operating rate in the at least one capacity operating rate switching scheme and accordingly operates to transmit the at least one wireless instruction signal carrying a message of the at least one operating variable to the ceiling fan with light kit for setting the relevant operating parameter.

157. The on line free setting method for setting at least one operating parameter of a ceiling fan with light kit according to claim 148, wherein the capacity scale simulator is a capacity operating rate running process of the at least one capacity operating rate switching scheme and the free setting operator is a touch sensor configured with a sensing zone designed in a neighborhood of the indicator of the capacity operating rate on the touch screen panel of the mobile device to interact with the capacity operating rate running process of the at least one capacity operating rate switching scheme, wherein when the user touches the sensing zone of the touch sensor to operate a forward slide on the touch screen panel of the mobile device, the free setting algorithm responsively operates to alternately select a next higher capacity operating rate according to a sequence of an increasing pattern of the N capacity operating rates in the at least one capacity operating rate switching scheme, wherein when the user touches the sensing zone of the touch sensor to operate a backward slide on the touch screen of the mobile device, the free setting algorithm responsively operates to alternately select a next lower capacity operating rate according to a sequence of a decreasing pattern of the N capacity operating rates in the at least one capacity operating rate switching scheme.

\* \* \* \* \*